US012592947B2

(12) United States Patent
Ahn et al.

(10) Patent No.: US 12,592,947 B2
(45) Date of Patent: Mar. 31, 2026

(54) SYSTEMS AND METHODS FOR CYBER THREAT DETECTION BASED ON NEW AND/OR UPDATED CYBER THREAT INTELLIGENCE

(71) Applicant: Centripetal Networks, LLC, Portsmouth, NH (US)

(72) Inventors: David K. Ahn, Winston-Salem, NC (US); Jess P. Parnell, Grayson, GA (US); Cody Michael Baker, Round Hill, VA (US)

(73) Assignee: Centripetal Networks, LLC, Portsmouth, NH (US)

( * ) Notice: Subject to any disclaimer, the term of this patent is extended or adjusted under 35 U.S.C. 154(b) by 53 days.

(21) Appl. No.: 18/225,359

(22) Filed: Jul. 24, 2023

(65) Prior Publication Data
US 2024/0031392 A1     Jan. 25, 2024

Related U.S. Application Data

(60) Provisional application No. 63/430,479, filed on Dec. 6, 2022, provisional application No. 63/391,987, filed on Jul. 25, 2022.

(51) Int. Cl.
*H04L 9/40* (2022.01)

(52) U.S. Cl.
CPC ...... *H04L 63/1425* (2013.01); *H04L 63/0236* (2013.01); *H04L 63/1416* (2013.01)

(58) Field of Classification Search
CPC .................. H04L 63/1425; H04L 63/1416
See application file for complete search history.

(56) References Cited

U.S. PATENT DOCUMENTS

| | | | |
|---|---|---|---|
| 7,594,270 B2 | 9/2009 | Church et al. | |
| 9,137,205 B2 | 9/2015 | Rogers et al. | |
| 9,866,576 B2 | 1/2018 | Ahn et al. | |
| 10,503,899 B2 | 12/2019 | Moore et al. | |
| 2016/0308894 A1* | 10/2016 | Ahn | H04L 63/12 |
| 2017/0324709 A1* | 11/2017 | Ahn | H04L 63/1425 |
| 2021/0266310 A1* | 8/2021 | Moore | H04L 63/101 |
| 2022/0131835 A1* | 4/2022 | Fenton | H04L 63/1425 |
| 2022/0210125 A1* | 6/2022 | Moore | H04L 63/20 |
| 2024/0031392 A1* | 1/2024 | Ahn | H04L 63/1416 |
| 2025/0337763 A1* | 10/2025 | Smith | H04L 63/1416 |

FOREIGN PATENT DOCUMENTS

AU      2016384755 B2     4/2021

OTHER PUBLICATIONS

Sep. 12, 2024—(WO) International Search Report and Written Opinion—App PCT/US2023/028476.

* cited by examiner

*Primary Examiner* — Hieu T Hoang
(74) *Attorney, Agent, or Firm* — Banner & Witcoff, Ltd.

(57) ABSTRACT

Systems, methods, and apparatuses are described for detection and/or analysis of cyber threats based on updated cyber threat intelligence associated with cyber threats. Packet filtering output data such as logs of packet communications and/or copies of packets may be generated based on first cyber threat intelligence associated with a cyber threat. Updated criteria based on subsequent updated cyber threat intelligence may then be applied to the packet filtering output data.

20 Claims, 29 Drawing Sheets

401

| time | PSG_id | Host_id | Log_id | Rule_id | S_addr | D_addr | S_port | D_port | Prot. | Dir. | \<additional column(s)\> | Flow_id | Pcapld |
|---|---|---|---|---|---|---|---|---|---|---|---|---|---|
| ... | ... | ... | ... | ... | ... | ... | ... | ... | ... | ... | ... | ... | ... |
| 01:00:30:999 | 110.1 | 120.1-4 | L0051 | r001 | IP1 | IP2 | port 1 | port 2 | A | out | | flow 1 | 0 |
| 01:01:01:001 | 110.1 | 120.1-1 | L0086 | r002 | IP3 | IP4 | port 3 | port 4 | B | out | | flow 2 | cap 1 |
| 01:01:01:008 | 110.1 | 120.1-10 | L0095 | r003 | IP5 | IP6 | port 5 | port 6 | C | out | | flow 3 | cap 2 |
| 01:01:01:013 | 110.1 | 120.1-7 | L0104 | r004 | IP7 | IP8 | port 7 | port 8 | B | out | | flow 4 | cap 3 |
| ... | ... | ... | ... | ... | ... | ... | ... | ... | ... | ... | | ... | ... |
| 02:11:23:004 | 110.1 | 120.1-5 | L0209 | r005 | IP9 | IP10 | port 7 | port 4 | B | out | | flow 5 | cap 4 |
| 02:11:23:287 | 110.1 | 120.1-2 | L0214 | r002 | IP3 | IP4 | port 3 | port 4 | B | out | | flow 6 | cap 5 |
| 02:11:23:871 | 110.1 | 120.1-8 | L0216 | r006 | IP11 | IP9 | port 4 | port 7 | B | in | | flow 7 | 0 |
| ... | ... | ... | ... | ... | ... | ... | ... | ... | ... | ... | | ... | ... |
| 04:37:15:412 | 110.1 | 120.1-13 | L0579 | r007 | IP12 | IP14 | port 9 | port 10 | C | in | | flow 8 | cap 6 |
| 04:37:15:665 | 110.1 | 120.1-5 | L0581 | r002 | IP23 | IP4 | port 3 | port 4 | B | out | | flow 9 | cap 7 |
| 04:37:17:023 | 110.1 | 120.1-22 | L0595 | r008 | IP7 | IP15 | port 11 | port 12 | B | out | | flow 10 | cap 8 |
| ... | ... | ... | ... | ... | ... | ... | ... | ... | ... | ... | | ... | ... |
| 17:45:20:352 | 110.1 | 120.1-14 | L1584 | r009 | IP3 | IP16 | port 13 | port 14 | B | out | | flow 11 | cap 9 |
| 17:45:22:776 | 110.1 | 120.1-21 | L1593 | r002 | IP3 | IP4 | port 3 | port 4 | B | out | | flow 12 | cap 10 |
| 17:45:23:047 | 110.1 | 120.1-3 | L1603 | r010 | IP7 | IP17 | port 15 | port 16 | B | out | | flow 13 | cap 11 |
| ... | ... | ... | ... | ... | ... | ... | ... | ... | ... | ... | | ... | ... |
| 18:02:15:992 | 110.1 | 120.1-11 | L1702 | r011 | IP18 | IP7 | port 17 | port 18 | B | in | | flow 14 | 0 |
| 18:02:16:121 | 110.1 | 120.1-14 | L1706 | r002 | IP23 | IP4 | port 3 | port 4 | B | out | | flow 15 | cap 12 |
| 18:02:17:476 | 110.1 | 120.1-6 | L1710 | r012 | IP18 | IP3 | port19 | port 20 | B | in | | flow 16 | cap 13 |
| ... | ... | ... | ... | ... | ... | ... | ... | ... | ... | ... | | ... | ... |

| | time | PSG_id | Host_id | Log_id | Rule_id | S_addr | D_addr | S_port | D_port | Prot. | Dir. | ... | \<additional column(s)\> | ... | Flow_id | Pcapld |
|---|---|---|---|---|---|---|---|---|---|---|---|---|---|---|---|---|
| | ... | ... | ... | ... | ... | ... | ... | ... | ... | ... | ... | ... | | ... | ... | ... |
| a → | 01:01:00:877 | 100.n | 120.n-5 | L0073 | r002 | IP23 | IP4 | port 3 | port 8 | B | out | | | | flow 18 | cap 1 |
| b → | 01:01:01:001 | 110.1 | 120.1-1 | L0086 | r002 | IP3 | IP4 | port 3 | port 4 | B | out | | | | flow 2 | cap 14 |
| c → | 01:27:19:331 | 100.n | 120.n-3 | L0142 | r002 | IP3 | IP4 | port 3 | port 3 | B | out | | | | flow 19 | cap 15 |
| d → | 01:31:57:339 | 100.n | 120.n-22 | L0147 | r002 | IP33 | IP 24 | port 3 | port 4 | D | out | | | | null | cap 16 |
| | ... | ... | ... | ... | ... | ... | ... | ... | ... | ... | ... | ... | | ... | ... | ... |
| e → | 01:59:17:835 | 100.n | 120.n-7 | L0191 | r002 | IP3 | IP4 | port 3 | port 4 | B | out | | | | flow 20 | cap 17 |
| f → | 02:11:23:287 | 110.1 | 120.1-2 | L0214 | r002 | IP3 | IP4 | port 3 | port 4 | B | out | | | | flow 6 | cap 5 |
| g → | 02:11:31:229 | 110.n | 120.n-11 | L0221 | r002 | IP3 | IP4 | port 3 | port 4 | B | out | | | | flow 21 | cap 18 |
| h → | 04:32:43:746 | 110.1 | 120.1-19 | L0526 | r002 | IP3 | IP4 | port 3 | port 4 | B | out | | | | flow 22 | cap 19 |
| i → | 04:35:21:934 | 110.n | 120.n-6 | L0571 | r002 | IP3 | IP4 | port 3 | port 4 | B | out | | | | flow 23 | cap 20 |
| j → | 04:37:15:665 | 110.1 | 120.1-5 | L0581 | r002 | IP23 | IP4 | port 3 | port 4 | B | out | | | | flow 9 | cap 7 |
| k → | 04:37:18:032 | 110.1 | 120.1-9 | L0601 | r002 | IP3 | IP4 | port 3 | port 4 | B | out | | | | flow 24 | cap 21 |
| | ... | ... | ... | ... | ... | ... | ... | ... | ... | ... | ... | ... | | ... | ... | ... |
| l → | 17:42:09:956 | 110.n | 120.n-10 | L1572 | r002 | IP3 | IP4 | port 3 | port 4 | B | out | | | | flow 25 | cap 22 |
| m → | 17:45:22:776 | 110.1 | 120.1-21 | L1593 | r002 | IP3 | IP4 | port 3 | port 4 | B | out | | | | flow 12 | cap 10 |
| n → | 17:52:30:491 | 110.n | 120.n-2 | L1648 | r002 | IP33 | IP24 | port 21 | port 22 | B | out | | | | flow 26 | cap 23 |
| o → | 18:02:16:121 | 110.1 | 120.1-14 | L1706 | r002 | IP23 | IP4 | port 3 | port 4 | B | out | | | | flow 15 | cap 12 |
| | ... | ... | ... | ... | ... | ... | ... | ... | ... | ... | ... | ... | | ... | ... | ... |
| p → | 22:19:41:430 | 110.n | 120.n-3 | L3040 | r002 | IP3 | IP4 | port 3 | port 4 | B | out | | | | flow 27 | cap 24 |
| q → | 22:21:08:497 | 110.n | 120.n-12 | L3077 | r002 | IP4 | IP3 | port 4 | port 3 | B | in | | | | flow 28 | cap 25 |
| | | | | | | | | | | | ... | | | | ... | ... |

| | time | PSG_id | Host_id | Log_id | Rule_id | S_addr | D_addr | S_port | D_port | Prot. | Dir. | ... | DN | ... | Flow_id | Pcapld |
|---|---|---|---|---|---|---|---|---|---|---|---|---|---|---|---|---|
| a | 01:01:00:877 | 100.n | 120.n-5 | L0073 | r002 | IP23 | IP4 | port 3 | port 8 | B | out | | www.ndgfare3.com | | flow 18 | cap 1 |
| b | 01:01:01:001 | 110.1 | 120.1-1 | L0086 | r002 | IP3 | IP4 | port 3 | port 4 | B | out | | www.asrxqyt2.com | | flow 2 | cap 14 |
| c | 01:27:19:331 | 100.n | 120.n-3 | L0142 | r002 | IP3 | IP4 | port 3 | port 3 | B | out | | www.asrxqyt2.com | | flow 19 | cap 15 |
| d | 01:31:57:339 | 100.n | 120.1-22 | L0147 | r002 | IP33 | IP 24 | port 3 | port 4 | D | out | | null | | null | cap 16 |
| | ... | | ... | | ... | | ... | | ... | ... | ... | | ... | | ... | ... |
| e | 01:59:17:835 | 100.n | 120.n-7 | L0191 | r002 | IP3 | IP4 | port 3 | port 4 | B | out | | www.asrxqyt2.com | | flow 20 | cap 17 |
| f | 02:11:23:287 | 110.1 | 120.1-2 | L0214 | r002 | IP3 | IP4 | port 3 | port 4 | B | out | | www.kxoidcxe.com | | flow 6 | cap 5 |
| g | 02:11:31:229 | 110.n | 120.n-11 | L0221 | r002 | IP3 | IP4 | port 3 | port 4 | B | out | | www.asrxqyt2.com | | flow 21 | cap 18 |
| h | 04:32:43:746 | 110.1 | 120.1-19 | L0526 | r002 | IP3 | IP4 | port 3 | port 4 | B | out | | www.ndgfare3.com | | flow 22 | cap 19 |
| i | 04:35:21:934 | 110.n | 120.n-6 | L0571 | r002 | IP3 | IP4 | port 3 | port 4 | B | out | | www.asrxqyt2.com | | flow 23 | cap 20 |
| j | 04:37:15:665 | 110.1 | 120.1-5 | L0581 | r002 | IP23 | IP4 | port 3 | port 4 | B | out | | www.kxoidcxe.com | | flow 7 | cap 7 |
| k | 04:37:18:032 | 110.1 | 120.1-9 | L0601 | r002 | IP3 | IP4 | port 3 | port 4 | B | out | | www.ndgfare3.com | | flow 24 | cap 21 |
| | ... | | | | | | | | | ... | ... | | | | | |
| l | 17:42:09:956 | 110.n | 120.n-10 | L1572 | r002 | IP3 | IP4 | port 3 | port 4 | B | out | | www.kxoidcxe.com | | flow 25 | cap 22 |
| m | 17:45:22:776 | 110.1 | 120.1-21 | L1593 | r002 | IP3 | IP4 | port 3 | port 4 | B | out | | www.ndgfare3.com | | flow 12 | cap 10 |
| n | 17:52:30:491 | 110.n | 120.n-2 | L1648 | r002 | IP33 | IP24 | port 21 | port 22 | B | out | | www.asrxqyt2.com | | flow 26 | cap 23 |
| o | 18:02:16:121 | 110.1 | 120.1-14 | L1706 | r002 | IP23 | IP4 | port 3 | port 4 | B | out | | www.kxoidcxe.com | | flow 15 | cap 12 |
| | ... | | | | | | | | | ... | ... | | ... | | | |
| p | 22:19:41:430 | 110.n | 120.n-3 | L3040 | r002 | IP3 | IP4 | port 3 | port 4 | B | out | | www.kxoidcxe.com | | flow 27 | cap 24 |
| q | 22:21:08:497 | 110.1 | 120.n-12 | L3077 | r002 | IP4 | IP3 | port 4 | port 3 | B | in | | null | | flow 28 | cap 25 |

| | time | PSG_id | Host_id | Log_id | Rule_id | S_addr | D_addr | S_port | D_port | Prot. | Dir. | ... | Protocol Error | ... | Flow_id | Pcap_id |
|---|---|---|---|---|---|---|---|---|---|---|---|---|---|---|---|---|
| a | 01:01:00:877 | 100.n | 120.n-5 | L0073 | r002 | IP23 | IP4 | port 3 | port 8 | B | out | ... | syntax error | ... | flow 18 | cap 1 |
| b | 01:01:01:001 | 110.1 | 120.1-1 | L0086 | r002 | IP3 | IP4 | port 3 | port 4 | B | out | ... | ok | ... | flow 2 | cap 14 |
| c | 01:27:19:331 | 100.n | 120.n-3 | L0142 | r002 | IP3 | IP4 | port 3 | port 3 | B | out | ... | ok | ... | flow 19 | cap 15 |
| d | 01:31:57:339 | 100.n | 120.n-22 | L0147 | r002 | IP33 | IP 24 | port 3 | port 4 | D | out | ... | ok | ... | null | cap 16 |
| | ... | ... | ... | ... | ... | ... | ... | ... | ... | ... | ... | ... | ... | ... | ... | ... |
| e | 01:59:17:835 | 100.n | 120.n-7 | L0191 | r002 | IP3 | IP4 | port 3 | port 4 | B | out | ... | ok | ... | flow 20 | cap 17 |
| f | 02:11:23:287 | 110.1 | 120.1-2 | L0214 | r002 | IP3 | IP4 | port 3 | port 4 | B | out | ... | syntax error | ... | flow 6 | cap 5 |
| g | 02:11:31:229 | 110.n | 120.n-11 | L0221 | r002 | IP3 | IP4 | port 3 | port 4 | B | out | ... | syntax error | ... | flow 21 | cap 18 |
| h | 04:32:43:746 | 110.1 | 120.1-19 | L0526 | r002 | IP3 | IP4 | port 3 | port 4 | B | out | ... | ok | ... | flow 22 | cap 19 |
| i | 04:35:21:934 | 110.n | 120.n-6 | L0571 | r002 | IP3 | IP4 | port 3 | port 4 | B | out | ... | ok | ... | flow 23 | cap 20 |
| j | 04:37:15:665 | 110.1 | 120.1-5 | L0581 | r002 | IP23 | IP4 | port 3 | port 4 | B | out | ... | syntax error | ... | flow 9 | cap 7 |
| k | 04:37:18:032 | 110.1 | 120.1-9 | L0601 | r002 | IP3 | IP4 | port 3 | port 4 | B | out | ... | syntax error | ... | flow 24 | cap 21 |
| | ... | ... | ... | ... | ... | ... | ... | ... | ... | ... | ... | ... | ... | ... | ... | ... |
| l | 17:42:09:956 | 110.n | 120.n-10 | L1572 | r002 | IP3 | IP4 | port 3 | port 4 | B | out | ... | syntax error | ... | flow 25 | cap 22 |
| m | 17:45:22:776 | 110.1 | 120.1-21 | L1593 | r002 | IP3 | IP4 | port 3 | port 4 | B | out | ... | syntax error | ... | flow 12 | cap 10 |
| n | 17:52:30:491 | 110.n | 120.n-2 | L1648 | r002 | IP33 | IP24 | port 21 | port 22 | B | out | ... | ok | ... | flow 26 | cap 23 |
| o | 18:02:16:121 | 110.1 | 120.1-14 | L1706 | r002 | IP23 | IP4 | port 3 | port 4 | B | out | ... | ok | ... | flow 15 | cap 12 |
| | ... | ... | ... | ... | ... | ... | ... | ... | ... | ... | ... | ... | ... | ... | ... | ... |
| p | 22:19:41:430 | 110.n | 120.n-3 | L3040 | r002 | IP3 | IP4 | port 3 | port 4 | B | out | ... | ok | ... | flow 27 | cap 24 |
| q | 22:21:08:497 | 110.n | 120.n-12 | L3077 | r002 | IP4 | IP3 | port 4 | port 3 | B | in | ... | ok | ... | flow 28 | cap 25 |

| | time | PSG_id | Host_id | Log_id | Rule_id | S_addr | D_addr | S_port | D_port | Prot. | Dir. | ... | CA | ... | Flow_id | Pcap Id |
|---|---|---|---|---|---|---|---|---|---|---|---|---|---|---|---|---|
| a | 01:01:00:877 | 100.n | 120.n-5 | L0073 | r002 | IP23 | IP4 | port 3 | port 8 | B | out | | trustycerta.com | | flow 18 | cap 1 |
| b | 01:01:01:001 | 110.1 | 120.1-1 | L0086 | r002 | IP3 | IP4 | port 3 | port 4 | B | out | | noworriescert.com | | flow 2 | cap 14 |
| c | 01:27:19:331 | 100.n | 120.n-3 | L0142 | r002 | IP3 | IP4 | port 3 | port 3 | B | out | | dodgycertauth.com | | flow 19 | cap 15 |
| d | 01:31:57:339 | 100.n | 120.n-22 | L0147 | r002 | IP33 | IP 24 | port 3 | port 4 | D | out | | null | | null | cap 16 |
| | ... | ... | ... | ... | ... | ... | ... | ... | ... | ... | ... | | ... | | ... | ... |
| e | 01:59:17:835 | 100.n | 120.n-7 | L0191 | r002 | IP3 | IP4 | port 3 | port 4 | B | out | | trustycerta.com | | flow 20 | cap 17 |
| f | 02:11:23:287 | 110.1 | 120.1-2 | L0214 | r002 | IP3 | IP4 | port 3 | port 4 | B | out | | trustycerta.com | | flow 6 | cap 5 |
| g | 02:11:31:229 | 110.n | 120.n-11 | L0221 | r002 | IP3 | IP4 | port 3 | port 4 | B | out | | dodgycertauth.com | | flow 21 | cap 18 |
| h | 04:32:43:746 | 110.1 | 120.1-19 | L0526 | r002 | IP3 | IP4 | port 3 | port 4 | B | out | | trustycerta.com | | flow 22 | cap 19 |
| i | 04:35:21:934 | 110.n | 120.n-6 | L0571 | r002 | IP3 | IP4 | port 3 | port 4 | B | out | | noworriescert.com | | flow 23 | cap 20 |
| j | 04:37:15:665 | 110.1 | 120.1-5 | L0581 | r002 | IP23 | IP4 | port 3 | port 4 | B | out | | trustycerta.com | | flow 9 | cap 7 |
| k | 04:37:18:032 | 110.1 | 120.1-9 | L0601 | r002 | IP3 | IP4 | port 3 | port 4 | B | out | | dodgycertauth.com | | flow 24 | cap 21 |
| | ... | ... | ... | ... | ... | ... | ... | ... | ... | ... | ... | | ... | | ... | ... |
| l | 17:42:09:956 | 110.n | 120.n-10 | L1572 | r002 | IP3 | IP4 | port 3 | port 4 | B | out | | noworriescert.com | | flow 25 | cap 22 |
| m | 17:45:22:776 | 110.1 | 120.1-21 | L1593 | r002 | IP3 | IP4 | port 3 | port 4 | B | out | | trustycerta.com | | flow 12 | cap 10 |
| n | 17:52:30:491 | 110.n | 120.n-2 | L1648 | r002 | IP33 | IP24 | port 21 | port 22 | B | out | | dodgycertauth.com | | flow 26 | cap 23 |
| o | 18:02:16:121 | 110.1 | 120.1-14 | L1706 | r002 | IP23 | IP4 | port 3 | port 4 | B | out | | trustycerta.com | | flow 15 | cap 12 |
| | ... | ... | ... | ... | ... | ... | ... | ... | ... | ... | ... | | ... | | ... | ... |
| p | 22:19:41:430 | 110.n | 120.n-3 | L3040 | r002 | IP3 | IP4 | port 3 | port 4 | B | out | | noworriescert.com | | flow 27 | cap 24 |
| q | 22:21:08:497 | 110.1 | 120.n-12 | L3077 | r002 | IP4 | IP3 | port 4 | port 3 | B | in | | trustycerta.com | | flow 28 | cap 25 |

FIG. 5D

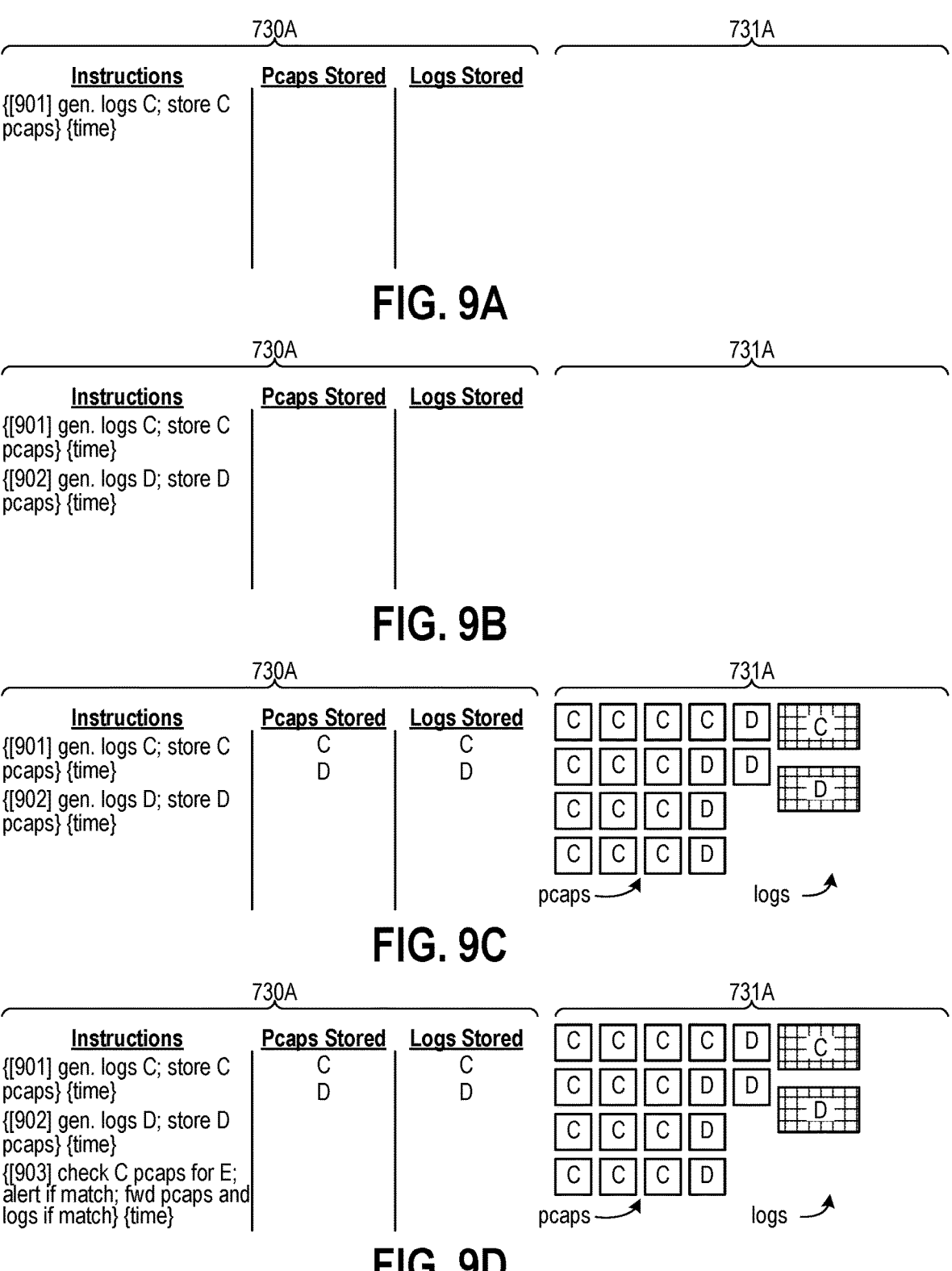

730A

| Instructions | Pcaps Stored | Logs Stored |
|---|---|---|
| {[901] gen. logs C; store C pcaps} {time} | | |

| Instructions | Pcaps Stored | Logs Stored |
|---|---|---|
| {[901] gen. logs C; store C pcaps} {time} | | |
| {[902] gen. logs D; store D pcaps} {time} | | |

| Instructions | Pcaps Stored | Logs Stored |
|---|---|---|
| {[901] gen. logs C; store C pcaps} {time} | C | C |
| {[902] gen. logs D; store D pcaps} {time} | D | D |

731A pcaps          logs

| Instructions | Pcaps Stored | Logs Stored |
|---|---|---|
| {[901] gen. logs C; store C pcaps} {time} | C | C |
| {[902] gen. logs D; store D pcaps} {time} | D | D |
| {[903] check C pcaps for E; alert if match; fwd pcaps and logs if match} {time} | | |

731A pcaps          logs

FIG. 9D

[1001] CTI 1000.1 – (C)

[1008] CTI 1000.2 – (D)

[1021] CTI 1000.3 – (E)

System 730B

[1002] monitor for C

[1009] monitor for D

[1022] check for E

DB 731A

[1016] index/store

[1024] pcaps (C)

[1026] index/store

System 730A

[1003] update instruction list

[1004] instruction (C; gen. logs; pcap)

[1010] update instruction list

[1011] instruction (C; gen. logs; pcap)

[1015] logs (C), pcaps (C); logs (D), pcaps (D)

[1017] check against instructions

[1023] update instruction list

[1025] update logs based on pcaps (C)

FW 153

SIEM 702

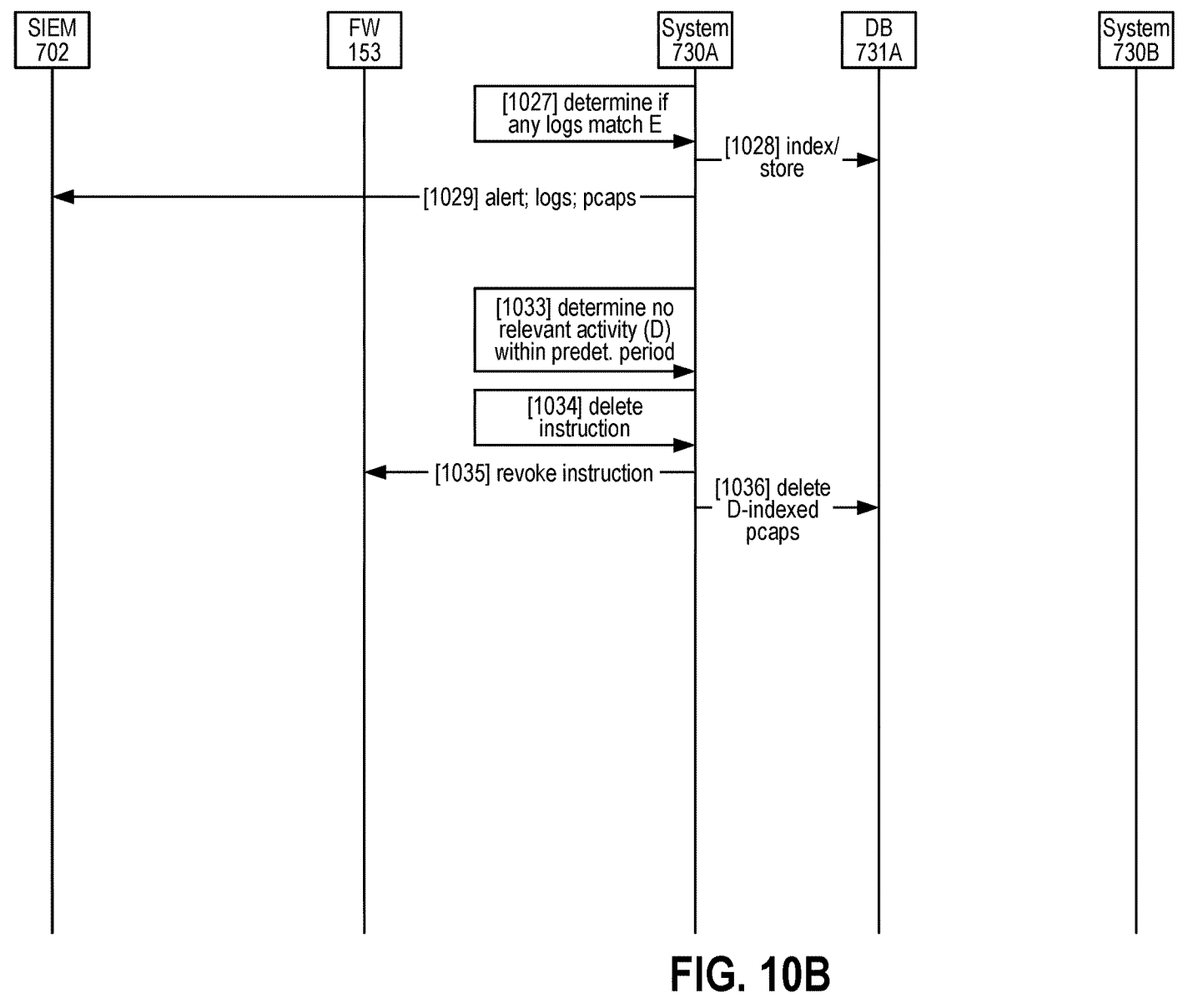

System 730B

DB 731A

[1028] index/ store

System 730A

[1027] determine if any logs match E

[1029] alert; logs; pcaps

[1033] determine no relevant activity (D) within predet. period

[1034] delete instruction

[1035] revoke instruction

[1036] delete D-indexed pcaps

FW 153

SIEM 702

FIG. 10B

SYSTEMS AND METHODS FOR CYBER THREAT DETECTION BASED ON NEW AND/OR UPDATED CYBER THREAT INTELLIGENCE

CROSS-REFERENCE TO RELATED APPLICATIONS

This application claims priority to U.S. provisional patent application Ser. No. 63/430,479, filed Dec. 6, 2022, and also claims priority to U.S. provisional patent application Ser. No. 63/391,987, filed Jul. 25, 2022. Each of application Ser. No. 63/430,479 and application Ser. No. 63/391,987, in its entirety, is incorporated by reference herein.

BACKGROUND

Threats to security of a computer network may take a variety of forms (e.g., attempts to cause unauthorized data transfers, hacking attempts, viruses, bots, other types of malware, etc.). The scope of such threats continues to expand, as do the efforts of malicious actors to exploit weaknesses in computer network security. Threats often involve use of the Internet to probe, access, and/or attack computers and other devices of an enterprise network that may be connected to the Internet. For example, desktop computers, mobile devices, on-premises or cloud enterprise application servers, public-facing web servers, and other types of computing devices may be directly connected to networks that are owned and/or operated and administrated by enterprises such as commercial businesses, governments, etc. These enterprise networks may in turn be connected to the Internet so that enterprise hosts may access other publicly addressed Internet-attached hosts (e.g., public-facing web servers, application servers, etc.). In some cases, such publicly addressed Internet-attached hosts may be malicious.

Enterprises may attempt to protect their networks by filtering traffic between enterprise hosts and hosts of other networks. Such filtering may attempt to analyze (e.g., collect information about), and in some cases block, packet communications that cross the boundary of an enterprise network. To determine packets for which information should be collected, which packets to block, etc., filtering devices may be configured with filtering rules that attempt to match packets to one or more criteria that are based on network threat intelligence. Those filtering rules may be generated based on network threat intelligence. Network threat intelligence may be received from numerous sources and may include a wide variety of specific or non-specific information about network threats.

Network security threats may be dynamic and may change over time. Moreover, new information about some threats may come to light as more and more independent systems detect and/or are affected by such threats. For these and other reasons, network threat intelligence regarding a given threat may be updated as the threat intelligence evolves. As that intelligence is updated, it may become more accurate and/or more detailed, may have a higher reliability, and/or may reflect an increased recognition of threat severity. As new network threat intelligence relating to a particular threat is received, filtering rules related to that threat may be updated based on the updated information in the new intelligence. Those updated rules may be applied to subsequently received packet communications to filter those communications based on improved information.

Implementing an update to a packet communication filtering rule may improve detection and/or prevention of a threat that attacks a network after such update. However, a previous attack by that same threat may not have been detected because previous filtering was based on rules created using older (and possibly less specific and/or less accurate) information. Although such previous filtering may have generated data that recorded some information about the previously-filtered packets and/or may have saved copies of previously-filtered packets, there are disincentives to applying updated threat intelligence to data obtained based on pre-update filtering. For example, in the absence of knowledge (or at least suspicion) that a protected network has experienced an obvious or ongoing attack, an analyst may not think to, or not have available resources to, apply updated threat intelligence to data from pre-update filtering. Moreover, data quantities associated with previous filtering, an ever-growing number of cyber threats, as well as the specialized skills and resources necessary to maintain awareness of when threat intelligence for a given threat has updated are further factors which may discourage retroactive application of updated threat intelligence to data generated from pre-update filtering. And because the volume of previous filtering data may be controlled by deleting older data, important data may be lost if a relationship of older data to a cyber threat is not determined before a scheduled deletion.

SUMMARY

The following presents a simplified summary in order to provide a basic understanding of some aspects of the disclosure. It is not intended to identify key or critical elements of the disclosure and is not intended to delineate the scope of the disclosure. The following summary merely presents some concepts of the disclosure in a simplified form as a prelude to the description below.

A cyber threat analysis system, which may comprise one or more servers or other computing devices, may apply updated cyber threat intelligence to packet filtering output data that was generated based on earlier cyber threat intelligence. For example, and based on receiving first cyber threat intelligence, the cyber threat analysis system may initially generate a packet filtering rule that comprises one or more criteria for filtering packet communications to detect a cyber threat addressed by the first cyber threat intelligence. The cyber threat analysis system may send that packet filtering rule, as well other rules generated based on other cyber threat intelligence and related to other cyber threats, to packet security gateways. Using those rules, the packet security gateways may filter packet communications, may generate packet filtering output data (e.g., packets logs and captured packets) for filtered packets that match criteria of those rules, and may forward that packet filtering output data to the cyber threat analysis system. After receiving second cyber threat intelligence, the cyber threat analysis system may determine that the second cyber threat intelligence and the first cyber threat intelligence may relate to the same cyber threat, and may further determine that the second cyber threat intelligence may include information that may be used to generate updated criteria associated with that same cyber threat. The updated criteria may provide additional insights into the packet filtering output data that the packet security gateways generated using filtering rules that were based on the first cyber threat intelligence. To focus application of the updated criteria on data that may be associated with the same cyber threat, the cyber threat analysis system may identify packet logs and/or captured packets that were generated using the pre-update filtering rule, for that cyber threat, that was based on the first cyber threat intelligence.

The updated criteria may comprise data configured to match new and/or changed network threat indicators (e.g., values for parameters and/or characteristics of filtered packets) associated with the cyber threat. The updated criteria may be applied by determining whether identified packet logs include values (e.g., for one or more parameters and/or characteristics of filtered packets) that match one or more of the updated criteria. The updated criteria may be applied to data in captured packets, which data may have been omitted from the packet logs corresponding to those captured packets. For example, the updated criteria may allow a determination that packets corresponding to certain packet logs do not match the updated criteria, and thus should no longer be associated with the cyber threat. Based on application of the updated criteria, and based on matches or non-matches to that updated criteria, one or more outputs may be generated.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

FIG. 4 shows an example of log data sent from a packet security gateway to a cyber threat analysis and/or mitigation system.

FIGS. 5A, 5B, 5C, and 5D show examples of composite log data.

FIGS. 9A, 9B, 9C, 9D, 9E, 9F, and 9G are diagrams showing examples of data stored at times associated with events of FIGS. 8A and 8B.

FIGS. 10A and 10B are a sequence diagram showing another example of events associated with filtering, aggregation, and/or retention control based on updated cyber threat intelligence.

DETAILED DESCRIPTION

Figure 1:
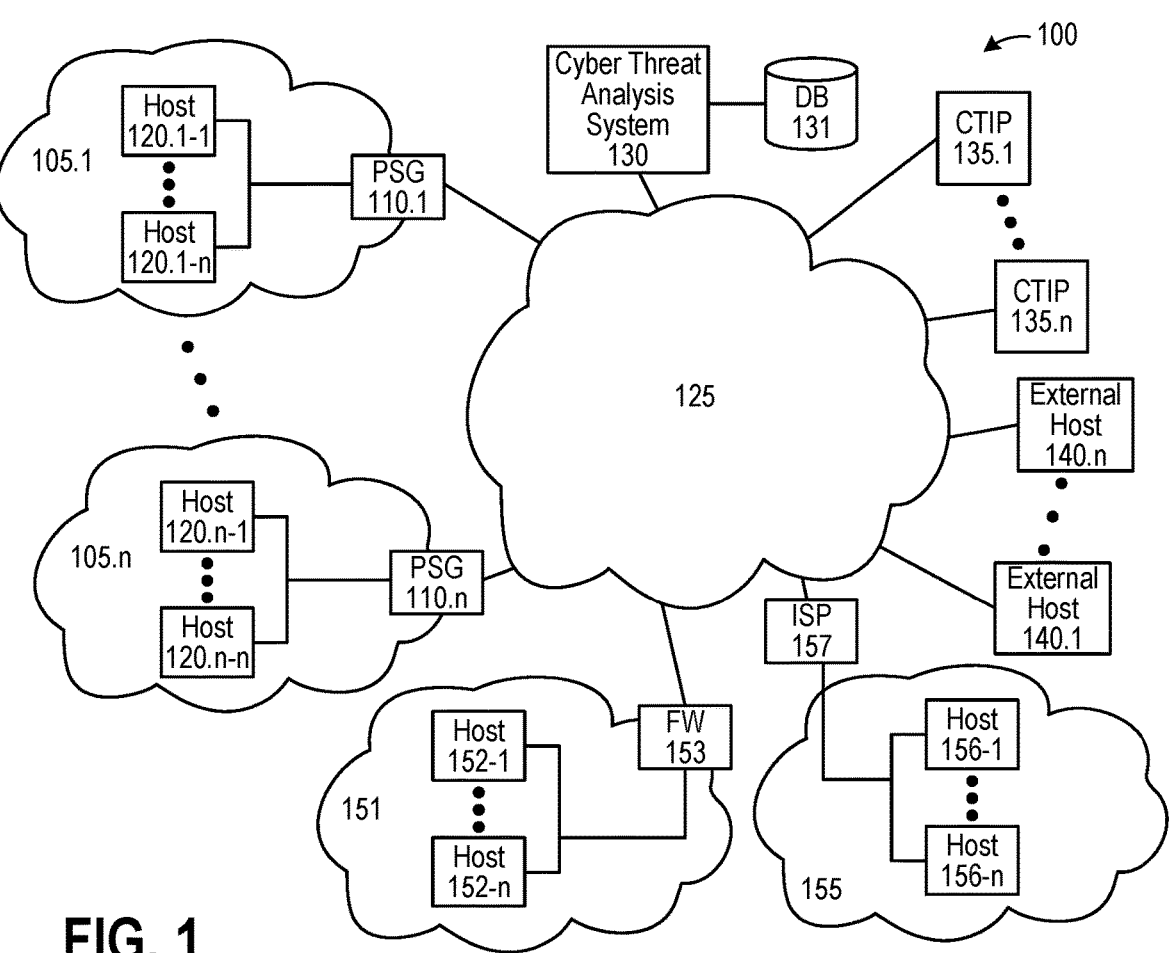
FIG. 1 is a diagram showing an example environment associated with detection and/or analysis of cyber threats based on updated cyber threat intelligence.

A cyber threat may comprise an effort, or a suspected effort, by one or more threat actors to take some type of unauthorized action affecting computing devices and/or a network of a targeted entity. Threat actors may comprise criminals, criminal organizations, nation states, or other persons or groups. Unauthorized action may comprise damaging and/or disabling equipment (e.g., ransomware, hacking of networked control systems to disable and/or damage industrial equipment), accessing and/or stealing data (e.g., exfiltration), causing a computing device and/or network to perform operations to benefit a threat actor (e.g., bots to generate spam, mine cryptocurrency, perform denial of service attacks, etc.), and/or any other type of action that is unauthorized by the targeted entity. Without in any way limiting the generality of the foregoing, cyber threats may comprise viruses and other malware, phishing attacks, attempts to hack web servers, etc.

Cyber threat intelligence (CTI) may comprise information about a cyber threat. Such information may relate to the nature of the threat. For example, CTI may indicate that a threat involves a virus or other malware, a bot, a phishing attack, an exfiltration, a hacking attempt, and/or some other type of activity that is known or suspected. CTI may comprise information about threat actors associated with, or suspected to be associated with, a cyber threat. CTI may comprise a network threat indicator (NTI), or a plurality of NTIs, associated with a cyber threat. An NTI may comprise one or more values for, and/or some other indication of, a parameter or characteristic that is observable in connection with packet data communicated via a network. For example, NTIs may comprise 5-tuple values (host/resource identifiers specifying L3 host IP addresses, L4 ports, and/or associated L3 protocol types) or a portion thereof, one or more other L3 header field values or a portion thereof, one or more other L4 header field values or a portion thereof, one or more L2 header field values or a portion thereof, a protocol version, a host name or a portion thereof, a domain name (e.g., a fully qualified domain name (FQDN)), a portion of a domain name (e.g., a top-level domain and/or subdomain), a universal resource identifier (URI) or a portion thereof, a universal resource locator (URL) or a portion thereof, a certificate or portion thereof, a certificate identifier or a portion thereof, a certificate authority identifier or a portion thereof, a size of a packet or of a portion of a packet, an indicator associated with a data payload portion of a packet, an HTTP request method type (e.g., GET, PUT, PUSH, CONNECT, etc.), etc. An NTI may comprise metadata relating to one or more packets. For example, an NTI may comprise one or more types of information relating to one or more parameters or characteristics that are observable based on behavior of (or action resulting from) a packet and/or a collection of packets. For example, an NTI may comprise a time associated with communicating a packet, whether the packet has a specified temporal or other relation to one or more other packets, directionality (e.g., incoming or outgoing), etc. An NTI may comprise information indicating a protocol decoder (e.g., instructions) and/or a packet payload inspection algorithm. An NTI may relate to a flow and may indicate a packet count or other information for a flow. A flow, or a microflow, may refer to a collection of packets with the same 5-tuple values generated by the same (e.g., single) event/action at a sourcing host. A flow may be unidirectional (e.g., packets flowing from a first host as source to a second host as destination) or bidirectional (e.g., packets flowing from the first host as source to the second host as destination and packets flowing from the second host as source to the first host as destination). The packets of a bidirectional flow may have the same 5-tuple values, but may have the source and destination field values transposed depending on the direction of the packet (e.g., from client-to-server, or from server-to-client). A flow may comprise an application-layer flow, which may be distributed across multiple L3/L4 flows and their associated packets.

CTI may be received, from one or more sources, as CTI data in any of a variety of forms. CTI data may comprise a report from a provider of CTI. CTI data may comprise data that is delivered (e.g., in real-time) via an application programming interface (API), a text file, data downloaded from an open source resource, and/or other types of data, and may be in any format. CTI data may be received from external sources (e.g., CTI providers described below) or from internal sources. For example, the cyber threat analysis system 130 described below may generate CTI data (e.g., based on CTI data received from other sources and/or based on network traffic and/or behavior observed by the cyber threat analysis system 130). CTI data may explicitly identify one or more NTIs, and/or NTIs may be derivable from information in CTI data. CTI data and CTI may be, and often are, incomplete. For example, CTI data may comprise one type of NTI for a cyber threat, but may lack other types of NTIs and/or may lack threat context associated with one or more NTIs indicated by the CTI data. Over time, as more is learned about a cyber threat, new CTI for that threat may comprise additional types of NTIs and/or changes to NTIs provided in previous CTI for that threat. A change to NTIs may result in later CTI data including an NTI not included in earlier CTI data, and/or later CTI data not including an NTI included in earlier CTI data. CTI may comprise a threat level that has a value indicating a confidence value associated with a cyber threat. Also or alternatively, a threat level for a particular cyber threat may be determined, assigned, and/or modified based on analysis of CTI for a particular threat. A threat level may, for example indicate a level of confidence in the accuracy of CTI and/or a likelihood of a threat being an actual threat. Also or alternatively, a threat level may indicate a potential severity of a cyber threat (e.g., a quantitative and/or qualitative estimate of potential data loss, damage, business interruption, or other possible effects of the cyber threat). A threat level associated with a cyber threat may increase (or decrease) over time. Threat level and context for CTI (and/or an NTI) may be time-specific (e.g., may depend on specific time range for relevance).

In general, CTI for a given cyber threat may evolve and/or otherwise change over time. As more information is learned about a particular cyber threat, CTI regarding that threat may become more accurate and/or reliable. Conversely, older CTI may become (or have become) less reliable. For example, the older CTI may have indicated that the cyber threat was less severe and/or less of a concern, but later CTI may indicate that the cyber threat is more of a problem than was originally believed. As another example, the older CTI may have provided certain information (e.g., one or more NTIs) for detecting the cyber threat, but some of that information may later be determined to be inapplicable and/or not relevant, and the later CTI may include more focused and/or more accurate information. As a further example, threat actors may change methods used to attack networks (e.g., to camouflage their later attempts or otherwise avoiding repeating behaviors that network security systems are likely to identify), and later CTI may indicate new and/or changed NTIs and/or other information relating to changed attack methods.

CTI may be used to create packet filtering rules for packet security gateways. Packet filtering rules may be used to filter data packets that traverse the packet security gateways. Filtering of packets may comprise comparing criteria of the packet filtering rules to the observable parameters and/or characteristics of the filtered packets and determining if there are any matches. Criteria of packet filtering rules may be based on NTI and/or other information obtained from CTI (and/or may comprise other criteria). For example, if CTI indicates (e.g., by providing values for) certain NTIs that may be associated with a cyber threat, packet filtering rule criteria based on that CTI may comprise information (e.g., values for those NTIs) that may be compared against packets to determine if those NTIs are present in the packets. Various types of packet filtering output data may result from the filtering process. For example, packet filtering gateways may generate log data in which each packet log (e.g., each individual data record) may correspond to an individual packet and may comprise various data fields that indicate values for various parameters and/or characteristics of that packet. These packet logs from packet filtering gateways, which may be distinct from logs generated by other types of devices (e.g., firewalls) that may create logs for all traffic, may be generated for packets that match filtering criteria of packet filtering rules. One or more values in a packet log may comprise a value that matched filtering criteria from a filtering rule (e.g., may comprise a value that matched one or more NTIs from one or more filtering rule criteria associated with the packet log). A packet log may be a flow-level log (e.g., an L3/L4-level flow log, L5-L7 application/application-flow logs) that may comprise a collection of packet logs for individual packets. In addition to log data, packet filtering output data may comprise captured packets. Captured packets may be copies of packets corresponding to one or more packet logs.

Based on received updated CTI for a particular cyber threat, packet matching criteria of packet filtering rules associated with that cyber threat may also be updated. Updated packet matching criteria may comprise information used to match a type of NTI different from a type of NTI matched by earlier packet matching criteria. For example, earlier criteria may match an NTI that specifies a network address (or range of network addresses), and updated criteria may match an NTI that specifies a domain name. Updated packet matching criteria may comprise information used to match a type of NTI that is the same as a type of NTI matched by earlier packet matching criteria, but that may have a different value. For example, earlier criteria may match an NTI that specifies a range of network addresses, and updated criteria may match an NTI that specifies a different range of network addresses or that specifies a specific network address.

As new CTI is received for a cyber threat, there may be significant benefits to applying that new CTI to existing packet filtering output data (e.g., log data and/or captured packets) that was collected based on older CTI. For example, applying the new CTI to existing packet filtering output data may provide a more accurate assessment of whether a network was impacted by the cyber threat during a period preceding the new CTI. Applying newer CTI to existing packet filtering output data may also reveal additional information that may improve future detection and/or prevention of a cyber threat addressed by the newer CTI. Application of newer CTI to existing packet filtering output data may also reduce resources needed to store that data. For example, portions of that existing packet filtering output data may be determined less relevant, and it may thus be appropriate to delete such data or to reduce the amount of time that it is to be kept.

Applying newer CTI to existing packet filtering output data (e.g., log data and/or captured packets) presents various challenges, however. Both the amount of packet filtering output data and the amount of new CTI may continuously grow at substantial rates. Applying an expanding quantity of new CTI to an expanding quantity of existing packet filtering output data may be impractical, if not impossible. However, at least some of these challenges may be addressed by using earlier CTI related to a particular cyber threat to guide application of newer CTI to existing packet filtering output data. If newer CTI relates to a particular cyber threat, earlier CTI relating to (or likely relating to) that cyber threat may be used to identify portions of the existing packet filtering output data that is more likely to be relevant to the cyber threat. The newer CTI may then be applied to those identified portions. This improves efficiency by avoiding waste of processing resources to apply new CTI to large amounts of packet filtering output data that is likely irrelevant to the cyber threat addressed by the new CTI.

FIG. 1 is a diagram showing an environment 100 associated with detection and/or analysis of cyber threats based on updated CTI and/or based on updated packet matching criteria corresponding to updated CTI. In FIG. 1 and subsequent drawing figures, the letter "n" is used to indicate an arbitrary integer value of 2 or more, and need not represent the same value everywhere it is used. A series of three dots is used in the drawing figures to indicate the possible presence of one or more additional elements that are similar to elements on one or both ends of the series of three dots. Various similar elements shown in the drawing figures have similar reference numbers that include appended incremental portions. Elements having a similar reference number may be collectively or generically referred to using the similar portion of the elements' reference numbers. For example, the first networks 105.1 through 105.n may be collectively referred to as the first networks 105, and an arbitrary one of those first networks 105 may be referred to as a (or the) first network 105.

As shown in FIG. 1, the environment 100 may comprise one or more first networks 105. Alternatively, the environment 100 may comprise a single first network 105. Each first network 105 may, for example, comprise one or more networks of various types (e.g., Local Area Networks (LANs), Wide Area Networks (WANs), Virtual Private Networks (VPNs), Software-Defined Networks (SDNs), or combinations thereof) associated with one or more individuals and/or entities (e.g., governments, corporations, service providers). As explained in more detail below, each of the first networks 105 may be served and/or protected by a packet security gateway (PSG 110) that is controlled by, and/or managed by, and/or interfaced with a cyber threat analysis system 130. In particular, each first network 105 may comprise one or more hosts that communicate, via a PSG 110 and a second network 125, with one or more external hosts in one or more other networks. Those external hosts may comprise any of external hosts 140.1 through 140.n and/or hosts in other networks shown in FIG. 1. One or more of the external hosts 140 may be part of networks, similar to third networks 151 and 155 described below, that communicate via the second network 125. The second network 125 may, for example, comprise the Internet or a portion thereof. The networks 105 may be protected networks (because of the presence of the PSGs 110), and networks other than the networks 105 (e.g., the second network 125) may be unprotected networks.

A host may, for example, function as a network node and/or may comprise a device connected to a network and having an L3 network address assigned to one or more network interfaces of that device. A host may comprise a computing device such as a server, a desktop computer, a laptop computer, a tablet computer, a mobile device (e.g., a smartphone), a router, a gateway, a proxy, a firewall, a switch, an access point, etc. A computing device may comprise one or more processors configured to execute instructions, memory storing executable instructions and/or other data, and one or more network interfaces via which the computing device is configured to send and/or receive data via a network. The first network 105.1 may comprise hosts 120.1-1 through 120.1-n configured to communicate, via a PSG 110.1, with one or more of the external hosts 140 and/or with one or more other external hosts. Similarly, the first network 105.n may comprise hosts 120.n-1 through 120.n-n configured to communicate, via a PSG 110.n, with one or more of the external hosts 140 and/or with one or more other external hosts. Some or all of the first networks 105 may also route external communications via other devices such as firewalls, Internet service provider (ISP) gateways, proxy servers, etc. For example, hosts in a first network 105 may comprise a firewall, proxy server, and/or other devices in a network path between other hosts in that network and a PSG 110 of that network, and/or external communications to or from a PSG 110 may be via an ISP gateway in a network path between that PSG 110 and the second network 125. The environment 100 may further include one or more third networks, such as the third networks 151 and 155, that comprise hosts configured to communicate with hosts in other networks, but that may not include a PSG 110. For example, hosts 152-1 through 152-n of the third network 151 may communicate via a firewall (FW) 153 with hosts in other networks, and hosts 156-1 through 156-n of third network 155 may communicate via an Internet service provider (ISP) server 157 with hosts in other networks.

A cyber threat analysis system 130 (hereinafter, system 130) may comprise one or more computing devices (e.g., one or more servers) configured to communicate, via the network 125, with the PSGs 110. Those communications may be direct and/or may be via one or more intermediary systems (e.g., an intermediary system that receives log data and/or captured packets from PSGs 110 and that forwards that log data and or those captured packets to the system 130 or to another system which may be queried by the system 130). As described in more detail below, those communications may comprise filtering rules, sent from the system 130 to the PSGs 110, that the PSGs may apply to data packets traversing those gateways. As also described below, those communications may also comprise packet filtering output data received from the PSGs 110. That packet filtering output data may comprise log data that comprises packet logs for packets matched to criteria of filtering rules. That packet filtering output data may also or alternatively comprise copies of matched packets (and/or of packets related to matched packets). The system 130 may further be configured to generate filtering rules based on CTI data received (e.g., via the network 125) from one or more providers of CTI. For example, and as shown in FIG. 1, the environment 100 may comprise one or more cyber threat intelligence providers (CTIPs) 135.1 through 135._n_.

A shown in FIG. 1, a PSG 110 may be located at or near a network boundary between, and the PSG 110 may be an interface between, a first network 105 and the second network 125. A PSG may, by applying filtering rules received from the system 130, filter packet data traffic traversing the PSG. That traffic may comprise packets sent from a host in the first network 105 to an external host via the second network 125, as well as packets received from an external host via the second network 125 and bound for a host in the first network 105. A filtering rule may, for example, comprise elements of filtering rules described in one or more of U.S. Pat. No. 9,866,576 (titled "Rule-Based Network-Threat Detection" and incorporated by reference herein) or U.S. Pat. App. Pub. No. 2017/0324709 (titled "Efficient Packet Capture for Cyber Threat Analysis" and incorporated by reference herein). A filtering rule may comprise information identifying a cyber threat, a threat level for the threat, and criteria that may be matched. The criteria may comprise information that can be used to match one or more NTIs associated with the threat. A packet traversing a PSG 110 may match a filtering rule if one or more criteria of that filtering rule match the corresponding parameters and/or characteristics of the packet (or of a flow or other group of packets that comprises the packet). A filtering rule may further comprise one or more operators that may be applied to packets that match the filtering rule criteria. An "allow" operator, for example, may allow the packet to continue toward its destination. As another example, a "block" operator may cause the packet to be dropped or otherwise prevented from continuing to its destination. A filtering rule may also comprise an instruction or other information that causes matching packets (and/or packets in a flow or otherwise related to a matching packet) to be captured. Capturing a packet may comprise storing a copy of the packet and/or information related to the packet. Both blocked and allowed packets may be captured. A PSG 110 may also generate packet logs based on matched packets and may send those packet logs, as well as captured packets, to the system 130.

A PSG 110 may comprise one or more processors and memory. The memory may store instructions that, when executed by the one or more processers, cause the PSG 110 to filter packets based on filtering rules (e.g., determine if packets match one or more criteria of a filtering rule, apply an operator, capture packets), to generate packet logs based on packet matches, to forward packet logs and captured packets to the system 130, to receive and store filtering rules and other instructions from the system 130, to configure or re-configure the PSG 110, and/or to carry out other operations. A PSG 110 may comprise a first interface for connecting the PSG 110 to hosts in a first network 105 and a second interface for connecting the PSG to the second network 125, which interfaces may be transparent at L2 and/or L3. In particular, those interfaces may lack assigned IP addresses or media access control (MAC) addresses, thereby permitting packets to traverse the PSG 110 without modification to L2 or L3 headers of those packets. A PSG 110 may comprise additional interfaces (e.g., a management interface) that have assigned network addresses and/or that allow the PSG 110 to communicate with the system 130 and/or with other computing devices (e.g., a host associated with an administrator or other user). A PSG 110 may comprise features of a PSG, and/or of other devices performing operations similar to those described above for a PSG 110, described in one or more of U.S. Pat. No. 9,866,576, U.S. Pat. App. Pub. No. 2017/0324709, or U.S. Pat. No. 9,137,205 (titled "Methods and Systems for Protecting a Secured Network" and incorporated by reference herein). Also or alternatively, a PSG 110 may perform functions of (and/or be incorporated into) other types of devices (e.g., firewalls, proxy servers, other devices at a boundary between networks).

Figure 2:
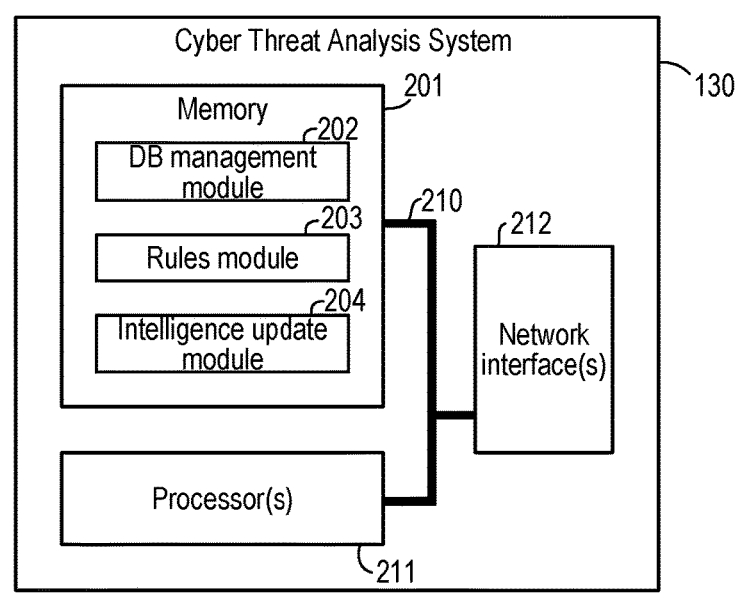
FIG. 2 is a block diagram of an example cyber threat analysis system.

FIG. 2 is a block diagram of an example of the system 130. Although shown as a single computing device (e.g., a server) for convenience, the system 130 may alternatively comprise multiple computing devices, and operations and/or functions of the system 130 described herein may be distributed among those multiple computing devices (e.g., multiple servers). If implemented as multiple computing devices, the computing devices of the system 130 may communicate via one or more networks (e.g., via one or more local networks and/or via the network 125). The system 130 may comprise memory 201. The memory 201 may comprise one or more non-transitory, physical memories of any type (e.g., volatile, non-volatile). The system 130 may further comprise one or more processors 211 and one or more network interfaces 212. The memory 201, the processor(s) 211, and the network interface(s) 212 may communicate via one or more data busses 210. The memory 201 may store instructions that, when executed by the processor(s) 211, cause the system 130 to carry out operations such as are described herein. Those instructions may be organized into and/or be parts of one or more modules. Those modules may comprise a database management module 202 that comprises instructions for storing data (e.g., CTI data from CTIPs 135 and/or other sources, filtering rules, packet logs and/or packet captures from PSGs 110) in the database 131 (which may comprise a separate computing device and/or one or more portions of the memory 201), for retrieving such data, for deleting such data, for rearranging and/or indexing such data, for updating data, etc. The modules may comprise a rules module 203 that comprises instructions for analyzing CTI data, for generating packet filtering rules based on CTI data, for communicating packet filtering rules to PSGs 110 and/or configuring packet filtering rules based on profiles (e.g., subscriber or customer profiles) associated with specific PSGs 110, etc. The modules may comprise an intelligence update module 204 storing instructions for determining that multiple CTI data relate (or may related) to the same cyber threat, for determining differences between CTI data relating to (or that may relate to) the same cyber threat, and for applying determined differences to packet logs and/or captured packets generated based on earlier versions of CTI for that cyber threat. The module 204 may also store instructions for generating reports of analyses performed by the module 204, which reports may be sent to and/or used by other systems and/or users (e.g., for forensic analysis of composite log data and/or other information, which forensic analysis may or may not be tied to improving rules used by one or more PSGs 110). The module 204 may interact with the module 203 (e.g., to cause updates to packet filtering rules based on differences between multiple CTI data for a cyber threat), with the module 202 (e.g., to cause identification and/or retrieval of packet logs and/or captured packets associated with a particular cyber threat), and/or with other modules. The network interface(s) 212 may connect the system 130 to the network 125, to the database 131, and/or to other networks for transfer of data.

Figure 3A:
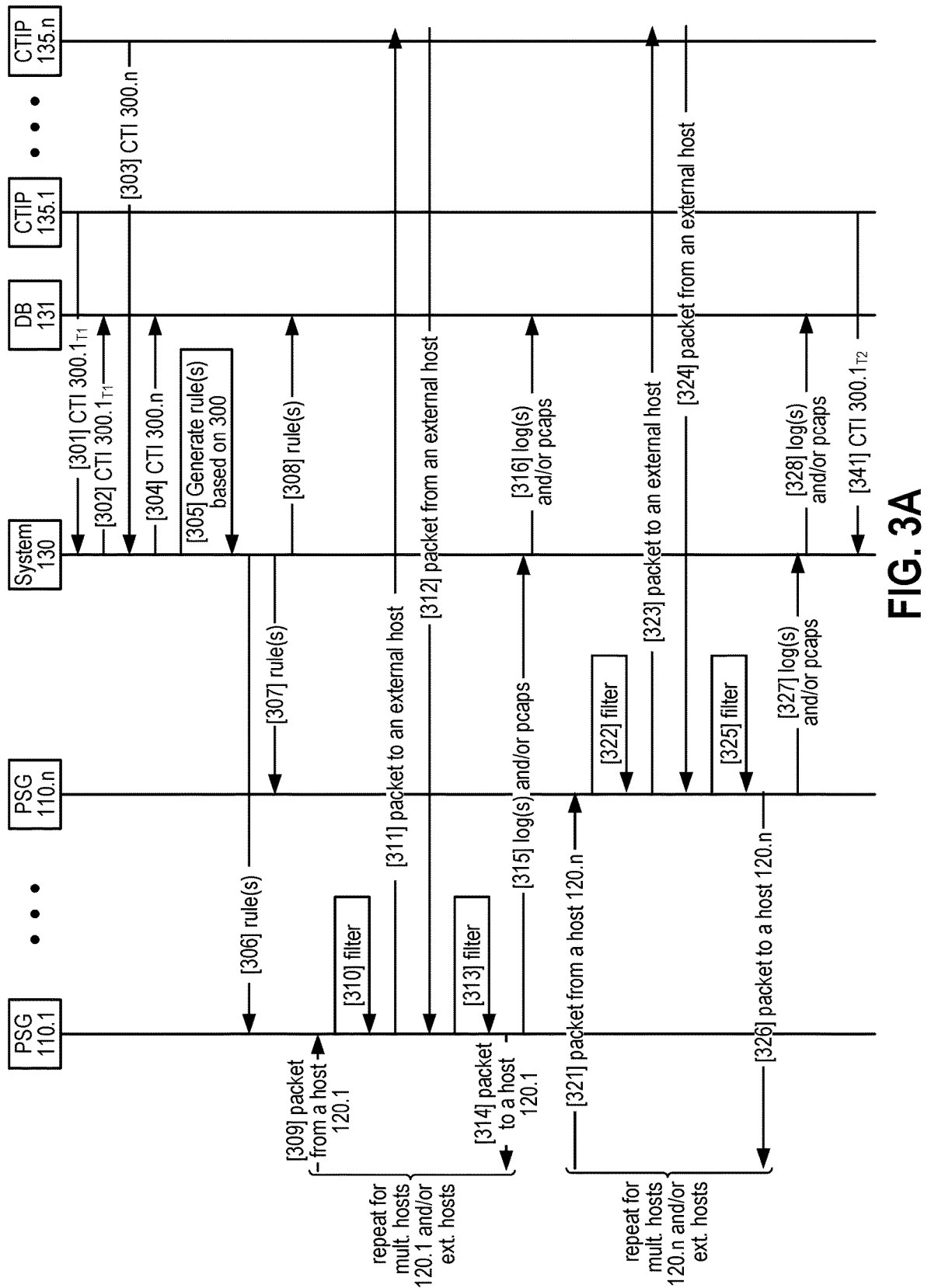
FIGS. 3A and 3B are a sequence diagram showing an example of events associated with detection and/or analysis of cyber threats based on updated cyber threat intelligence.
Figure 3B:
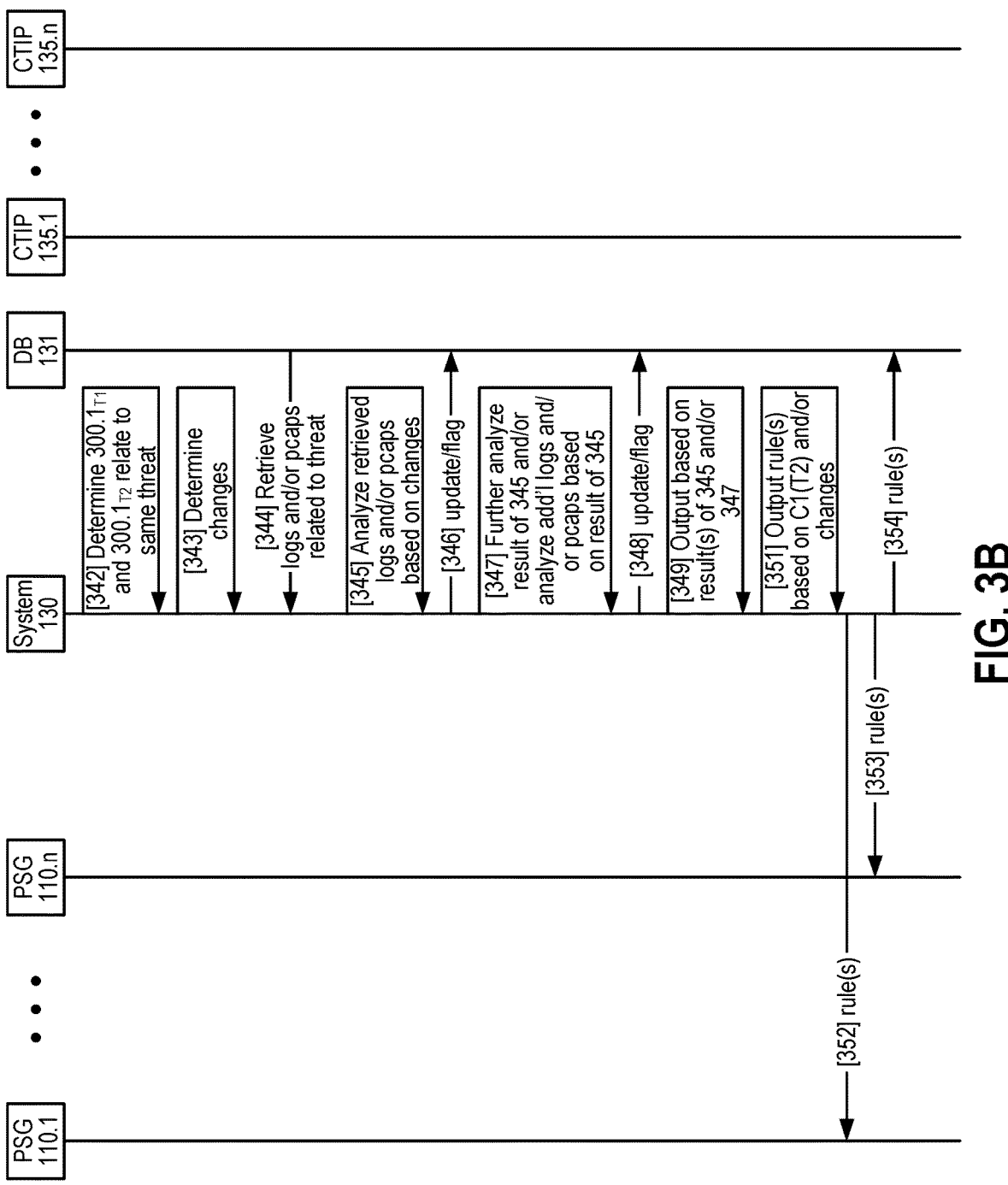

FIGS. 3A and 3B are a sequence diagram showing an example of events associated with detection and/or analysis of cyber threats based on updated CTI and/or based on updated NTIs. FIG. 3B is a continuation of FIG. 3A. The example of FIGS. 3A and 3B is simplified for purposes of explanation. The number, order, and/or timing of the example events shown may be varied, additional events may occur, and/or one or more of the events shown in FIGS. 3A and 3B may be omitted or repeated.

In event 301, the system 130 may receive CTI data from the CTIP 135.1. CTI data may comprise one or more data messages and/or files and may comprise CTI relating to one or more different cyber threats. The CTI data received in event 301 may comprise CTI 300.1$_{T1}$ that relates to a first cyber threat and that reflects the knowledge of the CTI provider 135.1 at a time T1. The CTI 300.1$_{T1}$ may indicate the nature of the first cyber threat (e.g., a type of attack that may be attempted, a suspected entity associated with the attack, a suspected source of the attack, and/or other information), or may lack any such indication. The CTI 300.1$_{T1}$ may indicate one or more NTIs associated with the first cyber threat. As explained above, an NTI may comprise one or more values for a parameter or characteristic that can be observed in one or more data packets or in connection with communication of one or more data packets. An NTI may comprise one or more specific values (e.g., a specific source and/or destination address, a specific source and/or destination port, a specific protocol, a specific domain, etc.), may comprise a range of values (e.g., a range of source and/or destination addresses, a range of source and/or destination ports, a portion of a domain), and/or may comprise a combination of multiple specific values and/or ranges of values. An NTI may comprise information that is not part of data within an actual packet, but which is observable based on how and/or when a packet may be transmitted or received. Examples of such NTIs may comprise a time (or time range) when a packet traverses a PSG 110, whether a packet traverses a PSG 110 in connection with other packets meeting one or more criteria, whether there is data present (e.g., without regard to content of that data), etc. In the example of FIG. 3A, the CTI 300.1$_{T1}$ may contain limited information about the nature of the first cyber threat, and may further comprise data that specifies or suggests that a threat level associated with the first cyber threat is low (or unknown). NTI(s) indicated by the CTI 300.1$_{T1}$ may also be limited (e.g., only a source address range and/or a destination address range). In event 302, the system 130 may store the CTI 300.1$_{T1}$ in the database 131. The system 130 may store the CTI 300.1$_{T1}$ with an identifier of the first cyber threat, which identifier may be provided as part of the CTI 300.1$_{T1}$ or generated by the system 130. Although not shown in FIG. 3A, the CTI data received at event 301 may include additional CTI for additional cyber threats, which additional CTI may also be stored in the database 131 at event 302.

The system 130 may, in a manner similar to that shown with regard to the CTI provider 135.1, receive CTI data from multiple CTI providers. For example, in event 303 the system 130 may receive data comprising CTI 300.n from the CTIP 135.n. The CTI 300.n may relate to one or more additional cyber threats and may indicate one or more NTIs and/or one or more other types of information about those additional cyber threats. In event 304, the system 130 may store the CTI 300.n, as well as other CTI received in the CTI data of event 303, in the database 131. The CTI providers 135.1 and 135.n, and/or other CTI providers, may send further CTI data to the system 130 before event 301, after event 301 and before event 303, and/or after event 303, which further CTI data may comprise further CTI (indicating NTIs and/or other information) relating to further cyber threats, which further CTI may also be stored in the database 131.

In event 305, the system 130 may generate one or more filtering rules based on the CTI 300.1$_{T1}$, the CTI 300.n, and/or other CTI received by the system 130. The rule generation of event 305 may, for example, comprise one or more operations such as are described in connection with one or more of the aforementioned patents or patent application publications. The generated filtering rule(s) may comprise one or more criteria, which criteria may comprise information to match NTIs indicated by the CTI 300.1$_{T1}$. The generated filtering rule(s) may also comprise criteria that comprise information to match one or more NTIs indicated by the CTI 300.n, and/or by other CTI received by the system 130. The filtering rule(s) may similarly comprise one or more operators and may comprise indications of whether packets matching criteria of the filtering rule(s) (and/or whether packet flows associated with such matching packets) should be captured. In the example of FIGS. 3A and 3B, a filtering rule generated in event 305 for the first cyber threat comprises criteria that comprise a range of source addresses and a range of destination address, an instruction to log source and destination addresses, source and destination ports, and protocol type for matching packets, and an instruction to capture matching packets and related packet flows. Because the first cyber threat has a low threat level at time T1, however, that filtering rule may not indicate that other information about the packet must be determined or logged. That filtering rule, as well as other filtering rules generated in event 305, are sent to the PSGs 110 in events 306 and 307 and are stored in the database 131 in event 308.

In event 309, the PSG 110.1 receives a packet from a host 120.1 that is being sent to an external host (e.g., that is being sent to an external host 140). In event 310, the PSG 110.1 filters that packet by applying criteria of the filtering rules received in event 306. The PSG 110.1 may compare the received packet (and/or the time and/or relationship of the received packet to other packets, and/or other information about the received packet) to criteria specified by the filtering rule applied as part of the filtering event 310. If the packet (and/or information about the packet) matches a filtering rule's criteria, the PSG 110.1 may take action specified by the filtering rule (e.g., log the packet, log and capture the packet, log and capture a flow associated with the packet) and may apply an operator (e.g., allow the packet to continue, block the packet). If the packet is not blocked, the packet may be allowed in event 311 to proceed toward its destination.

In event 312, the PSG 110.1 receives a packet from an external host (e.g., an external host 140) that is destined for (e.g., addressed to) a host 120.1 of the first network 105. The packet received in event 312 may be in response to a packet sent from a host 120.1, or may not be such a response (e.g., the packet of event 312 may be an initial packet of a flow between the external host and the host 120.1). In event 313, the PSG 110.1 filters the packet, similar to the filtering of event 310, by applying criteria of filtering rules to that packet to determine if the in-transit packet matches criteria from any packet filtering rules. If a match is found, the PSG 110.1 may take one or more actions comprising applying one or more operators of one or more matched rules, logging the matched packet, and/or capturing the matched packet. If the packet is not blocked (e.g., if the packet does not match a rule, or if the packet matches a rule that does not include a block operator), the packet may be allowed in event 314 to proceed toward its destination. Events such as events 309 through 314 may occur numerous additional times in connection with in-transit packets communicated between hosts 120.1 and external hosts. Some packets may be blocked and prevented from proceeding to an external host or to a host 120.1. In event 315, the PSG 110.1 may forward packet filtering output data, generated in events 310 and 313 and in other similar events, to the system 130. The forwarded packet filtering output data may comprise log data (e.g., comprising packet logs for packets filtered during events 310 and 313 and during other filtering events). The forwarded packet filtering output data may also comprise packets (pcaps) captured during events 310, 313, and/or other filtering events.

FIG. 4 shows an example of log data 401 that may be sent in event 315. The example log data 401, as well as the composite log data and/or other log data described herein, is intended to provide examples, in a convenient explanatory format, of the types of information that may be included in such log data. The format and/or content of log data may differ from the example of FIG. 4. For example, log data need not be tabular. As another example, log data need not include all of the information shown in the log data 401, and/or may comprise other types of information.

In the example log data 401, each entry is a packet log that corresponds to a packet that matched one or more criteria of a filtering rule during filtering, and that comprises values of that packet for one or more of the parameters and/or other characteristics (time, PSG_id, Host_id, etc.) shown in the header row at the top of FIG. 4. In the example format of the log data 401, each entry may be a row. In packet logs having other types of formats, an entry/log may take other forms. Each of the cells in the "time" column may hold a value representing a time that the packet, corresponding to the row that includes the cell, traversed (e.g., was filtered by) the PSG 110.1. For convenience, each of the values in the time column is a 9-digit value in the form HH:MM:SS:sss representing a time value of a single day with millisecond precision, and in which the first and second digits represent an hour (HH), the third and fourth digits represent minutes (MM), the fifth and sixth digits represent seconds (SS), and the remaining digits represent milliseconds (s). Additional digits may be included to add a date component to the time value (e.g., HH may be expanded to four or more digits to measure hours from an arbitrarily chosen reference date).

Each of the cells in the "PSG_id" column may hold a value identifying the PSG that filtered the packet corresponding to the row that includes the cell. As explained below, the log data 401 may be combined with similar log data from other PSGs 110, and values of the PSG_id column may be used in the combined log data to distinguish between data attributable to different PSGs and/or networks. For convenience, the PSG_id value is the same as the drawing reference number for the PSG 110.1 from FIG. 1. An actual PSG_id value may, for example, comprise a MAC address or other unique value associated with a PSG. Each of the cells in the "Host_id" column may hold a value identifying the host 120.1 of network 105.1 that is associated with the filtered packet corresponding to the row that includes the cell. That host 120.1 may be a host sending a packet to an external host or a host to which a received packet from an external host is being sent. For convenience, values in the Host_id column are in the same format as the drawing reference numbers for hosts 120.1 in FIG. 1. Actual Host_id values may, for example, comprise a MAC address or other unique value associated with a host 120.1.

Each of the cells in the "Log id" column may hold a value that is a unique identifier of the packet log corresponding to the row that includes the cell. In the examples of FIGS. 4 through 5D, relatively short values (an "L" followed by 4 digits) are used for Log id values, but actual values may be much longer so as to facilitate unique identifier values for a much larger quantity of packet logs. Each of the cells in the "Rule_id" column may hold a value identifying the filtering rule that is associated with the filtered packet (e.g., the filtering rule that comprises criteria matched by the filtered packet corresponding to the row that includes the cell). For convenience, arbitrarily chosen Rule_id values in the form "r*" are shown in FIG. 4. Although not shown, packet logs may also comprise a cell for an identifier of a cyber threat associated with a filtering rule that comprises criteria matched by the filtered packet corresponding to the row that includes the cell. Such a value may, for example, comprise a cyber threat identifier such as is described above in connection with event 302**. Cells of a column for cyber threat identifiers may be blank for one or more packet logs, and/or values in such a column may be revised (e.g., based on a later determination that a log does or does not relate to a particular cyber threat).

Each of the cells in the "Source_addr" column may hold a value representing an address of a source of the filtered packet corresponding to the row that includes the cell, and each of the cells in the "Dest_addr" column may hold a value representing an address of a destination of that filtered packet. Source and destination addresses may be Internet Protocol (IP) addresses. For convenience, values in the Source_addr and Dest_addr columns are arbitrarily chosen values in the form "IP***" that indicate IP addresses. Actual Source_addr and Dest_addr values may have the format of an IPv4, IPv6, and/or other IP version address. Also or alternatively, Source_addr and Dest_addr values may comprise non-IP addresses. Each of the cells in the "Sport" column may hold a value representing a source port of the filtered packet corresponding to the row that includes the cell, and each of the cells in the "D_port" column may hold a value representing a destination port of that filtered packet. For convenience, values in the Sport and D_port columns are arbitrarily chosen values in the form "port *" that represent source or destination ports. Actual Sport and D_port values could have numerical values identifying ports. Each of the cells in the "Prot." column may hold a value identifying a protocol associated with the packet corresponding to the row that includes the cell. For convenience, values in the Prot. column are arbitrarily chosen letters that represent a protocol. Actual Prot. values may be an identifier of an L4 protocol (e.g., TCP, IP, etc.), an identifier of a higher layer protocol (e.g., DNS, FTP, HTTP, HTTPS, TLS/SSL, etc.), and/or an identifier of another type of protocol. In the example of FIG. 4, values for source address, destination address, source port, destination port, and protocol are logged for every packet that matches criteria a filtering rule, even though the filtering rule associated with the first cyber threat only includes matching criteria based on source and destination address NTIs. This need not be the case, however. A filtering rule may instruct that only cells associated with NTIs of matched criteria be logged, or may instruct that any other combination of values (whether or not part of the filtering rule matching criteria) be logged. As further shown in FIG. 4, each of the cells in the "Dir." column may hold a value indicating whether the packet, corresponding to the row that includes the cell, is incoming from an external host (e.g., "in") or outgoing from a host 120.1 (e.g., "out").

As further shown in FIG. 4, the example log data 401 may include one or more additional columns. Each of the additional columns may correspond to a different parameter or characteristic, and a cell of such an additional column may hold a value of the corresponding parameter or characteristic for a filtered packet corresponding to the row that includes the cell. Such additional parameters or characteristics may correspond to an NTI (or other information) associated with criteria of a packet filtering rule. Cells in some or all of the additional columns may be blank for one or more packet logs. For example, and to conserve processing resources of a PSG and/or to minimize latency, values for one or more parameters/characteristics corresponding to the additional columns may not be extracted from a packet filtered as a result of a filtering rule associated with a cyber threat having a low threat level value, if the one or more parameters/characteristics are not associated with criteria of a rule matched by a filtered packet, and/or if a filtered packet is being captured and values for the one or more parameters/characteristics of the additional columns may be extracted later (if needed). Parameters/characteristics associated with the additional columns may comprise one or more of any of the threat indicators described herein, and/or other threat indicators or parameters/characteristics relating to a packet.

Each of the cells in the "Flow_id" column may hold a value identifying a flow associated with the filtered packet corresponding to the row that includes the cell. For convenience, arbitrarily chosen Flow_id values in the form "flow *" are shown in FIG. 4. Flow_id values may, for example, be used to identify captured packets for a flow that comprises the filtered packet. Also or alternatively, Flow_id values may be used to cross-reference (and/or to generate) separate packet logs directed to one or more specific flows. Each of the cells in the "PcapId" column may hold a value that indicates that the filtered packet corresponding to the row that includes the cell (and/or a flow comprising that filtered packet) has not been captured, or a value that indicates a file or other reference for retrieving a capture of the filtered packet (and/or of a flow comprising that filtered packet). In the example of FIGS. 4 through 5D, a value of 0 is used to indicate that a packet was not captured, and indications of packet captures are shown as arbitrarily chosen values in the form "cap *."

Returning to FIG. 3A, after receiving the packet filtering output data (e.g., packet log(s) and/or captured packet(s)) from the PSG 110.1 in event 315, the system 130 may store the received packet filtering output data in the database 131 (event 316). When storing the packet log(s) as part of event 316, the packet logs may be appended to or otherwise combined with packet logs from other PSGs 110. Events 321 through 328 may be similar to events 309 through 316, respectively, but may be performed with regard to PSG 110.n and packet communications between hosts 120.n of network 105.n and external hosts. Similar events may occur with regard to hosts 120 and PSGs 110 of other first networks 105. Although FIG. 3A shows the events associated with the PSGs 110.n occurring after the events associated with the events associated with PSG 110.1, this is for convenience and to avoid obscuring FIG. 3A. In particular, the events associated with the PSG 110.1 may be temporally interspersed with the events associated with the PSG 110.n and/or with similar events associated with other PSGs 110. Moreover, after sending packet log(s) and/or captured packets to the system 130 (e.g., as shown for events 315 and 327), a PSG 110 may continue to receive and filter packet communications based on filtering rules provided by the system 130. Similarly, the system 130 may continue to receive CTI data, generate and/or update filtering rules based on CTI in CTI data, and send those filtering rules to the PSGs 110 for application to packet communications.

In event 341, the system 130 may receive CTI data from the CTI provider 135.1. That CTI data may comprise CTI $300.1_{T2}$ that relates to the first cyber threat addressed by the earlier CTI $300.1_{T1}$. For example, the CTI $300.1_{T2}$ may reflect the knowledge of the CTI provider 135.1 at a time T2 after the time T1, and may indicate additional NTIs and/or changed NTIs that may be used to detect packet communications associated with the first cyber threat. Also or alternatively, the CTI $300.1_{T2}$ may include other information about the first cyber threat. For example, the CTI $300.1_{T2}$ may include information about an increase or decrease in the threat level associated with the first cyber threat (and/or may include information that indicates (e.g., to the system 130) that the threat level should change), may include additional and/or changed information about the nature of the first cyber threat, etc. Although the CTI $300.1_{T2}$ and the CTI $300.1_{T1}$ are received from the same CTI provider (the CTI provider 135.1) in the example of FIGS. 3A and 3B, this need not be the case. For example, the CTI data comprising the CTI $300.1_{T2}$ may be received from the CTI provider 135.n or from another CTI provider 135 that is different from the CTI provider 135.1, and/or may be generated internally by the system 130.

In event 342 (FIG. 3B), which may be after event 341, the system 130 may determine that the CTI $300.1_{T2}$ and the CTI $300.1_{T1}$ pertain to (or are likely to pertain to) the same cyber threat. The determination of event 342 may, for example, be based on determining that a cyber threat identifier contained in (or otherwise associated with) the CTI $300.1_{T2}$ is the same as a cyber threat identifier contained in (or otherwise associated with) the CTI $300.1_{T1}$. Other examples of how the determination of event 342 may be made (e.g., if either or both of the CTI $300.1_{T1}$ and the CTI $300.1_{T2}$, lack a cyber threat identifier, if the CTIP 135.1 does not recognize that the CTI $300.1_{T1}$ and the CTI $300.1_{T2}$ relate to the same cyber threat, if the CTI $300.1_{T1}$ and the CTI $300.1_{T2}$ are received from sources using different cyber threat identifiers, etc.) are described below in connection with FIG. 6E. A determination that the CTI $300.1_{T2}$ and the CTI $300.1_{T1}$ may pertain to the same cyber threat may not be certain. For example, the determination of event 342 may comprise a determination that the CTI $300.1_{T2}$ and the CTI $300.1_{T1}$ are likely to relate to the same cyber threat, and that application of criteria based on the CTI $300.1_{T2}$ to packets logs and/or packet captures associated with the CTI $300.1_{T1}$ may thus be useful, but a definitive conclusion that the CTI $300.1_{T2}$ and the CTI $300.1_{T1}$ relate to the same cyber threat may not have been reached. The system 130 may, for example, determine that the CTI $300.1_{T2}$ and the CTI $300.1_{T1}$ likely pertain to the same cyber threat, but may also determine that there are one or more other instances of earlier CTI that are also likely to pertain to the same cyber threat as the CTI $300.1_{T2}$. In such a circumstance, and as explained in more detail below, the system 130 may performs steps, similar to those described below with regard to the CTI $300.1_{T2}$ relative to the CTI $300.1_{T1}$, for the CTI $300.1_{T2}$ relative to each of multiple instances of earlier CTI that may be likely to relate to the same cyber threat as the CTI $300.1_{T2}$.

In event 343, the system 103 may, by determining changes in the CTI $300.1_{T2}$ relative to the CTI $300.1_{T1}$, determine updated criteria corresponding to the first cyber threat. The updated criteria may, for example, comprise information about one or more changes to one or more NTIs indicated by the CTI $300.1_{T1}$ (e.g., a change to a value of an NTI indicated by the CTI $300.1_{T1}$, an omission of one or more NTIs indicated by the CTI $300.1_{T1}$) and/or one or more new NTIs (e.g., a value for a parameter/characteristic for which there was no corresponding NTI indicated by the CTI $300.1_{T1}$). The determination of event 343 may comprise determining that a threat level of the first cyber threat has increased or decreased, that there has been a change in (and/or new information about) the nature of the first cyber threat, that there has been a change in (and/or new information about) the types of companies or other organizations being targeted by the first cyber threat, and/or that there is other new and/or changed information about the first cyber threat. If CTI for the same cyber threat is received from multiple providers 135, the presence of CTI from multiple providers for the same cyber threat may be noteworthy and may be a basis on which one or more actions are taken (e.g., changing a confidence level associated with the cyber threat, triggering analysis of other cyber threats from those multiple providers, etc.).

In event 344, the system 130 may retrieve, from the database 131, previously stored packet logs and captured packets associated with the packet filtering rule(s) based on the CTI $300.1_{T1}$. Event 344 may comprise identifying, as a subset of the packet logs received by the system 130 in events 315 and/or 327 (and/or received by the system 130 from other PSGs 110 and/or at other times), packet logs that include an identifier of the first cyber threat (if present) and/or of filtering rules based on the CTI $300.1_{T1}$, and retrieving that identified subset of packet logs. Event 344 may comprise identifying, as a subset of the captured packets received by the system 130 in events 315 and/or 327 (and/or received by the system 130 from other PSGs 110 and/or at other times), captured packets associated with the identified packet logs, and retrieving that identified subset of captured packets. For log data such as the example log 401, this may comprise identifying and retrieving rows that have a Rule_id value corresponding to filtering rules previously generated based on the CTI $300.1_{T1}$, as well as packet captures associated with those rows.

In event 345, the system 130 may analyze the retrieved packet logs and/or captured packets, based on the changes determined in event 343, by applying updated criteria determined in event 343 to packet logs and/or packets previously identified (or as potentially related) to the first cyber threat. The updated criteria may comprise information for matching new and/or changed NTIs determined in event 343 and/or other criteria that was changed or added by the CTI $300.1_{T2}$. Non-limiting examples of the analysis of step 345 are described in connection with FIGS. 5A through 5D. Packet logs and/or captured packets related to (or potentially related to) any particular cyber threat may be a very small portion of the total quantity of stored packet logs and/or packets. Applying criteria comprising information to match new and/or changed NTIs (and or other criteria) to that much smaller portion of stored data, which portion is more likely to be relevant, instead of to the entirety of stored packet logs and captured packets associated with all cyber threats, is more efficient and more likely to rapidly detect previous effects of a cyber threat. After application of the criteria comprising information to match the new and/or changed NTIs (and or other criteria) to a reduced data set related to the first cyber threat, and as explained below, the relevant portion of that reduced data set may be further narrowed. This may reduce time needed to detect and or quantify the impact of the first cyber threat, may help to identify hosts affected by the first cyber threat, and/or may otherwise facilitate targeted actions.

FIG. 5A shows an example composite log data 501 that comprises packet logs that may be retrieved by the system 130 in step 344. Composite log data may comprise packet logs received from multiple PSGs 110. In the example of FIGS. 3A and 3B, the first cyber threat is associated with the Rule_id value r002. The composite log data 501 may comprise all packet logs stored by the system 130 (e.g., in events 313 and 328) that include the Rule_id value of r002. The composite log data 501 may be substantially reduced in size (e.g., by multiple orders of magnitude) relative to all of the packet logs stored in the database 131. By applying updated criteria (based on the CTI $300.1_{T2}$) for the first cyber threat to the composite log data 501, and/or by not applying updated criteria to other log data, analysis and detection of the first cyber threat may be significantly more efficient.

As but a first example of how updated criteria may be applied to the composite log data 501, NTIs indicated by the earlier CTI $300.1_{T1}$ may have comprised a range of source addresses that included IP3, IP23, and IP33, and a range of destination addresses that included IP4 and IP24. The later CTI $300.1_{T2}$ may narrow those NTIs to a specific source address IP23 and a specific destination address IP4. If the criteria based on the narrowed source and destination address NTIs are applied to the composite log data 501, the system 130 may confirm that rows (and corresponding filtered packets) matching the updated criteria (e.g., rows a, j, and o that comprise source address IP23 and destination address IP4) are likely related to the first cyber threat. The system 130 may similarly determine that rows (and corresponding filtered packets) not matching the updated criteria (e.g., rows not comprising source address IP23 and destination address IP4) are likely unrelated to (or less likely to be related to) the first cyber threat, and/or may determine that such rows (and corresponding filtered packets) may be ignored and/or otherwise designated as less relevant.

As but a second example of how updated criteria may be applied to the composite log data 501, the CTI $300.1_{T1}$ may have been silent with regard to any temporal indications associated with the first cyber threat. The CTI $300.1_{T2}$ may comprise new information that shows the first cyber threat is a type of malware that has been observed beaconing to a command and control server during certain time windows, and may further indicate new NTIs specifying that packet communications associated with the first cyber threat occur between 10 p.m. and 2:00 a.m. When criteria based on the new NTIs are applied to the composite log data 501, the system 130 may confirm that rows (and corresponding filtered packets) matching the updated criteria (e.g., rows a-e, p, and q with times between 10 p.m. and 2:00 a.m.) are likely related to the first cyber threat. The system 130 may similarly determine that rows (and corresponding filtered packets) not matching the updated criteria (e.g., rows not comprising times between 10 p.m. and 2:00 a.m.) are likely unrelated to (or less likely to be related to) the first cyber threat, and/or may determine that such rows (and corresponding filtered packets) may be ignored and/or otherwise designated as less relevant.

As but a third example of how updated criteria may be applied to the composite log data 501, the CTI $300.1_{T2}$ may comprise new information showing that the first cyber threat has been observed in connection with certain types of businesses. The network 105.1 may be operated by a business of that type, but the network 105.n may be operated by an unrelated type of business. The new information (types of businesses associated with the cyber threat) may be used to modify (or create) a filtering rule that is directed to those types of businesses (e.g., by including updated criteria configured to match PSG_id values associated with the network 105.1). If that updated criteria is applied to the composite log data 501, the system 130 may confirm that rows (and corresponding filtered packets) matching the updated criteria (e.g., rows b, f, h, j, k, m, and o that comprise a PSG_id value associated with the network 105.1) are likely related to the first cyber threat. The system 130 may similarly determine that rows (and corresponding filtered packets) not matching the updated criteria (e.g., rows not comprising a PSG_id value associated with the network 105.1) are likely unrelated to (or less likely to be related to) the first cyber threat, and/or may determine that such rows (and corresponding filtered packets) may be ignored and/or otherwise designated as less relevant.

Packet logs related to (or potentially related to) the first cyber threat may, when initially created at the time of filtering, lack values in one or more fields that correspond to one or more NTIs that were not indicated by the earlier CTI 300.1$_{T1}$ but that have been indicated by the later CTI 300.1$_{T2}$. As part of a passive/background updating process, the system 130 may fill in one or more of those fields based on captured packets corresponding to those packet logs. For example, the system 130 may have additional processing resources that can be used for such purposes, thereby freeing resources of PSGs 110 for filtering operations. However, if there is not such a passive/background updating process, or if such a process has not had time to complete as of the time of step 345, packet logs identified as related (or potentially related) to the first cyber threat (e.g., based on the Rule_id value r002) may lack values in one or more fields that correspond to one or more NTIs that were not indicated by the earlier CTI 300.1$_{T1}$ but that have been indicated by the later CTI 300.1$_{T2}$. In such a circumstance, and as part of applying updated criteria based on the later CTI 300.1$_{T2}$, to packet logs and/or packets previously identified as related (or as potentially related) to the first cyber threat, system 130 may inspect captured packets to obtain data for one or more unpopulated packet log data fields that correspond to one or more NTIs matchable by updated criteria, and may modify those packet logs by adding the data obtained from captured packets to the previously unpopulated fields of the packet logs corresponding to those captured packets. The updated criteria may then be applied to the modified packet logs. As but a first example of circumstances in which updated criteria may be used in this way, a single IP address may be associated with multiple domain names. One or more of those domain names may be associated with malicious activity, but one or more others may be benign. As described above for a previous example, NTIs indicated by the earlier CTI 300.1$_{T1}$ may have comprised a range of source addresses that included IP3, IP23, and IP33, and a range of destination addresses that included IP4 and IP24. However, the CTI 300.1$_{T1}$ may not have included any information about a domain associated with the first cyber threat. The later CTI 300.1$_{T2}$ may indicate, in addition to NTIs specifying ranges of source and/or destination addresses, NTIs that specify domain names "www.ndgfare3.com" and "www.kxoidcxe.com" as associated with the first cyber threat. Because of the low threat level associated with the CTI 300.1$_{T1}$ and/or the absence of information in the CTI 300.1$_{T1}$ regarding relevant domain names, the filtering rule r002 may not have been configured to cause PSGs 110 to examine filtered packets for domain names or to include domain names in packet logs for packets matching one or more criteria of the filtering rule r002. Because those packets were captured, however, extractable domain names may be added to the respective corresponding packet logs.

FIG. 5B shows example composite log data 502 that comprises packet logs that may be retrieved by the system 130 in step 344, and that have been further modified to complete fields, in one of the additional columns that corresponds to domain name (DN), based on inspection of captured packets (e.g., the filtered packets and/or packets of flows comprising the filtered packets) respectively corresponding to those packet logs. When updated criteria comprising the new NTIs indicated by the CTI 300.1$_{T2}$ (specifying the domain names "www.ndgfare3.com" and "www.kxoidcxe.com") are applied to the modified packet logs, the system 130 may confirm that rows (and corresponding filtered packets) matching the updated criteria (e.g., rows a, f, h, j-m, and o that comprise one of the domain names "www.ndgfare3.com" or "www.kxoidcxe.com") are likely related to the first cyber threat. The system 130 may similarly determine that rows (and corresponding filtered packets) not matching the updated criteria (e.g., rows not comprising one of the domain names "www.ndgfare3.com" or "www.kxoidcxe.com") are likely unrelated to (or less likely to be related to) the first cyber threat, and/or may determine that such rows (and corresponding filtered packets) may be ignored and/or otherwise designated as less relevant.

As but another example of a circumstance in which data from captured packets may be used when applying updated criteria, certain types of malware may intentionally introduce errors into packet fields associated with and/or required by a particular protocol. Such malware may, for example, be designed to thwart detection methods that focus on certain protocols and/or that might be fooled if a protocol is "broken." The CTI 300.1$_{T1}$ may not have included any information about protocol errors associated with the first cyber threat. However, the CTI 300.1$_{T2}$ may indicate one or more NTIs that are based on syntax errors in protocol B. Because of the low threat level associated with the CTI 300.1$_{T1}$ and/or the absence of information in the CTI 300.1$_{T1}$ regarding protocol errors, the filtering rule r002 may not have been configured to cause PSGs 110 to examine filtered packets for such errors or to include indications of such errors in packet logs for packets matching one or more criteria of the filtering rule r002. Because those packets were captured, however, that information may be extractable from those packets and added to the respective corresponding packet logs.

FIG. 5C shows example composite log data 503 that comprises packet logs that may be retrieved by the system 130 in step 344, and that have been modified to complete fields, in one of the additional columns that corresponds to protocol errors, based on inspection of captured packets (e.g., the filtered packets and/or packets of flows comprising the filtered packets) respectively corresponding to those packet logs. When updated criteria comprising the new NTI indicated by the CTI 300.1$_{T2}$ is applied to the modified packet logs, the system 130 may confirm that rows (and corresponding filtered packets) matching the updated criteria (e.g., rows a, f, g, j, l, and m that comprise "B" in the "Prot." field and "syntax error" in the "Protocol Error" field) are likely related to the first cyber threat. The system 130 may similarly determine that rows (and corresponding filtered packets) not matching the updated criteria (e.g., rows not comprising both "B" in the "Prot." field and "syntax error" in the "Protocol Error" field) are likely unrelated to (or less likely to be related to) the first cyber threat, and/or may determine that such rows (and corresponding filtered packets) may be ignored and/or otherwise designated as less relevant.

As but a further example of a circumstance in which data from captured packets may be used when applying updated criteria, certain types of cyber threats may be associated with authentication certificates signed by a particular certification authority. The CTI $300.1_{T1}$ may have been silent with regard to authentication certificate details that may be associated with the first cyber threat. However, the CTI $300.1_{T2}$ may comprise information regarding association of the first cyber threat with use of a particular certificate signing authority ("dodgycertauth.com"). Because of the low threat level associated with the CTI $300.1_{T1}$ and/or the absence of information in the CTI $300.1_{T1}$ regarding authentication certificates, the filtering rule r002 may not have been configured to cause PSGs 110 to examine filtered packets for certificate information or to include certificate information in packet logs for packets matching one or more criteria of the filtering rule r002. Because those packets were captured, however, that information may be extractable from those packets and added to the respective corresponding packet logs.

FIG. 5D shows example composite log data 504 that comprises packet logs that may be retrieved by the system 130 in step 344, and that have been further modified to complete fields, in one of the additional columns that corresponds to certificate signing authority, based on inspection of captured packets (e.g., the filtered packets and/or packets of flows comprising the filtered packets) respectively corresponding to those packet logs. When updated criteria comprising the new NTIs indicated by the CTI $300.1_{T2}$ are applied to the modified packet logs, the system 130 may confirm that rows (and corresponding filtered packets) matching the updated criteria (e.g., rows c, g, k, and n that comprise "dodgycertauth.com" in the "CA" field) are likely related to the first cyber threat. The system 130 may similarly determine that rows (and corresponding filtered packets) not matching the updated criteria (e.g., rows not comprising "dodgycertauth.com" in the "CA" field) are unrelated to (or less likely to be related to) the first cyber threat, and/or may determine that such rows (and corresponding filtered packets) may be ignored and/or otherwise designated as less relevant.

The above examples are only a few of the many ways in which later CTI for a particular cyber threat may differ from earlier CTI for that same threat, and in which those differences may be used to process packet filtering output data (e.g., packet logs and/or captured packets) that was collected based on the earlier CTI. In general, any updated criteria based on later CTI may be used to narrow and/or otherwise analyze packet filtering output data collected and/or generated based on the earlier CTI. Updated criteria may comprise information to match a new NTI indicated by the later CTI that was not included in the earlier CTI, information to match a change to a value of an NTI indicated by the later CTI relative to a value for that NTI indicated by the earlier CTI, information to match omission of an NTI that was indicated by the earlier CTI, and/or other information.

Also or alternatively, packet filtering output data collected and/or generated based on criteria based on earlier CTI may be further analyzed based on new (or changed) criteria based on later CTI that does not indicate a change in and/or addition of an NTI. For example, earlier CTI for a cyber threat may indicate a few basic NTIs (e.g., one or more source and/destination addresses) and may further indicate that a cyberthreat is associated with a low threat level, but include little else. Based on that earlier CTI, a filtering rule may be generated and sent to PSGs 110, which filtering rule causes the PSGs 110 to log source and destination addresses and source and destination ports for filtered packets matched by criteria of the filtering rule, and to capture packets, but to not log other information for those packets. Later CTI for the cyber threat may indicate the same threat indicator values, but may raise the threat level of the cyber threat. Based on the increased threat level, packet logs and captured packets generated based on the earlier CTI may be retrieved, and the captured packets inspected to obtain information to complete additional fields in the retrieved packet logs. Those completed additional fields may then be subjected to one or more additional analyses such as are described below.

Returning to FIG. 3B, in event 346 the system 130 may flag and/or otherwise update portions of the stored packet logs based on the analysis(es) in step 345 (and/or additional flagging/updating may occur during event 346). For example, for each packet communication confirmed to correspond (or as likely to correspond) to a cyber threat (e.g., the packet communications corresponding to rows a, j, and o in the first example of FIG. 5A, the packet communications corresponding to rows a-e, p, and q in the second example of FIG. 5A, the packet communications corresponding to rows b, f, h, j, k, m, and o in the third example of FIG. 5A, the packet communications corresponding to rows a, f, h, j-m, and o in the example of FIG. 5B, the packet communications corresponding to rows a, f, g, j, l, and m in the example of FIG. 5C, the packet communications corresponding to rows c, g, k, and n in the example of FIG. 5D), the system 130 may replace portions of previously stored packet logs with modified packet logs corresponding to those communications and having additional fields completed based on packet inspection. Also or alternatively, the system 130 may set flags in the modified packet logs (and/or in previously stored versions of those packet logs) to indicate that those packet logs correspond to communications confirmed to be associated with the first cyber threat. Such flags may, for example allow faster and/or more efficient analysis of those log portions if subsequent CTI (e.g., indicating further updated criteria) is received for the first cyber threat. Also or alternatively, and as part of the updating in event 346, the system 130 may set different flags in packet logs (e.g., previously stored packet logs and/or modified packet logs) that correspond to communications determined not to correspond to the first cyber threat (e.g., packet communications corresponding to rows that did not match updated criteria in the examples of FIGS. 5A-5D). Those different flags may be used, for example, to indicate that portions of the stored logs with those different flags may be deleted, or may be retained for a shorter amount of time than updated log portions confirmed to correspond to a cyber threat.

In event 347, the system 130 may further analyze the packet logs and/or other data resulting from the analysis(es) of event 345. This further analysis may comprise a search for commonalities in the packet logs corresponding to communications confirmed to correspond to the first cyber threat. For example, during the analysis of event 345, fields of additional columns of those packet logs may have been populated with values based on inspection of captured packets, and some of those additional columns may not correspond to an NTI known to relate to the first cyber threat. If a common value appears in a significant portion of the fields of one of those additional columns, that common value may be an NTI that can be used to improve the filtering rule associated with the first cyber threat. As another example, time values of the packet logs corresponding to communications confirmed to correspond to the first cyber threat may be analyzed. If those time values are confined to a recurring time window, that time window may be used as a new NTI or to narrow a time range of an existing NTI.

Also or alternatively, the analysis(es) in event 347 may comprise analysis of other stored packet logs and/or stored packet captures that may not have previously been identified as potentially associated with the first cyber threat (e.g., logs that did not include the Rule_id value r002). For example, the CTI 300.1$_{T2}$ may include new information that indicates the first cyber threat is associated with malware that follows a particular pattern that comprises sending a first packet (or series of packets) to an innocuous web site (e.g., "www-.google.com") to confirm that Internet access is available, sending a second packet to a random address in a particular country to confirm that Internet access to that country is available, and sending a third packet to a command and control server in that particular country that is associated with the malware. For communications confirmed in event 345 to correspond to the first cyber threat, the hosts 120 associated with those communications may be determined, and additional packet logs and/or packet captures associated with those hosts 120 (e.g., within a time range corresponding to the three steps performed by the malware) may be retrieved. If there are additional logs and/or packet captures associated with those hosts 120 but that do not include the Rule_id r002, and if those log(s) and/or packet capture(s) show activity associated with one of the three steps performed by the malware, additional confirmation of the first cyber threat and/or additional intelligence about the first cyber threat may be obtained. As but an additional example of analysis of other stored packet logs and/or stored packet captures that may not have previously been associated with the first cyber threat, a packet communication may be logged multiple times if it matches criteria of multiple packet filtering rules (e.g., there may be multiple logs for a single packet, with each of those logs corresponding to filtering of that packet based on a different filtering rule). For example, a first filtering rule may filter based on source and destination address, and a second filtering rule may filter based on domain name and time of day. If a packet communication was confirmed to correspond to a cyber threat based on a match to the first filtering rule, stored packet logs may be searched for packet logs corresponding to matches of that packet communication with other filtering rules. For example, the stored packet logs may be searched for other packet communications occurring at or about the same time and having the same source and destination addresses. Based on a packet log matching the same packet communication to the second filtering rule, the additional NTIs and/or other criteria associated with the second filtering rule, and/or other intelligence associated with the second filtering rule, may be added to or otherwise combined with the criteria and intelligence associated with the first filtering rule.

In event 348, the system 130 may flag and/or otherwise update portions of the stored packet logs based on the analysis(es) in event 347 (and/or additional flagging/updating may occur during event 347). The flagging and/or updating in event 348 may be similar to that in event 346, but may further include flagging portions of packet logs not previously associated with the first cyber threat as being associated with the first cyber threat.

In addition to output(s) in one or more of events 346 through 348 to cause updating and/or flagging of data in the database 131, the system 130 may (e.g., in event 349) generate and/or cause one or more other types of outputs based on the analysis(es) in event 345 and/or event 347. Such output may, for example, comprise output of an indication on a display associated with a cyber analyst, system administrator, or other person associated with detecting and/or monitoring cyber threats, with preventing and/or reducing harm caused by cyber threats, and/or with remediating cyber threats. Such an indication may, for example, provide details regarding which packet communications have been confirmed to be (or have confirmed as more likely to be) affected by and/or otherwise associated with a particular cyber threat, regarding hosts and/or other devices in a network 105 that are associated with a particular threat and/or which should be quarantined and/or otherwise isolated, and/or regarding other details of the cyber threat and/or affected hosts or other devices. As shown in events 351 through 354, the system 130 may also cause and/or generate output, based on the analysis(es) in event 345 and/or event 347, that causes filtering rules to be modified and/or created for subsequent application by PSGs 110. For example, new or changed criteria based on the CTI 300.1$_{T2}$, and/or criteria determined based on analysis(es) in events 345 and/or 347, may be added in event 351 to the filtering rule associated with the first cyber threat. As another example, new information in the CTI 300.1$_{T2}$ and/or from the analysis(es) in events 345 and/or 347 may escalate a threat level associated with the first cyber threat, and event 351 may comprise outputting an instruction (e.g., to the rules module 203) to change an operator in a filtering rule from "allow" to "block."

In examples described above, a single instance of earlier CTI (the CTI 300.1$_{T1}$) was identified as related to a cyber threat (the first cyber threat) that is the same as a cyber threat associated with an instance of later CTI (the CTI 300.1$_{T2}$). As also indicated above, however, multiple instances of earlier CTI may be identified as potentially related to a cyber threat that is the same as a cyber threat associated with an instance of later CTI. For example, and in addition to the CTI 300.1$_{T1}$, the system 130 may identify CTI 300.2$_{Ta}$, CTI 300.3$_{Tb}$, . . . CTI 300.n$_{Tn}$ received from various other CTIPs (or generated internally by the system 130) that potentially relate to the first cyber threat, and that were received before the CTI 300.1$_{T2}$. Based on identifying those multiple instances of earlier CTI, steps 342 through 354 may be performed for the later CTI 300.1$_{T2}$ relative to each instance of identified earlier CTI. In particular, the system 130 may perform steps 342 through 354 for the CTI 300.1$_{T2}$ relative to the CTI 300.1$_{T1}$ (as already described above), perform steps 342 through 354 for the CTI 300.1$_{T2}$ relative to the CTI 300.2$_{Ta}$, perform steps 342 through 354 for the CTI 300.1$_{T2}$ relative to the CTI 300.3$_{Tb}$, . . . perform steps 342 through 354 for the CTI 300.1$_{T2}$ relative to the CTI 300.n$_{Tn}$.

FIGS. 6A through 6F are a flow chart for an example method for detection and/or analysis of cyber threats based on new/updated CTI and/or based on updated criteria associated with new/updated CTI. One, some, or all steps of the example method of FIGS. 6A through 6F may be performed by the system 130, and/or by a combination of one or more computing devices configured to perform some or all operations and/or functions of the system 130. For convenience, FIGS. 6A through 6F are described below in connection with the system 130. Also or alternatively, one, some, or all steps of the example method of FIGS. 6A through 6F may be performed by one or more other computing devices. One or more steps of the example method of FIGS. 6A through 6F may be rearranged (e.g., performed in a different order), combined, omitted, and/or otherwise modified, and/or other steps added.

In step 601, the system 130 may determine if new CTI (e.g., new CTI data) has been received from a CTI provider (e.g., one or more of the CTI providers 135) or another source, or generated internally. If no, step 601 may be repeated until new CTI has been received. If yes, the system 130 may perform step 602. In step 602, the system 130 may determine if there are one or more instances of previous CTI that may relate to the cyber threat to which the new CTI relates. For convenience, the cyber threat to which the new CTI relates is referred to below as "the new CTI cyber threat." Additional details of step 602 are described in connection with FIG. 6E. If the system 130 fails to determine at least instance of prior CTI in step 602, step 604 may be performed. In step 604, the system 130 may forward the new CTI to the rules module 203 for generation of one or more filtering rules (e.g., as described in connection with event 305 of FIG. 3A). The system may repeat step 601 (indicated by connector AA) after performing step 604.

If in step 602 the system 130 determines at least one instance of previous CTI that relates to the new CTI cyber threat, step 605 may be performed. In step 605, the system 130 may select a previous CTI from the one or more instances of previous CTI determined in step 602. If the system 130 determines multiple instances of previous CTI in step 602, those determined previous instances (or pointers to those determined previous instances) may be arranged in a queue, and step 605 may comprise selecting the previous CTI of the next instance in the queue. If only a single previous CTI instance is determined in step 602, step 605 may comprise selecting that single previous CTI. As part of step 605, the system 130 may also retrieve the selected previous CTI (e.g., retrieve NTIs and other data that was indicated by the selected previous CTI). In step 606, the system 130 may determine differences, if any, between the new CTI and the selected previous CTI. Event 343 of FIG. 3B may comprise an example of step 606. If the system 130 determines in step 607 that no differences were determined in step 606, the system 130 may proceed to step 610. In step 610, the system 130 may determine if there are additional previous CTI instances that were determined in step 602, but that have not yet been selected. If yes, the system 130 may return to step 605 (indicated by connector FF). If no, the system 130 may return to step 601 (indicated by connector AA). If the system 130 determines in step 607 that differences were determined in step 606, the system 130 may proceed to step 608. In step 608 the system 130 may retrieve packet filtering output data (e.g., packet logs and/or captured packets) associated with the selected previous CTI (e.g., packet logs generated, and/or packets captured, based on packet filtering rules associated with the selected previous CTI). Event 344 of FIG. 3B may comprise an example of step 608. As part of step 608, the system 130 may generate composite log data (e.g., such as composite log data 501, 502, 503, or 504 prior to addition of data from captured packets).

In step 614, the system 130 may determine if the differences determined in step 606 indicate that packet filtering criteria based on the selected previous CTI should be updated based on the new CTI (e.g., if one or more values for NTIs should be changed, if one or more NTIs should be added, if one or more NTIs is no longer applicable). If no, the system 130 may perform step 628 (FIG. 6C; indicated by connector BB) (described below). If yes, the system 130 may perform step 615 (FIG. 6B; indicated by connector CC). In step 615, the system 130 may determine if all of the information needed for application of the updated criteria is already included in the composite log data generated in step 608. For example, the system 130 may determine if, for all of the NTIs for which there is a value provided by the new CTI, there are non-null values for all corresponding fields of packet logs in the composite log data. If yes, the system 130 may perform step 620 (described below). If no (e.g., if there is at least one new or changed NTI which cannot be evaluated based on information in the composite log data generated in step 608), the system 130 may perform step 616. Examples of scenarios corresponding to the yes branch from step 615 are described above in connection with FIG. 5A. Examples of scenarios corresponding to the no branch from step 615 are described above in connection with FIGS. 5B, 5C, and 5D.

In step 616, the system 130 may determine if any captured packets were retrieved in step 608. If no (e.g., if packet filtering rules based on the selected previous CTI did not instruct PSGs 110 to capture packets), the system 130 may perform step 620. If yes, the system 130 may perform step 617. In step 617, the system 130 may inspect the retrieved captured packets for values of parameter(s)/characteristic(s) corresponding to new or changed NTIs associated with the new CTI. In step 618, the system 130 may determine if it is possible to extract any values of parameter(s)/characteristic(s) corresponding to those new or changed NTIs from the retrieved captured packets. If no (e.g., if all of the new or changed NTIs relate to portions of the retrieved captured packets that are inaccessible because of encryption), the system 130 may perform step 620 (described below). If yes (e.g., if at least one value for at least one parameter/characteristic corresponding to new or changed NTIs is accessible from the retrieved captured packets), the system 130 may perform step 619. In step 619, the system 130 may extract value(s) for parameter(s)/characteristic(s) corresponding to the new and/or changed NTIs from the captured packet(s) and may add those value(s) to the composite log data generated in step 608 (resulting, e.g., in composite log data such as that shown in FIGS. 5A through 5D). Based on step 619, or based on a yes determination in step 615 or a no determination in one of steps 616 or 618, the system 130 may perform step 620.

In step 620, the system 130 may, by applying the updated criteria (e.g., information to match new and/or changed NTIs) based on the new CTI to the composite log data, apply that updated criteria to packet log(s) (e.g., to packet log(s) retrieved in step 608) and to captured packet(s) (e.g., to information from captured packets, retrieved in step 608, added to composite log data) that were previously collected based on the selected previous CTI. As part of step 620, the system 130 may determine packet communications in the composite log data (e.g., as described in connection with the examples of FIGS. 5A through 5D) that match (or that do not match) the updated criteria (e.g., that match or do not match new and/or changed NTIs). If any of the updated criteria correspond to packet log fields for which a value could not be extracted from a captured packet (e.g., if there was a no determination in step 618), or if there were no captured packets (e.g., if there was a no determination in step 616), the system 130 may determine that the updated criteria are inconclusive as to those packet logs (and corresponding packets) and/or may flag those packet logs accordingly. Such a flag may indicate, for example, that the system 130 is not yet able to either confirm those logs (and corresponding packets) are associated with the new CTI cyber threat or determine that those logs are not associated with the new CTI cyber threat.

In step 621, the system 130 may cause packet logs stored in the database 131 to be updated based on matches and/or non-matches determined in step 620. Such updating may, for example, comprise setting flags and/or otherwise marking portions of packet logs as confirmed to be related to the new CTI cyber threat, as determined not related to the new CTI cyber threat, and/or for which analysis was inconclusive, updating stored packet logs to include additional information added from captured packets, etc. As part of step 621, the system 130 may also or alternatively cause the flags and/or markings to be set, based on matches and/or non-matches determined in step 620, for captured packets. Those flags/markings may indicate captured packets confirmed to be related to the new CTI cyber threat, captured packets determined not related to the new CTI cyber threat, and/or captured packets captured packets for which analysis in step 620 was inconclusive.

In step 622 (FIG. 6C; indicated by connector DD), the system 130 may determine if the new CTI indicates (and/or if data generated based on the new CTI indicates) that the threat level associated with the new CTI cyber threat has been elevated. If no, the system 130 may perform step 634 (described below). If yes, the system 130 may perform step 623. In step 623, the system 130 may determine if there are additional parameter(s)/characteristic(s) for which values should be extracted from the captured packets (if possible), and that are not already included in the composite log data. For example, if a threat level associated with a cyber threat reaches a threshold level, it may be appropriate to analyze a predetermined set of parameter(s)/characteristic(s), regardless of whether any of those parameter(s)/characteristic(s) are associated with new or changed NTIs in the new CTI. A predetermined set of parameter(s)/characteristic(s) may comprise any one or more of the parameter(s)/characteristic(s) described herein. There may be multiple sets of predetermined parameter(s)/characteristic(s) corresponding to multiple thresholds. For example, a first predetermined set of parameter(s)/characteristic(s) may correspond to a first threshold and first threat level, a second predetermined set of parameter(s)/characteristic(s) may comprise all the parameter(s)/characteristic(s) of the first set plus additional parameter(s)/characteristic(s) and correspond to a second threshold (higher than the first threshold) and a second threat level (higher than the first threat level), a third predetermined set of parameter(s)/characteristic(s) may comprise all the parameter(s)/characteristic(s) of the second set plus additional parameter(s)/characteristic(s) and correspond to a third threshold (higher than the second threshold) and a third threat level (higher than the second threat level), etc.

If the system 130 determines in step 623 that there are no additional parameter(s)/characteristic(s) that should be extracted from the captured packets, the system 130 may perform step 634. If the system 130 determines in step 623 that there are additional threat indicator values that are not already included in the composite log data and that thus should be extracted from the captured packets, the system may perform step 624. In step 624, and similar to step 617, the system 130 may inspect the retrieved captured packets for values of the additional parameter(s)/characteristic(s). In step 625, and similar to step 618, the system 130 may determine if it was possible to extract values for any of those parameter(s)/characteristic(s) from the captured packets. If no (e.g., if all of the additional parameter(s)/characteristic(s) relate to portions of the captured packets that are inaccessible because of encryption), the system may perform step 634. If yes (e.g., if at least one of the additional parameter(s)/characteristic(s) relates to one or more portions of one or more the captured packets that are accessible), the system 130 may perform step 626. In step 626, and similar to step 619, the system 130 may extract the value(s) from the captured packet(s) that correspond to the additional parameter(s)/characteristic(s) and may add those value(s) the composite log data.

Figure 6A:
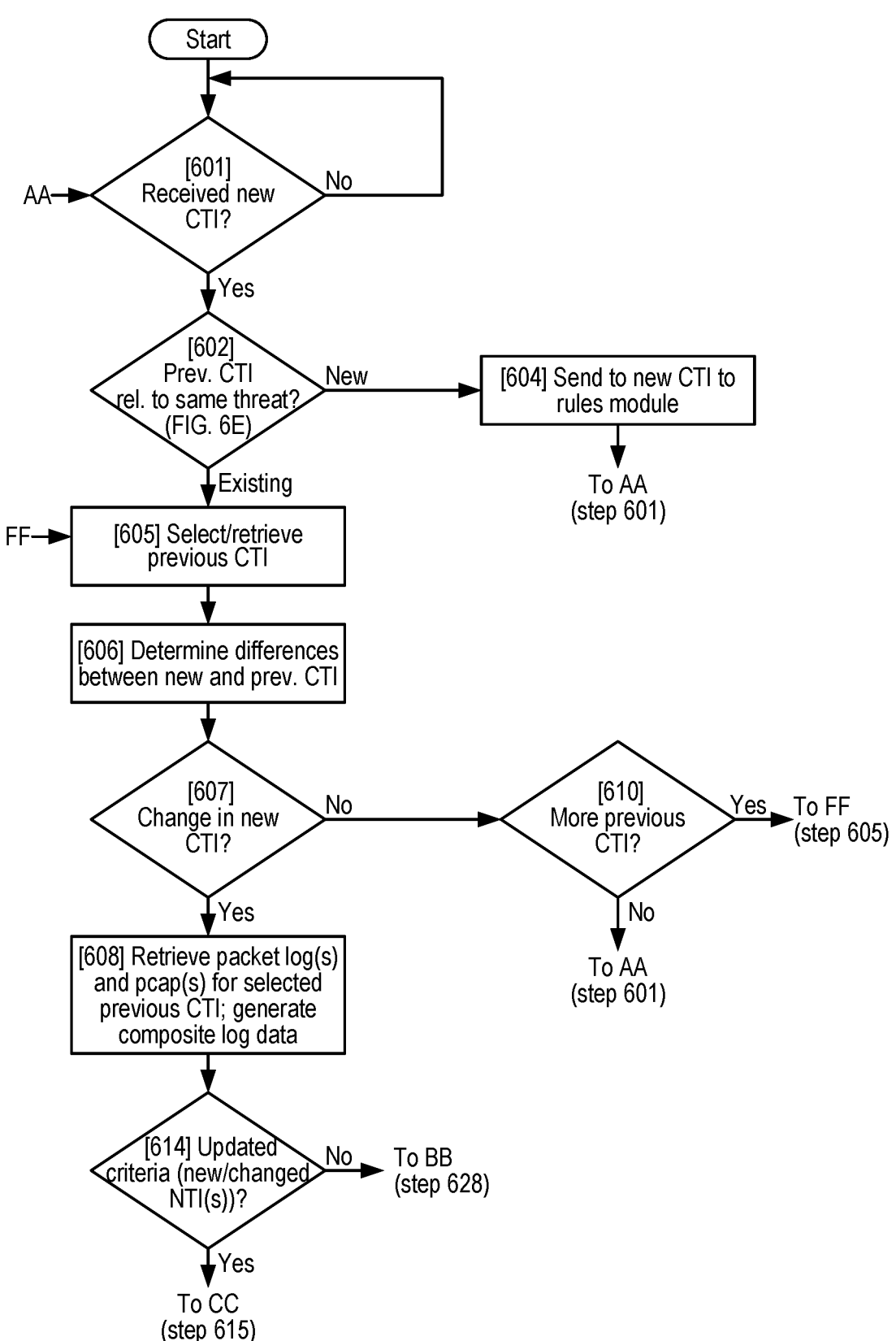
FIGS. 6A, 6B, 6C, 6D, 6E, and 6F are a flow chart for an example method for detection and/or analysis of cyber threats based on updated cyber threat intelligence.
Figure 6B:
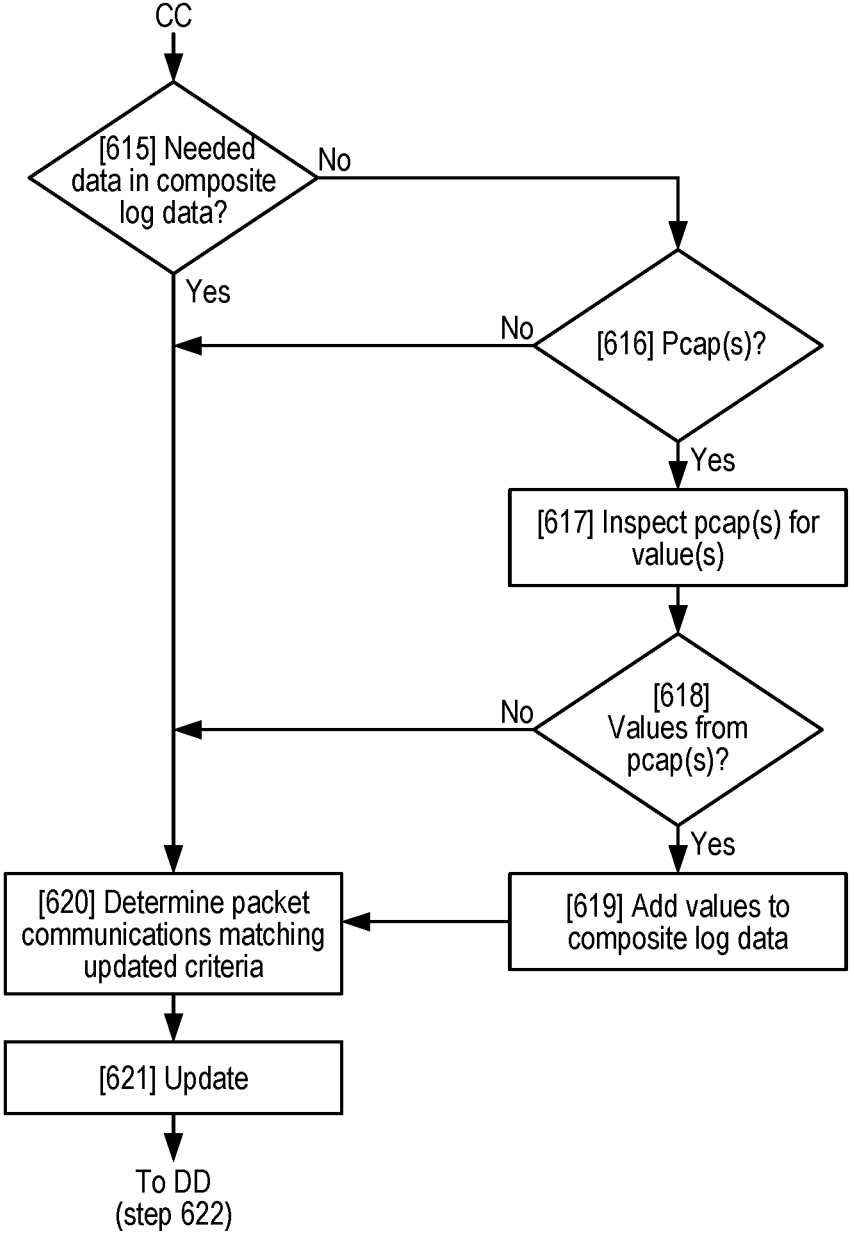
Figure 6C:
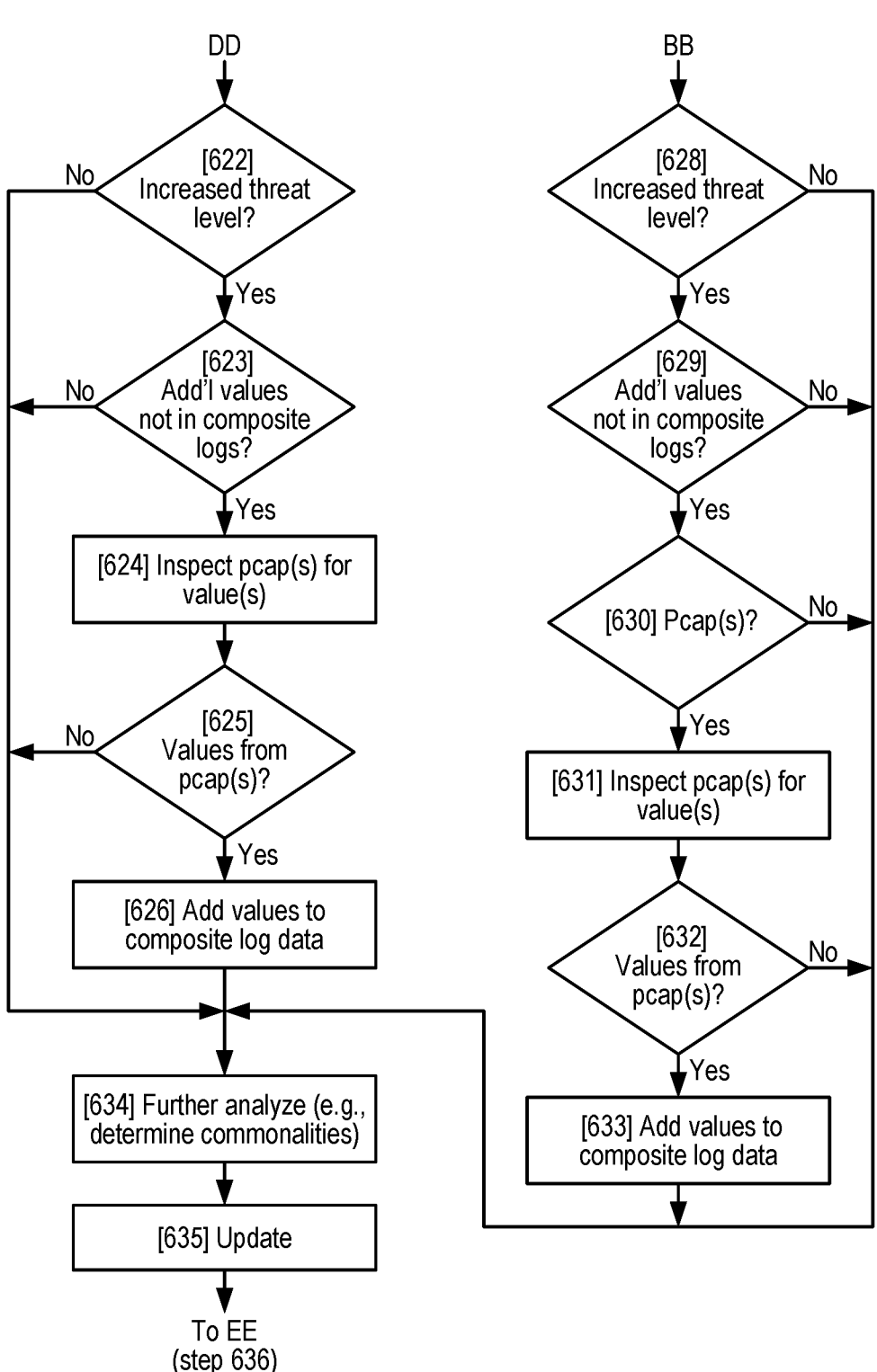
Figure 6D:
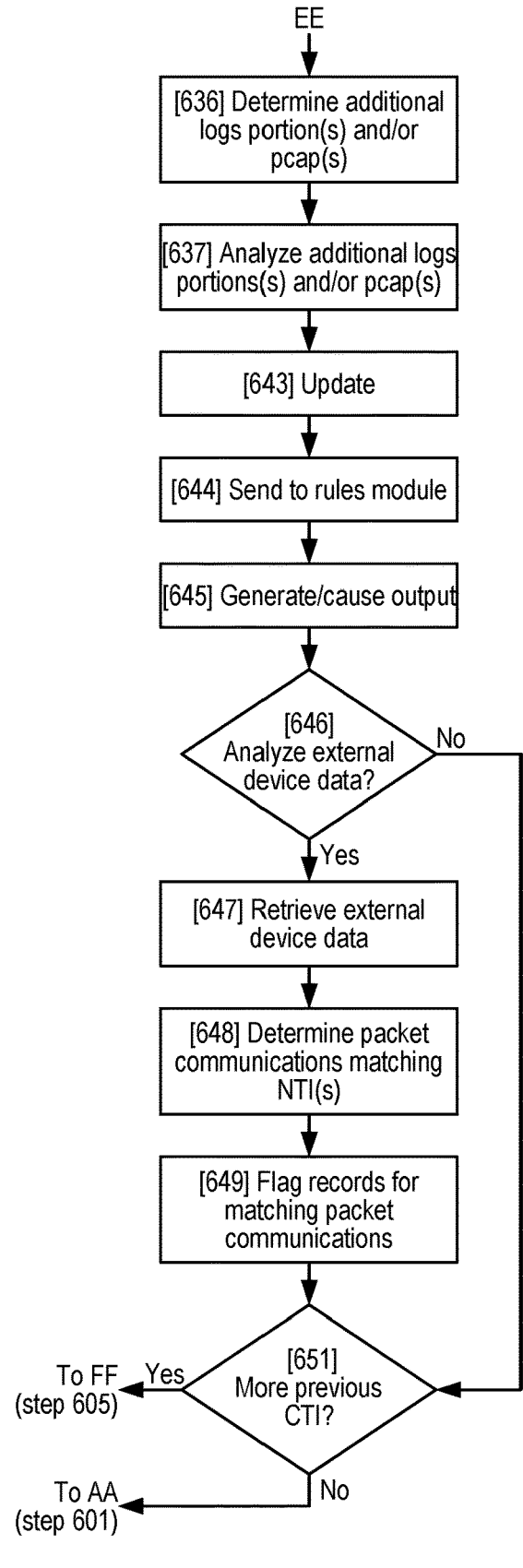

As shown in FIG. 6A, if the system 130 determines in step 614 that there were no updated criteria based on the new CTI, the system 130 may perform step 628, which may be similar step 622. If the determination is step 628 is no, the system 130 may perform step 634. If the determination in step 628 is yes, the system 130 may perform step 629, which may be similar to step 623. If the determination in step 629 is no, the system 130 may perform step 634. If the determination in step 629 is yes, the system 130 may perform step 630, which may be similar to step 616. If the determination in step 630 is no, the system 130 may perform step 634. If the determination in step 630 is yes, the system 130 may perform step 631, which may be similar to step 617 and/or to step 624. Based on step 631, the system 130 may perform step 632, which may be similar to step 618 and to step 625. If the determination in step 632 is no, the system 130 may perform step 634. If the determination in step 632 is yes, the system 130 may perform step 633, which may be similar to step 626 and/or step 619.

Based on step 626 or on step 633, or based on a "no" determination in any of steps 622, 623, 625, 628, 629, 630, or 632, the system 130 may perform step 634. In step 634, the system 130 may further analyze the composite log data. In the analysis of step 634, and as described in connection with event 347 of FIG. 3B, the system 130 may search for commonalities in the composite log data. For example, fields of additional columns of the composite log data may have been populated (e.g., in step 619 and/or in step 626, or in step 633) with values based on inspection of captured packets, and some of those additional columns may not correspond to an NTI indicated by the selected previous CTI or by the new CTI. If a common value appears in a significant portion of the fields of one of those additional columns, that common value may be a new NTI that can be used to improve the filtering rule associated with the new CTI cyber threat. As another example, time values may be analyzed. If at least some of those time values are confined to a recurring time window, that time window may be used as a new NTI or to narrow a time range of an existing NTI.

In step 635, the system 130 may update the database 131 based on step 634. In step 636 (FIG. 6D; indicated by connector EE), the system 130 may determine additional portions of stored packet log(s) and/or additional captured packets that may not have previously been associated with the new CTI cyber threat. In step 637, the system 130 may analyze those additional stored packet log(s) and/or the additional captured packet(s). For example, and as also described in connection with event 347 of FIG. 3B, the additional stored packet log(s) and/or the additional captured packet(s) may be searched for additional packet communications to or from hosts associated with packet communications confirmed (e.g., based on the new CTI) to correspond to the new CTI cyber threat and/or within a time range of those confirmed communications. As another example, and as also described in connection with event 347 of FIG. 3B, the additional stored packet log(s) and/or the additional captured packet(s) may be searched for additional data indicating that the confirmed communications also matched other packet filtering rules associated with cyber threats not previously thought to be related to the new CTI cyber threat.

In step 643, the system 130 may update the database 131 based on step 637. In step 644, the system 130 may send results of the analyses of one or more step 620, step 634, and/or step 637, and/or pointers to results of the analyses of one or more of step 621, step 635, and/or step 643, to the rules module 203 for use in updating/modifying one or more filtering rules associated with the new CTI cyber threat, and/or for use in generating or modifying one or more additional filtering rules. In step 645, the system 130 may generate and/or cause one or more outputs based the analyses of one or more step 620, step 634, and/or step 637. Event 349 and/or one or more of events 351 through 354 may comprise an example of step 645.

As can be recognized from the above description, new CTI for a cyber threat may be used to obtain updated criteria (e.g., to match a refined set of NTIs) that may be used to confirm that some packet communications filtered based earlier CTI are associated with (or are more likely to be associated with) that cyber threat. At the same time, such updated criteria may also be used to determine that other packet communications filtered based on that earlier CTI are not associated (or are less likely to be) associated with that cyber threat. As also described above, new CTI may also or alternatively be used to determine additional values of parameter(s)/characteristic(s) associated with that cyber threat, which additional values may also be used (e.g., as new NTIs) to determine packet communications that are more likely to be related to a cyber threat. In a similar manner, refined and/or additional NTIs learned from new CTI may also or alternatively be applied to data from external devices other than PSGs 110 (e.g., from devices that are not managed and/or controlled by the system 130).

For example, and as shown in FIG. 1, communications between the hosts 152 of the third network 151 and hosts external to the third network 151 may pass through the firewall 153 without traversing a PSG 110. Similarly, communications between the hosts 156 of the third network 155 and hosts external to the third network 155 may pass through the ISP server 157 without traversing a PSG 110. The firewall 153 and/or the ISP server 157 may be configured to store, for all packets communicated via those devices, certain basic data (e.g., values for 5-tuples or portions thereof, directionality, time). The volume of such stored data may be substantial (e.g., much greater than volumes of data associated with filtering by PSGs 110), and much of that stored data may relate to communications which are unrelated to any cyber threat. By applying criteria based on refined and/or additional NTIs obtained from new CTI (and/or from application of new CTI to PSG 110 packet logs and/or packet captures based on earlier CTI) to stored data for packet traffic through external devices such as the firewall 153 and/or the ISP server 157, that data may be classified based on communications that are more likely to relate to a cyber threat and/or based on communications that are less likely to relate to a cyber threat. The external device data determined more likely to be related to a cyber threat may be retained (and/or retained for a longer period of time), and the external device data determined less likely to be related to a cyber threat may be discarded (and/or retained for a shorter period of time), thereby reducing data storage requirements. Moreover, applying criteria based on refined and/or additional NTIs obtained from new CTI (and/or from application of updated CTI to PSG 110 packet logs and/or packet captures based on earlier CTI) to external device data may allow determination of whether hosts and/or a network associated with that external device have already been affected by a cyber threat.

In step 646, the system 130 may determine if external device data is to be analyzed based on refined and/or additional NTIs obtained from (or based on) new CTI. Those refined and/or additional NTIs may comprise NTIs from the selected previous CTI that were not changed by the new CTI, new and/or changed NTIs from the new CTI, and/or additional NTIs determined in step 634 and/or step 637. If no, then the system 130 may perform step 651, which may be similar to step 610. If yes, the system 130 may retrieve data from the external device in step 647. In step 648, the system 130 may determine a first group of packet communications that are identified by that external device data and that match criteria based on the refined and/or additional NTIs. At the same time, the system 130 may determine a second group of packet communications that are identified by that external device data and that do not match criteria based on the refined and/or additional NTIs. In step 649, the system 130 may flag the first group of packet communications as more likely to be related to the new CTI cyber threat and/or may flag the second group of packet communications as less likely to be related to the new CTI cyber threat, and may forward data indicating the flagged and unflagged communications to one or more other computing devices for action (e.g., setting a longer retention time for data related to the first group of packet communications, setting a shorter retention time for data related to the second group of packet communications). After step 649, the system 130 may perform step 651.

As can be appreciated from FIGS. 6A, 6B, 6C, and 6D, the example method may be iterative. For example, after packet filtering output data (e.g., packet log(s) and captured packet(s)) based on first CTI for a cyber threat is updated and/or refined based on second and updated CTI for that cyber threat, and after filtering rule(s) for the cyber threat have been updated and/or generated based on the second CTI, third and further updated CTI for that cyber threat may be received. The third CTI may be applied to packet filtering output data based on the updated filtering rules, and/or to the earlier packet filtering output data that was updated and/or refined based on the second CTI. This may result in further refined and/or further updated packet filtering output data, outputs based on the further refined and/or further updated packet filtering output data, new and/or modified filtering rules based on the further refined and/or further updated packet filtering output data, etc. The process may then repeat for any number of additional updates to CTI for the cyber threat.

Figure 6E:
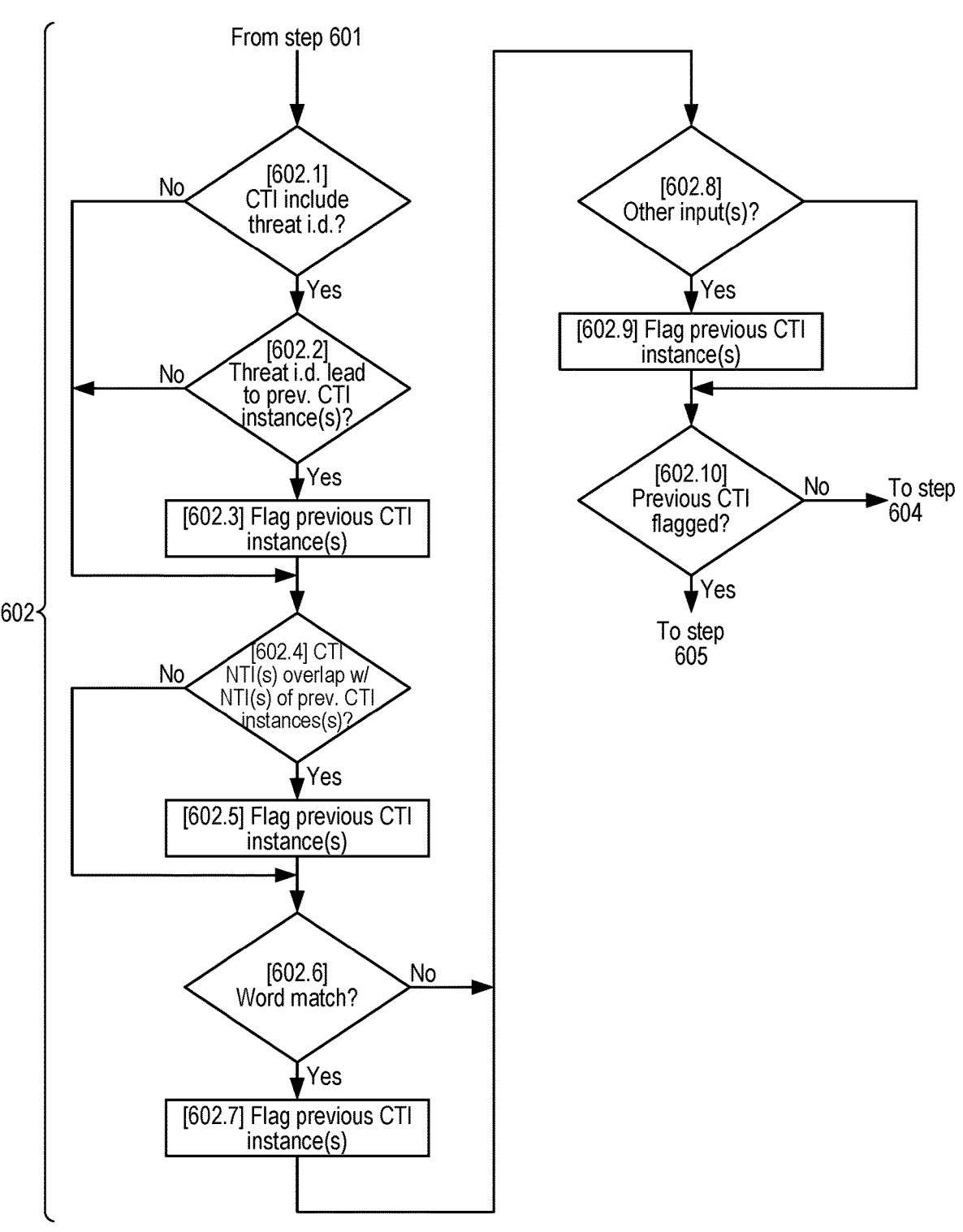

FIG. 6E shows an example of steps that may be performed as part of step 602. In step 602.1, the system 130 may determine if the new CTI comprises a threat identifier (e.g., assigned by a provider of the CTI) associated with the new CTI cyber threat. If no, the system may proceed to step 602.4 (described below). If yes, the system 130 may perform step 602.2. In step 602.2, the system 130 may determine if the threat identifier comprised by the new CTI leads to (e.g., is the same as, has been mapped to, or otherwise points to) a threat identifier associated with one or more previous CTI instances. If yes, the system 130 may in step 602.3 flag those one or more previous CTI instances (e.g., for inclusion in the queue of previous CTI instances from which previous CTI is selected in step 605). If no, the system 130 may perform step 602.4.

In step 602.4, which may also be performed after performing step 602.3, the system 130 may determine if there is a threshold amount of overlap between NTIs indicated by the new CTI and NTIs indicated by one or more previous CTI instances. The system 130 may determine an overlap if, for example, an NTI indicated by the new CTI is the same as a value indicated by a previous CTI instance or is in a range specified by the previous CTI instance. The threshold amount of overlap may be quantitative. For example, the threshold may require overlap with regard to at least a specified quantity of NTIs and/or with regard to at a specified percentage of NTIs indicated by the new CTI. Also or alternatively, the overlap may be qualitative. For example, the threshold may require overlap in values for certain defined NTIs (e.g., source address and/or destination address). If the system 130 determines in step 602.4 that there is a threshold amount of overlap between NTIs of the new CTI and NTIs of one or more previous CTI instances, the system 130 may in step 602.5 flag those one or more previous CTI instances (e.g., for inclusion in the queue of previous CTI instances from which previous CTI is selected in step 605). If the system 130 determines in step 602.4 that there is not a threshold amount of overlap between NTIs of the new CTI and NTIs of one or more previous CTI instances, the system 130 may perform step 602.6.

In step 602.6, which may also be performed after performing step 602.5, the system 130 may determine if there is a word match between one or more fields of the new CTI (e.g., a field providing a name or description of malware or other description of a cyber threat) and one or more similar fields of one or more previous CTI instances. If the system 130 determines in step 602.6 that there is a word match between words of the new CTI and words of one or more previous CTI instances, the system 130 may in step 602.7 flag those one or more previous CTI instances (e.g., for inclusion in the queue of previous CTI instances from which previous CTI is selected in step 605). If the system 130 determines in step 602.6 that there is not a word match between words of the new CTI and words of one or more previous CTI instances, the system 130 may perform step 602.8.

In step 602.8, which may also be performed after performing step 602.7, the system 130 may determine if there are one or more other inputs indicating that the new CTI and one or more previous CTI instances may be related to the same cyber threat. The input(s) of step 602.8 may result from activity of a human operator (e.g., a cyber analyst) and/or from one or more automated processes (e.g., caused by execution of instructions of one or more modules of the system 130). The input(s) of step 602.8 may, for example, comprise one or more inputs indicating relation of cyber threats determined from analyses such as are described below. If the system 130 determines in step 602.8 that there are one or more other inputs indicating that the new CTI and previous CTI instances may be related to the same cyber threat, the system 130 may in step 602.9 flag those one or more previous CTI instances (e.g., for inclusion in the queue of previous CTI instances from which previous CTI is selected in step 605). If the system 130 determines in step 602.8 that there are not one or more other inputs indicating that the new CTI and one or more previous CTI instances may be related to the same cyber threat, the system 130 may perform step 602.10.

In step 602.10, which may also be performed after performing step 602.9, the system determines if at least one previous CTI instance was flagged in any of steps 602.3, 602.5, 602.7, or 602.9. If no, the system 130 may proceed to step 604. If yes, the system 130 may proceed to step 605.

As indicated in the various examples provided above, methods and/or systems according to the disclosure may be used in various ways to determine if subsequent CTI relates to earlier CTI, determine if subsequent CTI updates earlier CTI, perform one or more analyses based on updated CTI, and/or take one or more actions based on one or more such analyses. The disclosure is not limited to those examples. What follows is another nonlimiting example of how methods and/or systems according to the disclosure may be used to make such determinations, perform such analyses, and/or take action based on such analyses.

(1) A provider P1 (e.g., a provider 135) provides CTI ("CTI 1") that informs the system 130 of a threat ("threat 1") that a state actor for country C1 is mounting a cyberattack against critical infrastructure industry in a specific part of the world including country C1. Criteria of a filtering rule comprise information to match one or more NTIs, based on CTI 1, that includes all IP address ranges associated with country C1. PSGs 110 filter packets based on that rule and forward, to the system 130, logs and captured packets relating to traffic to/from country C1. The system 130 indexes and associates those logs and captured packets with threat 1.

(2) Provider P2 (e.g., another provider 135) provides CTI ("CTI 2") that informs the system 130 of another threat ("threat 2") that a global distributed denial of service DDOS attack is actively underway against a group of ISPs, potentially as politically motivated retaliation against a customer of one of those ISPs. Criteria of a filtering rule comprises information to match one or more NTIs, based on CTI 2, that includes names and server IP addresses of those ISPs (including ISP1 and ISP2), as well as source IP addresses of the attacks. PSGs 110 inspect packets based on that rule and forward, to the system 130, logs and captured packets. The system 130 indexes and associates those logs and captured packets with threat 2.

(3) Provider P1 provides further CTI ("CTI 3") that informs the system 130 that additional context about threat 1 has been added, that the targeted critical infrastructure industry may be spread out across multiple countries including countries C1 and C2, and that ISPs (including ISP3 and ISP4) which are servicing countries C1 and C2 may be conduits for exfiltration attempts. The system 130 analyzes the existing context for threat 1 from the logs and captured packets, associated with threat 1, referred to above in paragraph (1). Based on that analysis, the system 130 retroactively indexes and associates those logs and captured packets with contexts of ISP3 and ISP4, and also directs (e.g., by sending new and/or updated filtering rules) the PSGs 110 to filter packets based on new/updated filtering rules and to collect logs and/or capture packets for traffic to or from country C2 and forward those logs and/or captured packets to the system 130. The system 130 receives those logs and captured packets for traffic to or from country C2, and associates those logs and captured packets with threat 1.

(4) Provider P3 (e.g., another provider 135) provides CTI ("CTI 4") that informs the system 130 that a threat "(threat 3")" is an active ransomware campaign which is being executed through targeted phishing attacks delivered through a compromised website hosted at ISP4. Criteria of a filtering rule comprises information to match one or more NTIs, based on CTI 4, that includes phishing URLs, domains, and IP addresses hosted at ISP4. Based on that rule, PSGs 110 start filtering packets and collecting information about threat 3 and forwarding, to the system 130, logs and captured packets related to threat 3. The system 130 determines that ISP4 is located in country C1, which is common to threat 1, and further analyzes logs and packet captures associated with threat 1 (e.g., the logs and captured packets described in paragraphs (1) and (3)) to extract domains and URLs and to compare those extracted domains and URL against threat 3 NTIs, but finds no match, and threat 1 and threat 3 appear unrelated.

(5) Provider P2 provides further CTI ("CTI 5") that informs the system 130 that threat 2 is likely a diversion attempt by a sophisticated actor to mask a more serious attack, and that the DDOS attack is concentrating on overloading services of ISP1 in country C1. Based on this additional information, the system 130 determines commonality between threat 2 and threat 1 and threat 3, all having an association with country C1. The system 130 further analyzes all logs and captured packets associated with threat 1, threat 2, and threat 3 to begin extracting additional information to aid in exfiltration detection.

(6) Provider P3 provides further CTI ("CTI 6") that informs the system 130 that threat 3 has a confirmed and validated NTI that is an indication of Ryuk malware infection when a data transfer in a packet payload matches a particular unique value. The system 130 further analyzes logs and captured packets associated with threat 1, threat 2, and threat 3 to find this NTI, and discovers a match in captured packets associated with threat 1.

(7) Based on the analyses of paragraph (6) and previous paragraphs, the system 130 determines threat 1, threat 2, and threat 3 are related and associates those threats with a single sophisticated campaign carried out in a multi-stage manner. The system 130 determines that the actual Ryuk malware infiltration happened when threat 1 was known, but before threat 2 and threat 3 were known. Through retroactive analysis using updated intelligence, the system 130 detected the threat at a later time (associated with events described in paragraph (6)), which was the earliest moment when a confirmable NTI became known.

The disclosure encompasses numerous configurations of the devices and systems described herein, and operations described herein may be distributed among devices and systems in numerous ways, and/or may be distributed among other devices. One or more steps, operations, and/or functions described herein may be modified and/or performed in sequences other than those expressly described herein, and/or may be omitted, and/or other steps, operations, and/or functions may be added.

The system 130 may be directly connected to one or more PSGs 110 to actively direct the PSGs 110, via filtering rules and based on threats as information about those threats is received, to log and/or capture packets. The PSGs 110 may send logs and/or captured packets to the system 130 in real-time, near-time, or delayed-time.

Also or alternatively, the system 130 may be indirectly connected to one or more PSGs 110. The indirect connection may, for example, be via one or more computing devices that function as an aggregator of logs and/or packet captures. The aggregator may comprise one or more computing devices configured to operate as a management platform for PSGs 110. Also or alternatively, the aggregator could comprise one or more computing devices configured to perform security information and event management (SIEM) system functions, with the PSGs 110 sending logs and/or captured packets to the SIEM system and the SIEM system sending logs and/or captured packets to the system 130.

Also or alternatively, the system 130 may be configured to query and/or retrieve (e.g., instead of always passively receiving) logs and/or captured packets from an external log and/or captured packet storage. Such queries may be based on narrowed query parameters based on evolving CTI. For example, an entity associated with a network 105 customer may have a rolling 365-day storage of captured packets and/or logs of all traffic, and the system 130 might only have captured packets and/or logs with at least some minimal threat context (e.g., based on previously-received CTI). The system 130 could query the external storage store to selectively retrieve additional captured packets and/or logs needed to further apply new CTI.

Also or alternatively, the system 130 may act as a log and/or captured packet filter between PSGs 110 (and/or other non-PSG sources of logs and/or packet captures) and a STEM system or external storage. The system 130 may be configured to forward all logs and/or captured packets associated with known threats and to hold all logs and/or captured packets for which association with a threat may be unknown. As new CTI is received and historical logs and/or captured packets are further analyzed, logs and/or captured packets retroactively discovered to be associated with a threat may be forwarded to the SIEM system or external store. This deployment model may allow a SIEM system and/or external store to hold the information that is known to be important, and avoid, until a determination of importance by the system 130, holding information that is not known to be important.

Also or alternatively, the system 130 may be configured to operate as a retention controller for logs and/or captured packets. The system 130 may cause logs and/or captured packets stored by another system (e.g., a STEM system, an external storage) to be deleted more quickly based on determined lack of importance (e.g., determinations, based on updated CTI, that logs and/or captured packets are unrelated to and/or less likely to be related to a cyber threat, determinations of reduced threat level, etc.), or to be stored for a longer period based on determined importance (e.g., determinations, based on updated CTI, that logs and/or captured packets are related to and/or more likely to be related to a cyber threat, determinations of increased threat level, etc.). The system 130 may be configured to extend a data retention period applicable to data as related risk (e.g., risk corresponding to threats associated with that data and/or which may correlated to importance described above) elevates. As risk rises, a later need for the data is more likely. The system 130 may be configured to reduce a data retention period applicable to data as related risk decreases, as decreasing risk may correspond to a lower probability of need for that data.

Figure 6F:
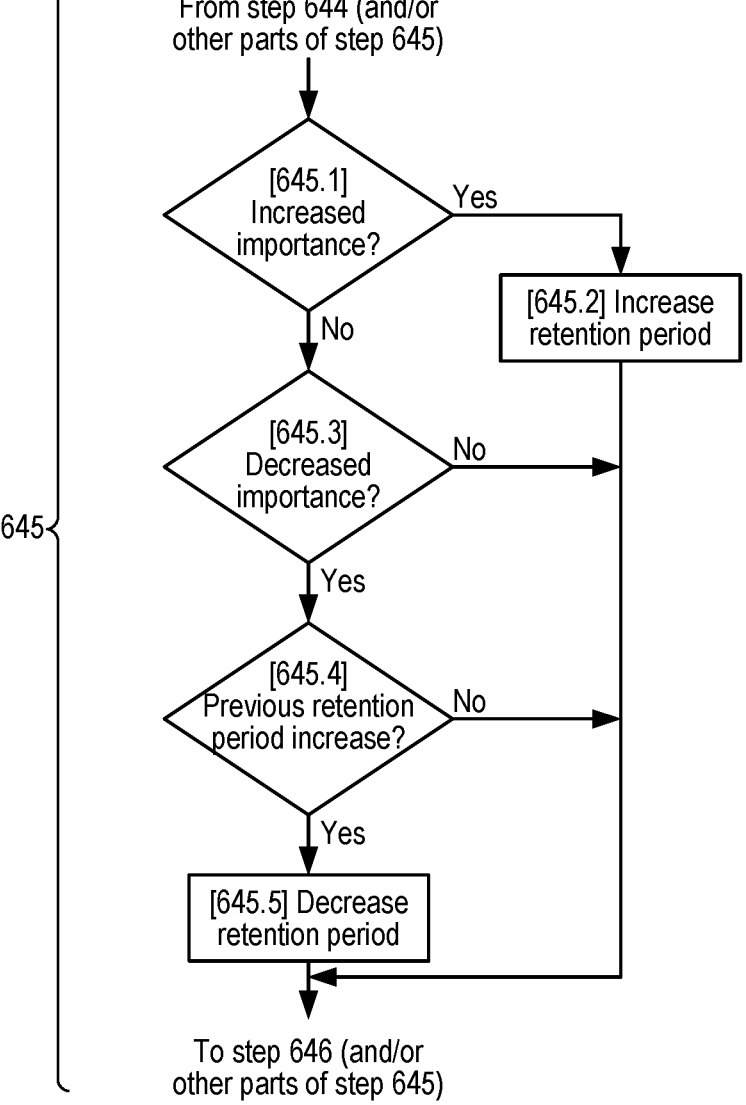

FIG. 6F shows an example of steps that the system 130 may perform as part of operation as a retention controller. The steps of FIG. 6F may be performed as part of step 645 (FIG. 6D), as part of another step, and or as added steps separate from steps already shown in FIGS. 6A-6E. The system 130 may perform step 645.1 after performing step 644 (FIG. 6D) and/or after other parts of step 645 (e.g., steps associated with causing other types of outputs and/or actions based on analyses of one of more of steps 620, 634, and/or step 637). In step 645.1, the system 130 may determine if, based on analyses of one of more of steps 620, 634, and/or step 637, there has been any increase in the importance of one or more logs and/or of one or more captured packets. For example, importance associated with a specific log or captured packet may increase with regard to one threat, but may decrease with regard to another threat. An increase in importance may comprise a determination that the log(s) and/or captured packet(s) are associated with a threat, a confirmation that the log(s) and/or captured packet(s) are associated with a threat, a determination of an increased threat level, and/or other determination that importance of the log(s) and/or captured packet(s) has increased. If there has been any increase in importance (even if there has also been a decrease in importance associated with a different threat), the system 130 may in step 645.2 cause a retention period associated with the log(s) and/or captured packet(s) to be increased. Step 645.2 may, for example, comprise sending a message indicating the increase in retention period, updating a data field and/or flag to indicate the increased retention period, etc. After step 645.2, the system 130 may perform step 646 (FIG. 6D) and/or other parts of step 645 (e.g., in connection with causing other types of outputs and/or actions based on analyses of one of more of steps 620, 634, and/or step 637). If there has been no increase in importance, the system 130 may perform step 645.3.

In step 645.3, the system 130 may determine if, based on analyses of one of more of steps 620, 634, and/or step 637, there has been a decrease in the importance of log(s) and/or of one or more captured packet(s). A decrease in importance may comprise a determination that the log(s) and/or captured packet(s) are not associated with a threat, a confirmation that the log(s) and/or captured packet(s) are not associated with a threat, a determination of a decreased threat level, and/or other determination that importance of the log(s) and/or captured packet(s) has decreased. If there has been no decrease in importance, the system 130 may perform step 646 and/or other parts of step 645. If there has been a decrease in importance, the system 130 may perform step 645.4. In step 645.4, the system 130 may determine if the retention period for the log(s) and/or captured packet(s) was previously increased (e.g., previously increased, relative to a default retention period, based on an earlier determination of importance). If not, the system 130 may perform step 646 and/or other parts of step 645. If the retention period was previously increased, the system 130 may in step 645.5 cause a retention period associated with the log(s) and/or captured packet(s) to be decreased. Step 645.5 may, for example, comprise sending a message indicating the decrease in retention period, updating a data field and/or flag to indicate the decreased retention period, etc. After step 645.5, the system 130 may perform step 646 and/or other parts of step 645.

As explained above, the system 130 may cause various outputs and/or perform other actions based on determinations resulting from application of criteria based on new CTI to logs and/or captured packets associated with earlier CTI (e.g., based on analyses of one of more of steps 620, 634, and/or step 637). Such outputs and/or actions may also or alternatively comprise automatically sending alerts (and/or log(s) and/or captured packet(s)) to STEM systems, to orchestration platforms (e.g., a security orchestration, automation, and response (SOAR) platform), and/or to other external systems. If the security system 130 is directly or indirectly controlling PSGs 110 and/or devices, it may send instructions (e.g., new and/or modified rules) to those PSGs 110 and/or other devices to expand or contract logging and/or packet capture (e.g., as described in the example of paragraphs (1) through (7) above). Also or alternatively, the system 130 may cause (directly or via intermediate systems) modification of settings (e.g., in PSGs 110) that control whether packets are captured. For example, PSGs 110 may be configured to default to not capturing packets for blocked packet communications. Based on updated CTI, the system 130 may determine that packets should be captured for subsequent blocked communications. Such captured packets may, for example, be used by the system 130 for domain extraction (e.g., on non-IP-based blocks) and allow for capture of packets of lateral traffic that matched an NTI and is seen only on a span and/or tap of a PSG 110.

Figure 7:
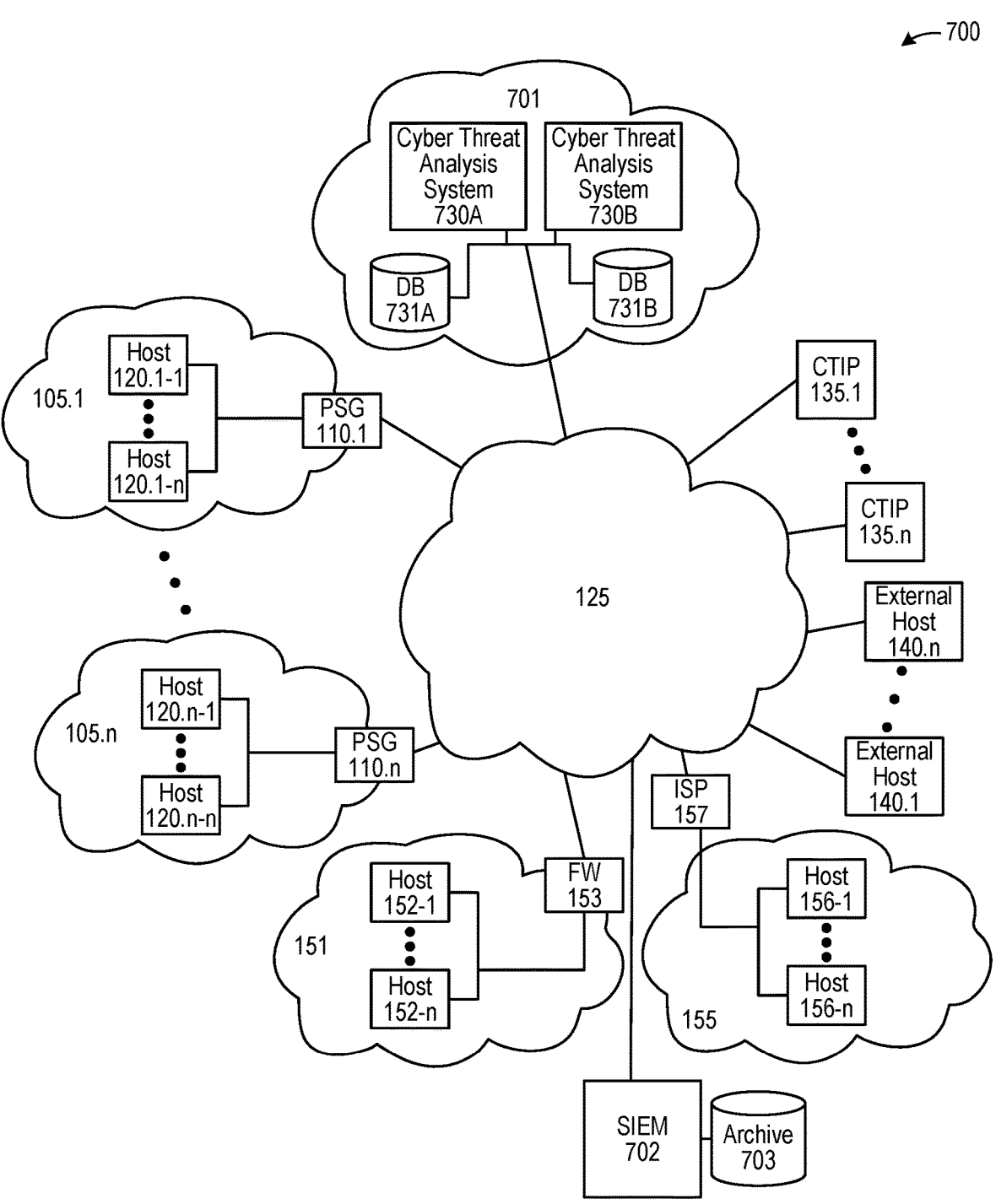
FIG. 7 is a diagram showing an example environment associated with detection and/or analysis of cyber threats based on updated cyber threat intelligence.

FIG. 7 is a diagram showing an example environment 700 for detection and/or analysis of cyber threats based on updated cyber threat intelligence, and which will be used to describe several additional examples of filtering, aggregation, and/or retention control. The example environment 700 may be similar to the example environment 100 of FIG. 1. To simplify the below explanation of various further examples, however, the system 130 has been separated into a cyber threat analysis system 730A (system 730A) and a cyber threat analysis system 730B (system 730B), with the systems 730A and 730B having respective corresponding storage databases 731A and 731B. The systems 730A and 730B, as well as the databases 731A and 731B, may communicate with each other via a network 701 and with other computing devices (e.g., the PSGs 110, the firewall 153, the ISP 157, a SIEM system 702, the CTIPs 135) via the network 125. Also or alternatively, one or more of the systems 730A and 730B or the databases 731A and 731B may communicate with each other via the network 125.

The system 730A and database 731A may comprise one or more computing devices (e.g., such as is described in connection with FIG. 2) configured to perform filtering, aggregation, and/or retention control operations such as are described below. The system 730B and database 731B may comprise one or more additional computing devices (e.g., such as is described in connection with FIG. 2) configured to perform operations such as are described below, as well as other operations described herein in connection with the system 130. Also or alternatively, system 730A and database 731A may be configured to perform operations described herein in connection with the system 130. The systems 730A and 730B, together with the databases 731A and 731B, need not be implemented using separate computing devices (or collections of computing devices). For example, operations described below in connection with the system 730A may also or alternatively be performed by a computing device based on execution of instructions contained in one or more modules stored in memory of that computing device, and operations described below in connection with the system 730B (and/or operations described herein in connection with the system 130) may be performed by that same computing device based on execution of instructions contained in one or more additional modules stored in the memory of that computing device. Similarly, storage operations described below in connection with the database 731A may be allocated to one or more first portions of memory of a database/archive, and storage operations described below in connection with the database 731B (and/or storage operations described herein in connection with the database 131) may be allocated to one or more second portions of memory of that same database/archive. Indeed, operations of the systems 130, 730A, and 730B, and of the databases 131, 731A, and 731B, may be consolidated in, or allocated among, any number of separate computing devices.

Also shown in FIG. 7 is a SIEM system 702 and a corresponding data archive database 703 used by the SIEM system 702. The SIEM system 702 (with the archive 703) may serve one or more networks such as the network 151 and/or the network 155. For example, and as described below, the SIEM system 702 and/or the archive 703 may be configured to store captured packets and/or other data output by the firewall 153, by a server of ISP 157, by a proxy, and/or by any other type of computing device. The SIEM system 702 and the archive 703 may each comprise one or more computing devices configured to carry out operations such as are described herein.

Figure 8A:
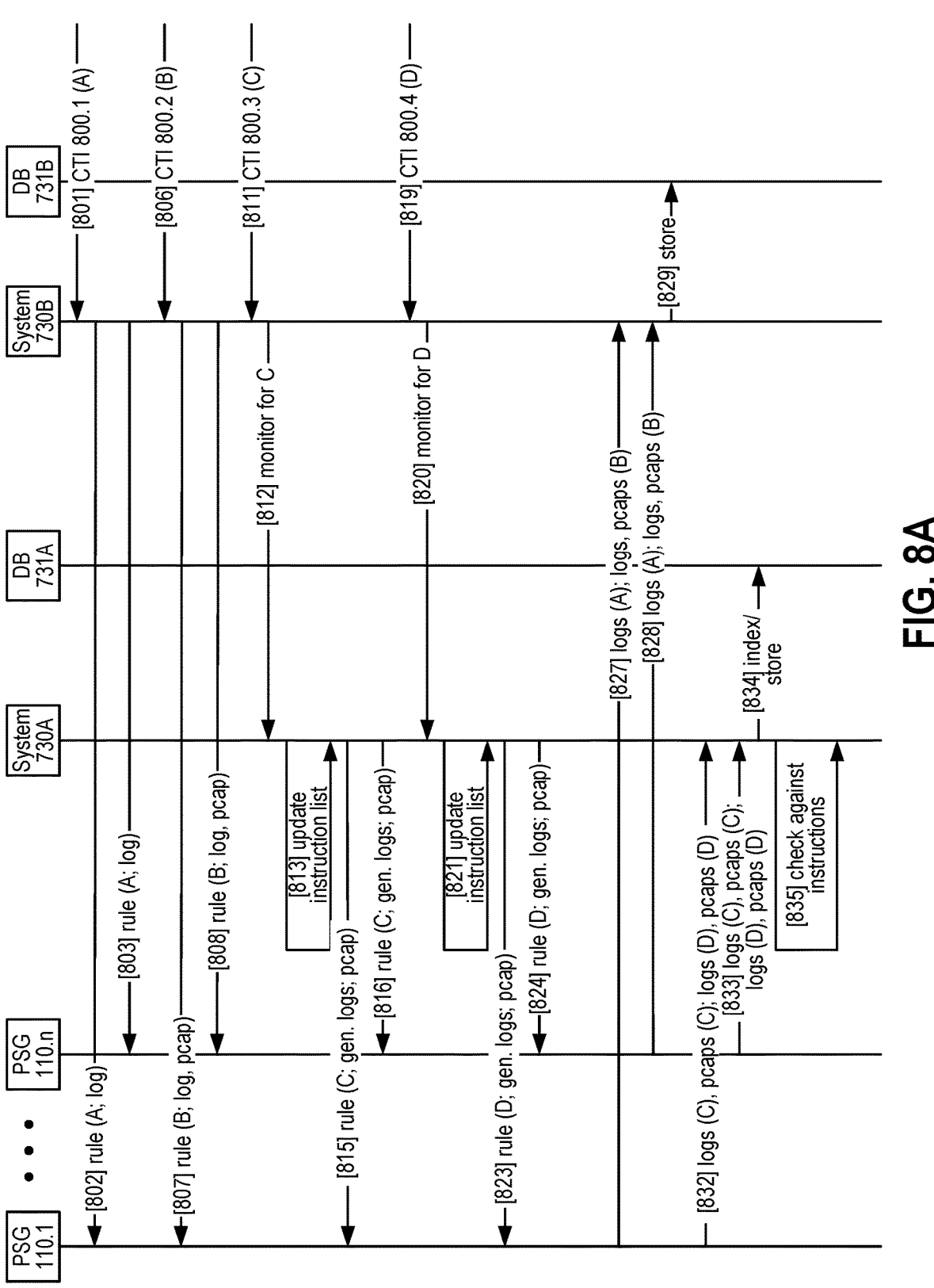
FIGS. 8A and 8B are a sequence diagram showing an example of events associated with filtering, aggregation, and/or retention control based on updated cyber threat intelligence.
Figure 8B:
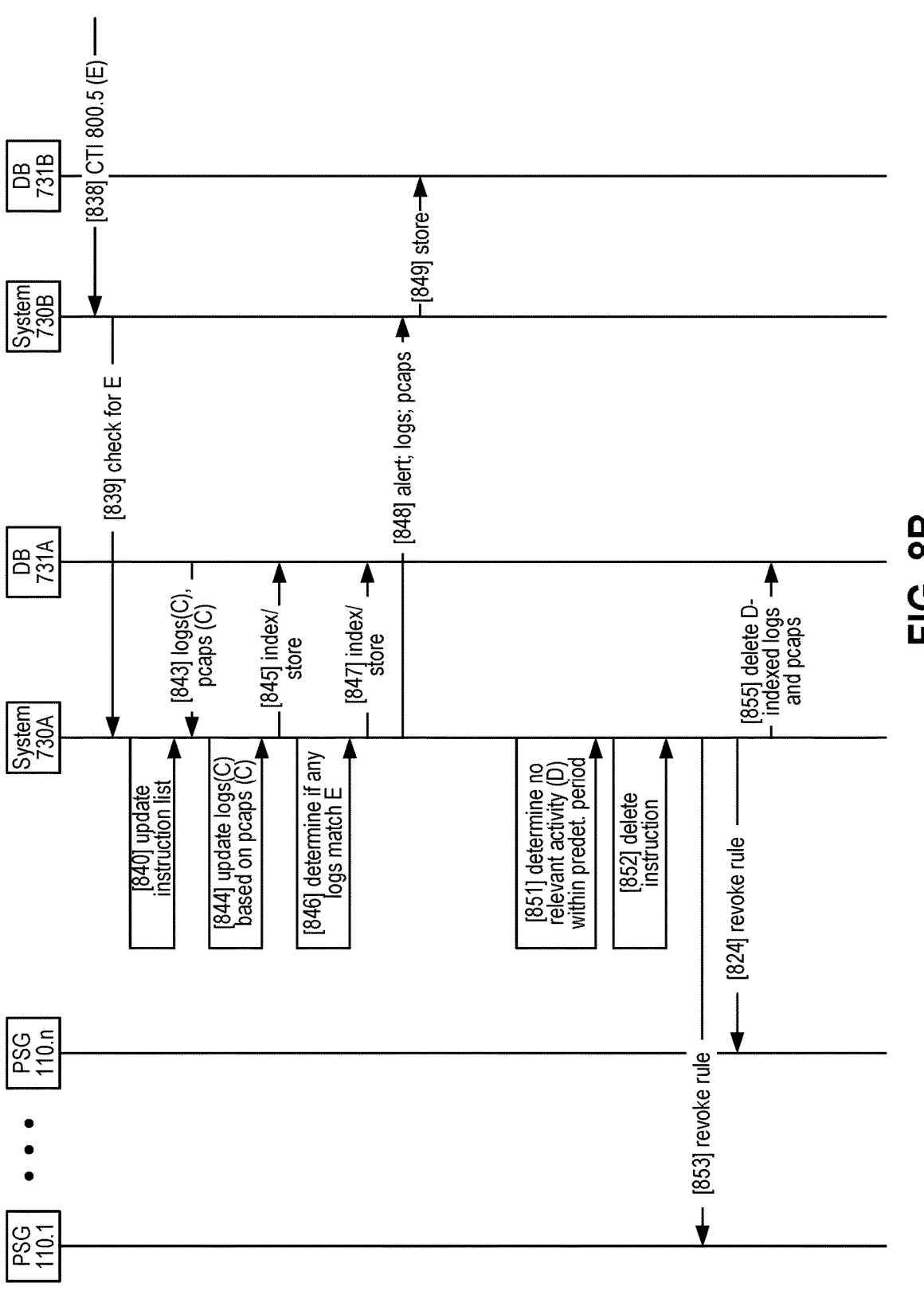

FIGS. 8A and 8B are a sequence diagram showing an example of events associated with filtering, aggregation, and/or retention control based on updated cyber threat intelligence. In particular, FIGS. 8A and 8B show an example of how the system 730A may act to collect, filter, and forward (or discard without forwarding) packets captured by the PSGs 110. The system 730A may forward some of those captured packets to the system 730B for additional processing (e.g., as herein above in connection with the system 130) if there is subsequent CTI relating to those packets. The system 730A may discard other captured packets (e.g., without forwarding to the system 730B or other computing devices) if there is no subsequent CTI relating to those other packets. FIG. 8B is a continuation of FIG. 8A. The example of FIGS. 8A and 8B is simplified for purposes of explanation. The number, order, and/or timing of the example events shown may be varied, additional events may occur, and/or one or more of the events shown in FIGS. 8A and 8B may be omitted, repeated, or modified. Events such as those shown in FIGS. 8A and 8B (or a portion thereof) may be performed alone or may be performed in combination with events such as one or more events shown in one or more other drawing figures and/or described herein.

In event 801, the system 730B may receive CTI data 800.1 that comprises data A (e.g., one or more NTIs) associated with a cyber threat or potential cyber threat. Based on the data A, the system 730B may generate one or more rules that comprise filtering criteria based on the data A (A-based criteria, which may comprise any of the types of packet filtering criteria described above), one or more operators configured to cause dropping or allowing transmission of packets matching the A-based criteria, and instructions to generate logs (e.g., logs such as described in connection with FIG. 4) for such matching packets. As used herein, "_-based criteria" (where "_" is A or some other letter) may be a single criterion (e.g., a specific value for a single NTI) or may comprise multiple criteria (e.g., one or more possible values for each of multiple NTIs). The one or more rules with the A-based criteria may be forwarded to the PSGs 110 in events 802 and 803. In event 806, the system 730B may receive CTI data 800.2 that comprises data B (e.g., one or more NTIs) associated with a cyber threat or potential cyber threat. Based on the data B, the system 730B may generate one or more rules that comprise B-based criteria (which may be based on the data B and may comprise any of the types of packet filtering criteria described above), one or more operators configured to cause dropping or allowing transmission of packets matching the B-based criteria, and instructions to generate logs for such matching packets. The one or more rules with the B-based criteria may be forwarded to the PSGs 110 in events 807 and 808. The CTI data 800.1 and 800.2, as well as other CTI data described in connection with FIGS. 8A and 8B, may be received from a CTIP 135, from an internal source (e.g., one or more analysis programs being executed by the system 730B), and/or from another source.

In event 811, the system 730B may receive CTI data 800.3 that comprises data C (e.g., one or more NTIs). The data C may not include sufficient information to determine, and it may not be known, whether the data C relates to a cyber threat or to a potential cyber threat. Also or alternatively, other information may suggest that the data C may not be significant. For example, the data C may have been received from a source known to provide data of questionable value. As another example, the data C may have been identified in connection with a broad effort to collect information possibly associated with a possible cyber threat (e.g., a collection of data for all packet traffic during a broad time range surrounding a possible incident), and there may not yet be enough reason to believe that the data C is actually related to the possible cyber threat. Because there may not yet be information to indicate whether the data C is significant (or will ever be significant), the system 730B may determine that analysis of logs for packets matching C-based criteria is currently unlikely to be useful, and/or that long-term storage of such logs or of packets matching the C-based criteria is not currently warranted. However, later information may indicate that data C is significant, and to allow time for such later information to be developed and/or received, temporary storage of packets matching the C-based criteria may be beneficial.

Accordingly, in event 812, the system 730B may instruct the system 730A that data traffic passing through the PSGs 110 should be monitored for packets matching the C-based criteria (which may be based on the data C and may comprise any of the types of packet filtering criteria described above), that copies of such packets should be stored for at least a predetermined amount of time (e.g., 30 days, 60 days, 90 days, etc.), and that logs of such packets should be generated with at least some minimal level of detail. For example, the system 730B may instruct that PSGs 110 should, for packets matching the C-based criteria, generate logs that indicate references to the C-based criteria, references to PSGs generating the logs, sizes of packets matching the C-based criteria, times and/or dates of packets matching the C-based criteria, and/or other basic information (e.g., a 5-tuple). Alternatively, and as described in more detail below, the system 730B may instruct that PSGs 110 should generate logs with more or less information for each packet matching the C-based criteria, or that no logs should be generated.

In event 813, the system 730A may update a list of instructions to store the instruction received in event 812. FIG. 9A shows at least a portion of stored data of the system 730A and of the database 731A after event 813. A list of instructions includes an instruction 901 corresponding to the instruction received in event 812. The instruction 901 indicates that logs should be generated for packets matching the C-based criteria and that such packets should be stored, and further indicates a time associated with the instruction 901. The system 730A may be configured to delete the instruction 901 and/or to delete any packets and/or logs stored based on the instruction 901 if there is no further instruction relating to the C-based criteria within a predetermined amount of time after the time associated with the instruction 901. Based on the instruction 901, the system 730A may generate one or more rules that include the C-based criteria and that instruct the PSGs 110 to generate logs for, and capture, packets matching the C-based criteria and forward those captured packets and logs to the system 730A, but that do not instruct the PSGs 110 to forward such packets or logs to the system 730B (and/or that instruct the PSGs 110 not to forward such packets or logs to the system 730B). At events 815 and 816, the system 730A may forward those one or more rules to the PSGs 110.

In event 819, the system 730B may receive CTI data 800.4 that comprises data D (e.g., one or more NTIs). Similar to the data C, the system 730B may determine that the data D is not significant (or not yet known to be significant), that analysis of logs for packets matching D-based criteria is currently unlikely to be useful, and/or that long-term storage of such logs or of packets matching the D-based criteria is not yet warranted, but that temporary storage of packets matching the D-based criteria may be beneficial. Accordingly, the system 730B may in event 820 (which may be similar to event 812) instruct the system 730A that data traffic passing through the PSGs 110 should be monitored for packets matching the D-based criteria (which may be based on the data D and may comprise any of the types of packet filtering criteria described above), that copies of such packets should be stored for a predetermined amount of time, and that logs of such packets should be generated with at least some minimal level of detail. In event 821, which may be similar to event 813, the system 730A may update the list of stored instructions to include the instruction received in event 820. FIG. 9B shows at least a portion of stored data of the system 730A and of the database 731A after event 821. The stored data includes an instruction 902 to generate logs for, and to store, packets matching the D-based criteria, as well as a time associated with that instruction. The system 730A may be configured to delete the instruction 902 and/or to delete any packets stored based on the instruction 902 if there is no further instruction relating to the D-based criteria within a predetermined amount of time after the time associated with the instruction 902. Based on the instruction 902, the system 730A may generate one or more rules that include the D-based criteria and that instruct the PSGs 110 to generate logs for, and capture, packets matching the D-based criteria and forward those captured packets and logs to the system 730A, but that do not instruct the PSGs 110 to forward such packets or logs to the system 730B (and/or that instruct the PSGs 110 not to forward such packets or logs to the system 730B). At events 823 and 824, the system 730A may forward those one or more rules to the PSGs 110.

Based on the rules sent in events 802, 803, 807, and 808, the PSGs 110 may filter packet traffic for packets matching the A-based criteria and the B-based criteria, may log packets matching the A-based criteria and the B-based criteria, and may capture packets matching the B-based criteria. In events 827 and 828, the PSGs 110 may forward those logs and captured packets (pcaps) to the system 730B. Events 827 and 828 may comprise forwarding those logs and captured packets directly to the system 730B. Alternatively, those logs and captured packets may be sent to the system 730A, which may forward those logs and packets to the system 730B. In event 829, the system 730B may store the logs and captured packets from events 827 and 828 in the database 731B. Although not shown in FIG. 8A, the system 730B may also perform additional processing of those logs and/or captured packets (e.g., such as the processing described in connection with the system 130).

Based on the rules sent in events 815, 816, 823, and 824, the PSGs 110 may filter data traffic for packets matching the C-based criteria or the D-based criteria, and may generate logs for and capture packets matching the C-based criteria or the D-based criteria. In events 832 and 833, the PSGs 110 may forward those logs and captured packets (pcaps) to the system 730A. In event 834, the system 730A may store the logs and captured packets from events 832 and 833 in the database 731A and may index those stored logs and captured packets to the criteria, rules, and/or instructions associated with capturing and storing those packets. FIG. 9C shows at least a portion of stored data of the system 730A and of the database 731A after event 834. The logs and the captured packets (pcaps) are stored in the database 731A. As shown by the "C" and "D" labels in FIG. 9C, each of the logs and stored packets may be flagged and/or otherwise indicated (e.g., by storing at particular memory addresses) as corresponding to the C-based criteria (and/or to the rules sent in events 815 and 816 and/or to the instruction 901) or to the D-based criteria (and/or to the rules sent in events 823 and 824 and/or to the instruction 902). As shown in FIG. 9C by the entries "C" and "D" in the "Pcaps Stored" table, the system 730A may store data to indicate that packets indexed to C- and D-based criteria (and/or corresponding rules and/or instructions) are stored in the database 731B. As shown in FIG. 9C by the entries "C" and "D" in the "Logs Stored" table, the system 730A may store data to indicate that logs for captured packets indexed to C- and D-based criteria (and/or corresponding rules and/or instructions) are stored in the database 731B. The entries in the Pcaps Stored and Logs Stored tables may also include indications of memory addresses where logs or packets associated with the entries are stored in the database 731B.

In event 835, the system 730A may, based on having stored logs and/or packets in the database 731A, determine whether any stored instructions indicate that any of the just-stored logs and/or packets should be further processed. In the example of event 835, there are no such instructions, and no further processing of the stored logs or packets is performed. Events 832 through 835 may be repeated multiple times. In some repetitions of event 832 and/or of event 833, only logs for, and copies of, packets matching the C-based criteria may be received. In some repetitions of event 832 and/or of event 833, only logs for, and copies of, packets matching the D-based criteria may be received.

In event 838 (FIG. 8B), the system 730B may receive CTI data 800.5 that comprises data E (e.g., one or more NTIs). The system 730B may determine (e.g., based on one or more determinations such as are described in connection with FIG. 6E or otherwise described herein) that data E and data C may relate (or potentially relate) to the same cyber threat, and that captured packets matching the C-based criteria may be significant if those packets also match E-based criteria. Accordingly, the system 730B may in event 839 send an instruction to the system 730A. In the instruction of event 839, the system 730A may be instructed to check captured packets matching the C-based criteria, and/or to check logs for captured packets matching the C-based criteria, for matches to the E-based criteria. The system 730A may further be instructed that, in the event there are one or more packets that match the C-based criteria (or logs for such packets) that also match the E-based criteria, perform one or more further actions associated with those logs and/or packets potentially being related to a cyber threat. Such further actions may comprise sending an alert to the system 730B (and/or to another computing device) indicating the match of logs and/or packets to the C- and E-based criteria, indicating a relationship (or potential relationship) of those logs and/or packets to a cyber threat, and/or indicating one or more other actions, determinations, or other items. Also or alternatively, further actions may comprise identifying and/or collecting packets that match the C- and E-based criteria, identifying and/or collecting other packets (e.g., all packets matching the C-based criteria), identifying and/or collecting logs corresponding to packets that match the C- and E-based criteria (and/or logs corresponding to other packets); forwarding any such packets and/or logs, causing storage of any such packets and/or logs, and/or other actions. Additional examples of further actions are provided below. Although not shown in the example of FIG. 8B, the instruction of event 839 may also instruct the system 730A that traffic passing through the PSGs 110 should be monitored for packets matching the E-based criteria, that copies of such packets should be stored for a predetermined amount of time, and/or that logs of such packets should be initially generated. If the system 730B had included such a further instruction, the system 730A may generate and send rules (e.g., similar to the rules of events 815, 816, 823, and 824) that cause the PSGs 110 to monitor for packets matching the E-based criteria, to generate logs for and capture such packets, and to forward logs and captured packets to the system 730A, etc.

In event 840, the system 730A may update the list of instructions to include the instruction received in event 839. FIG. 9D shows at least a portion of stored data of the system 730A and of the database 731A after event 840. That data includes an instruction 903 and an associated time of the instruction 903. The instruction 903 may indicate that the system 730A should check stored packets, that were captured based on matches to the C-based criteria, for matches to the E-based criteria. The instruction 903 may further indicate that, if stored packets match the C-based criteria and the E-based criteria, further actions should be performed (e.g., the system 730B should be alerted, copies of packets matching the C- and E-based criteria (and corresponding logs) should be sent to the system 730B). The instruction 903 may further include a time associated with the instruction 903, and which may be used for determining if a predetermined period of time has passed (e.g., for purposes of determining if the instruction 903 should be deleted if no relevant activity occurs).

Figures 9E, 9F, 9G:
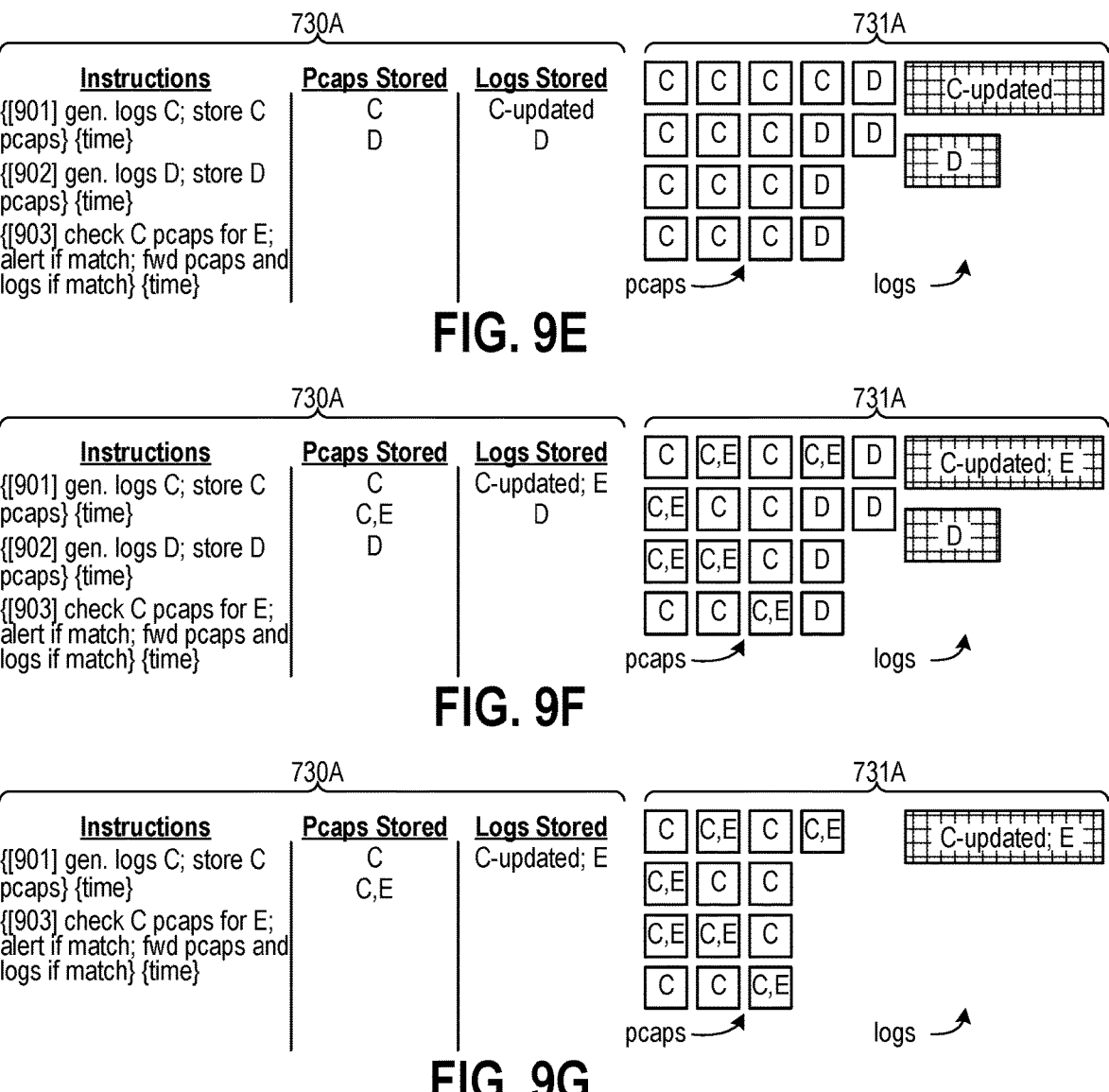

As part of event 840, the system 730A may determine if there are already copies of packets, stored in the database 731A, that match the C-based criteria. Based on the C entries in the Pcaps Stored and Logs Stored tables, the system 730A may determine that there are stored packets matching the C-based criteria and corresponding logs for such packets. In event 843, the system 730A may cause those stored packets matching the C-based criteria and corresponding logs to be retrieved from the database 731A. In event 844, the system 730A may update those retrieved logs based on those retrieved packets. For each of those retrieved packets, the system 730A may update a corresponding log by reading data from header fields of the packet, by reading time data associated with the packet, and/or by otherwise extracting information from (or about) the packet, and adding that information to the corresponding log. Each of the updated logs may, for example, be a log such as is described in connection with FIGS. 4 through 5D. As part of updating each of the corresponding logs, the system 730A may extract all information of the packet (or substantially all, e.g., all information outside of a payload field) that is not encrypted or otherwise obfuscated and may add that information to the corresponding log, or may extract less than substantially all extractable information (e.g., the system 730A may only extract information for any additional fields needed to check against the E-based criteria). In event 845, the system 730A may store the updated logs in the database 731B and may store data indexing those updated logs to the C-based criteria, the rules of events 815 and 816, and/or the instruction 901. FIG. 9E shows at least a portion of stored data of the system 730A and of the database 731A after event 845. The updated logs ("C-updated") may be stored in the database 731A and may be flagged and/or otherwise indicated (e.g., by storing at particular memory addresses) as corresponding to the C-based criteria (and/or to the rules sent in events 815 and 816 and/or to the instruction 901). As also shown in FIG. 9E by the entry "C-updated" in the "Logs Stored" table, the system 730A may store data to indicate that the updated logs indexed to the C-based criteria (and/or corresponding rules and/or instructions) are stored in the database 731B. The entry in the Logs Stored table may also include indications of memory addresses where logs associated with the entry are stored in the database 731B.

In event 846, the system 730A may determine if any of the updated logs for packets matching the C-based criteria also match E-based criteria. Although not shown in FIG. 8B, the system 730A may retain a local copy of those updated logs when storing and indexing the updated logs in event 845. Alternatively, after storing and indexing the updated logs in event 845, the system 730A may retrieve a copy of those updated logs as part of (or prior to) event 846. In event 846, the system 730A may determine that a portion of the updated logs match E-based criteria, and thus that the packets corresponding to that portion of the updated logs match the C-based criteria and the E-based criteria. In event 847, the system 730A may store data that indexes that portion of the updated logs, as well as the corresponding stored packets, to the C-based criteria and to the E-based criteria (and/or to the instruction 903). FIG. 9F shows at least a portion of stored data of the system 730A and of the database 731A after event 847. As indicated by the "C-updated; E" label, a portion of updated logs of packets matching the C-based criteria have been flagged and/or otherwise indicated as also matching the E-based criteria. That flagging/indication may further comprise separately storing such logs (not shown). As indicated by the C, E labels on a portion of the stored packets, the packets that matched the C-based criteria and the E-based criteria (and that correspond to logs that matched the C- and E-based criteria) have also been flagged and/or otherwise indicated. As further shown in FIG. 9F in the Pcaps Stored and Logs Stored tables by the C, E and C-updated; E entries, the system 730A may store data to indicate that packets indexed to C- and E-based criteria (and/or instruction 903) and logs for such packets are stored in the database 731B. The entries in the Pcaps Stored and Logs Stored tables may also include indications of memory addresses where packets and logs associated with the entries are stored in the database 731B.

In event 848, the system 730A may perform the further actions indicated by the instructions sent in event 839 and stored in event 840. For example, the system 730A may send an alert to the system 730B that captured packets matching the C-based criteria have also matched the E-based criteria. As part of event 848, the system 730A may also send copies of captured packets that matched the C-based criteria and the E-based criteria, and/or copies of logs corresponding to those captured packets, to the system 730B. Also or alternatively, the system 730A may send all captured packets matching the C-based criteria and/or corresponding logs for all of those captured packets. In event 849, the system 730B may store the logs and captured packets from event 848 in the database 731B. Although not shown in FIG. 8B, the system 730B may also perform additional processing of those logs and/or captured packets (e.g., such as the processing described in connection with the system 130).

The system 730A may continue to receive (from one or more of the PSGs 110) and store captured packets that match the C-based criteria and logs for such captured packets, and may perform operations with regard to such captured packets that are similar to those described above in connection with events 844 through 848 (e.g., update logs, determine if updated logs match the E-based criteria, etc.). Also or alternatively, if the system 730B sends additional instructions indicating (e.g., based on additional CTI) additional criteria against which packets matching C- and/or E-based criteria should be checked, the system 730A may continue to perform operations similar to those of events 844 through 848 using the additional criteria. The system 730A may continue to perform operations based on the instruction 903 and/or other instructions until instructed otherwise by the system 730B. For example, based on the alert, logs, and/or captured packets received in step 848, the system 730B may determine that the PSGs 110 should begin generating logs for and/or capturing packets matching the C-based criteria and/or the E-based criteria, and should send those logs and/or captured packets to the system 730B. Based on such a determination, the system 730B may send rules (e.g., in events similar to events 802, 803, 807, and 808) to the PSGs 100 and may send one or more instructions to the system 730A that cause the system 730A to delete instructions 901 and/or 903 and/or to revoke the rules sent in events 815 and 816. Also or alternatively, the system 730A may continue to store and process captured packets that match the C-based criteria (and corresponding logs) until there is no relevant activity (e.g., no further matches of packets matching the C-based criteria to the E-based criteria or to other criteria, no new instructions relating to comparing those packets to other criteria) for a predetermined time period.

In event 851, the system 730A may determine that there has been no relevant activity, within a predetermined time period following the time associated with the instruction 902, associated with the instruction 902 and/or the stored packets matching the D-based criteria (or logs for those packets). An absence of relevant activity may comprise no further instructions to take any action with regard to captured packets matching the D-based criteria (e.g., no instructions to check such packets or corresponding logs for matches to other criteria), no match of packets matching the D-based criteria to other criteria indicated by further instructions (had such further instructions been received), an absence of any accessing of stored packets matching the D-based criteria (or of corresponding logs), etc. Based on a determination of no relevant activity, the system 730A may delete the instruction 902 in event 852 and may generate and send (in events 853 and 854) instructions to the PSGs 110 that revoke the rules sent in events 823 and 824. Revocation of the rules sent in events 823 and 824 may, for example, cause the PSGs 110 to cease capturing and sending packets matching D-based criteria (and to cease generating and sending logs for packets matching D-based criteria) based on the rules sent in events 823 and 824, but may not effect other rules relating to the D-based criteria. Also based on the determination of no relevant activity, the system 730A may in event 855 cause deletion of stored packets that matched the D-based criteria (and corresponding logs) and that are indexed to the instruction 902. FIG. 9G shows at least a portion of stored data of the system 730A and of the database 731A after event 855.

The example of FIGS. 8A and 8B was simplified for purposes of explanation, and numerous variations are within the scope of this disclosure. Many of the events shown in FIGS. 8A and 8B may occur multiple times (e.g., events 827-829, events 832-835). As additional packets matching C- and/or D-based criteria are received, those additional packets may be indexed and stored. As additional logs for such packets are received, those additional logs may be indexed and stored (e.g., by appending later logs for packets matching C-based criteria to earlier logs for packets matching C-based criteria, by appending later logs for packets matching D-based criteria to earlier logs for packets matching D-based criteria). Events similar to those shown in FIGS. 8A and 8B, but relating to other CTI data and related instructions, rules, etc., may also occur multiple times and/or at times interlaced with times of the events shown in FIGS. 8A and 8B. An instruction that causes the system 730A to compare previously stored captured packets against additional criteria may be different from the instruction 903. For example, such an instruction may cause comparing stored packets against one or more additional criteria, but may not result in sending of an alert or sending of logs and/or captured packets in the event of a match to those one or more additional criteria. Instead, that instruction may simply indicate that packets matching the one or more additional criteria should be noted, and one or more further instructions may cause further comparing of those noted packets to one or more further sets of criteria, and/or may cause sending of an alert (and/or of logs and/or captured packets) after one or more stored packets are determined to have matched multiple sets criteria. One or more of those later instructions may comprise data, received from the system 730B, that allows additional portions of logs to be updated. For example, the system 730B may send an instruction to the system 730A that causes the system 730A to check stored packets matching the D-based criteria for matches to F-based criteria, but that indicates that packets matching the F-based criteria should simply be noted (e.g., no alert is to be sent). The system 730B may send a subsequent instruction to the system 730A that causes the system 730A to check packets, noted to match the D- and F-based criteria, against G-based criteria, and to send an alert if one or more packets match the D-, F-, and G-based criteria. When sending the subsequent instruction relating to the G-based criteria, the system 730B may include data (e.g., a deobfuscation algorithm) that allows reading of packet portions relating to the G-based criteria.

As further examples of variations on the example of FIGS. 8A and 8B, and as indicated above, the system 730A may instruct the PSGs 110 (e.g., in steps such as events 815, 816, 823, and 824) to generate logs with more or less information for packets matching criteria such as the C- and D-based criteria. Alternatively, the system 730A may not instruct the PSGs 110 to generate logs for packets matching criteria such as the C- and D-based criteria, and/or may instruct the PSGs 110 not to generate such logs. If the PSGs 110 do not generate such logs, event 844 may be modified to comprise generating logs from stored packets matching criteria such as the C- and D-based criteria. If the PSGs 110 do generate logs for captured packets matching criteria such as the C- and D-based criteria, those logs and captured packets need not be forward together. For example, PSGs 110 may stream logs to the system 730A and forward captured packets at predefined times, or vice versa. Event 844 may comprise updating and generating logs, and/or generating logs based on previous generated logs. For example, event 844 may comprise generating flow logs that comprise logs for multiple packets that are associated with a flow, and/or that are otherwise associated, and for which the association may not have been recognizable (and/or may have been less easily recognized) until multiple packets had been captured.

As yet further examples of variations on the example of FIGS. 8A and 8B, all data (e.g., stored packets and corresponding logs) need not be deleted after a determination (e.g., as in event 851 with regard to the D-based criteria) that there has been no relevant activity within a predetermined time period. For example, event 855 may comprise deleting stored packets, but retaining corresponding logs or data based on those logs. Also or alternatively, data could be retained indicating how many packets matched the D-based criteria during a time period that the rule 902 was active.

Figure 10A:

FIGS. 10A and 10B are a sequence diagram showing another example of events associated with filtering, aggregation, and/or retention control based on updated cyber threat intelligence. FIG. 10B is a continuation of FIG. 10A. The example of FIGS. 10A and 10B is similar to the example of FIGS. 8A and 8B. In the example of FIGS. 10A and 10B, however, the system 730A may act to collect, filter, and forward (or discard without forwarding) packets captured by a network boundary device other than a PSG 110. In the example of FIGS. 10A and 10B, that boundary device is the firewall 153 of the network 151. However, events such as those shown in FIGS. 10A and 10B may be performed with regard to other types of boundary devices (e.g., a proxy, a server associated with the ISP 157, etc.). The example of FIGS. 10A and 10 is simplified for purposes of explanation. The number, order, and/or timing of the example events shown may be varied, additional events may occur, and/or one or more of the events shown in FIGS. 10A and 10B may be omitted, repeated, or modified. Events such as those shown in FIGS. 10A and 10B (or a portion thereof) may be performed alone or may be performed in combination with events such as one or more events shown in one or more other drawing figures and/or described herein.

In event 1001, which may be similar to event 811 of FIG. 8A, the system 730B may receive CTI data 1000.1 that comprises the data C. As in the example of FIGS. 8A and 8B, the system 730B may determine that analysis of logs for packets matching C-based criteria is unlikely to be useful, and/or that long-term storage of such logs or of packets matching the C-based criteria is not yet warranted. However, there may be a later determination that data C is significant, and temporary storage of packets matching the C-based criteria may thus be beneficial. In event 1002, which may be similar to event 812, the system 730B may instruct the system 730A that data traffic passing through the firewall 153 should be monitored for packets matching the C-based criteria, that copies of such packets should be stored for at least a predetermined amount of time, and that logs for such packets should be generated with at least some minimal level of detail. In event 1003, which may be similar to event 813, the system 730A may update a list of instructions to store the instruction received in event 1002. Based on that instruction, the system 730A may generate an instruction that includes the C-based criteria and that instructs the firewall 153 to generate logs for, and capture, packets matching the C-based criteria and forward those captured packets and logs to the system 730A. In event 1004, which may be similar to events 815 and 816, the system 730A may forward the generated instruction to the firewall 153.

In event 1008, which may be similar to event 819 of FIG. 8A, the system 730B may receive CTI data 1000.2 that comprises the data D. As in the example of FIGS. 8A and 8B, the system 730B may determine that analysis of logs for packets matching D-based criteria is unlikely to be useful, and/or that long-term storage of such logs or of packets matching the D-based criteria is not yet warranted, but that temporary storage of packets matching the D-based criteria may be beneficial. In event 1009, which may be similar to event 820, the system 730B may instruct the system 730A that data traffic passing through the firewall 153 should be monitored for packets matching the D-based criteria, that copies of such packets should be stored for at least a predetermined amount of time, and that logs of such packets should be generated with at least some minimal level of detail. In event 1010, which may be similar to event 821, the system 730A may update a list of instructions to store the instruction received in event 1009. Based on that instruction, the system 730A may generate an instruction that includes the D-based criteria and that instructs the firewall 153 to generate logs for, and to capture, packets matching the D-based criteria and forward those captured packets and logs to the system 730A. In event 1011, which may be similar to events 823 and 824, the system 730A may forward the generated instruction to the firewall 153.

The firewall 153 may be configured so that all packets being sent to a host 152 from a host outside the network 151, as well as all packets being sent from a host 152 to a host outside the network 151, pass through the firewall 153. In event 1015, the firewall 153 may send copies of packets that passed through the firewall 153 and that match either the C-based criteria or the D-based criteria, as well as logs for such packets, to the system 730A. In event 1016, which may be similar to event 834, the system 730A may store the logs and captured packets from event 1015 in the database 731A and may index those stored packets to the criteria and/or instructions that were the bases for capturing and storing those packets and for generating the corresponding logs. In event 1017, which may be similar to event 835, the system 730A may, based on having stored logs and/or packets in the database 731A, determine whether any stored instructions indicate that any of the just-stored logs and/or packets should be further processed. In the example of event 1017, there are no such instructions, and no further processing of the stored logs or packets is performed. Events 1015 through 1017 may be repeated multiple times. In some repetitions of event 1017, the firewall 153 may only send logs for, and copies of, packets matching the C-based criteria. In some repetitions of event 1017, the firewall 153 may only send logs for, and copies of, packets matching the D-based criteria.

In event 1021, which may be similar to event 838 of FIG. 8B, the system 730B may receive CTI data 1000.3 that comprises data E (e.g., one or more NTIs). The system 730B may determine (e.g., based on one or more determinations such as are described in connection with FIG. 6E or otherwise described herein) that data E and data C may relate (or potentially relate) to the same cyber threat, and that captured packets matching the C-based criteria may be significant if those packets also match E-based criteria. In event 1022, which may be similar to event 839, the system 730B may send an instruction to the system 730A to check captured packets matching the C-based criteria for matches to the E-based criteria. In event 1023, which may be similar to event 840, the system 730A may update the list of instructions to include the instruction received in event 1022 and may determine that there are stored packets matching the C-based criteria. In event 1024, which may be similar to event 843, the system 730A may cause those stored packets matching the C-based criteria corresponding logs to be retrieved from the database 731A. In event 1025, which may be similar to event 844, the system 730A may update those retrieved logs based on those retrieved packets. In event 1026, which may be similar to event 845, the system 730A may store the updated logs in the database 731B and may store data indexing those updated logs to the C-based criteria and/or to the instruction(s) associated with capturing packets based on the C-based criteria.

In event 1027 (FIG. 10B), which may be similar to event 846, the system 730A may determine that a portion of the updated logs match E-based criteria, and thus that the packets corresponding to that portion of the updated logs match the C-based criteria and the E-based criteria. In event

1028, which may be similar to event 847, the system 730A may store data that indexes that portion of the updated logs, as well as the corresponding stored packets, to the C-based criteria and to the E-based criteria (and/or to the instruction stored in event 1023). In event 1029, the system 730A may perform further action, indicated by the instruction stored in event 1023, based on the determination that there are packets matching the C- and E-based criteria. The further action may comprise sending the SIEM system 702 an alert indicating that captured packets matching the C-based criteria have also matched the E-based criteria, collecting and/or sending copies of captured packets that matched the C-based criteria and the E-based criteria, and/or collecting and/or sending copies of logs corresponding to those captured packets. Also or alternatively, the system 730A may collect and/or send all captured packets matching the C-based criteria and/or corresponding logs for all of those captured packets to the SIEM system 702. The system 730A may, in addition to (or as an alternative to) sending an alert, captured packets, and/or logs to the SIEM system 702, send the alert, captured packets, and/or logs to one or more other computing devices (e.g., the system 730B, a SOAR platform, etc.).

The system 730A may continue to receive (from the firewall 153) and store captured packets that match the C-based criteria and logs for such captured packets, and may perform operations with regard to such captured packets that are similar to those described above in connection with events 1025 through 1029 (e.g., update logs, determine if updated logs match the E-based criteria, etc.). The system 730A may continue to do so, and/or to perform other operations (e.g., based on further instructions relating to packets that match the C-based criteria) until instructed otherwise by the system 730B or other computing device. Also or alternatively, the system 730A may continue to store and process captured packets (and corresponding logs) that match C-based criteria until there is no relevant activity (e.g., no further matches of packets matching the C-based criteria to the E-based criteria or to other criteria, no new instructions relating to comparing those packets to other criteria) for a predetermined time period.

Events 1033 and 1034 may be similar to events 851 and 852, respectively. Event 1035 may be similar to event 853 or event 854, with the exception that event 1035 involves sending a revocation instruction to the firewall 153. Event 1036 may be similar to event 855.

The example of FIGS. 10A and 10B was simplified for purposes of explanation, and numerous variations are within the scope of this disclosure. Many of the events shown in FIGS. 10A and 10B may occur multiple times, and events similar to those shown in FIGS. 10A and 10B, but relating to other CTI data and related instructions, rules, etc., may also occur multiple times and/or at times interlaced with times of the events shown in FIGS. 10A and 10B. An instruction that causes the system 730A to compare previously stored captured packets against additional criteria may be different from the instruction stored in event 1023. Nonlimiting examples of such different types of instructions are provided above in connection with the example of FIGS. 8A and 8B. Other variations on the example of FIGS. 10A-10B may include variations similar to those discussed above in connection with the example of FIGS. 8A-8B. For example, the system 730A may instruct the firewall 153 (e.g., in events such as events 1004 and 1011) to generate logs with more or less information for packets matching criteria such as the C- and D-based criteria. Alternatively, the system 730A may not instruct the firewall 153 to generate logs for packets matching criteria such as the C- and D-based criteria, and/or may instruct the firewall 153 not to generate such logs. If the firewall 153 does not generate such logs, event 1025 may be modified to comprise generating logs from stored packets matching criteria such as the C- and D-based criteria.

Figure 11A:
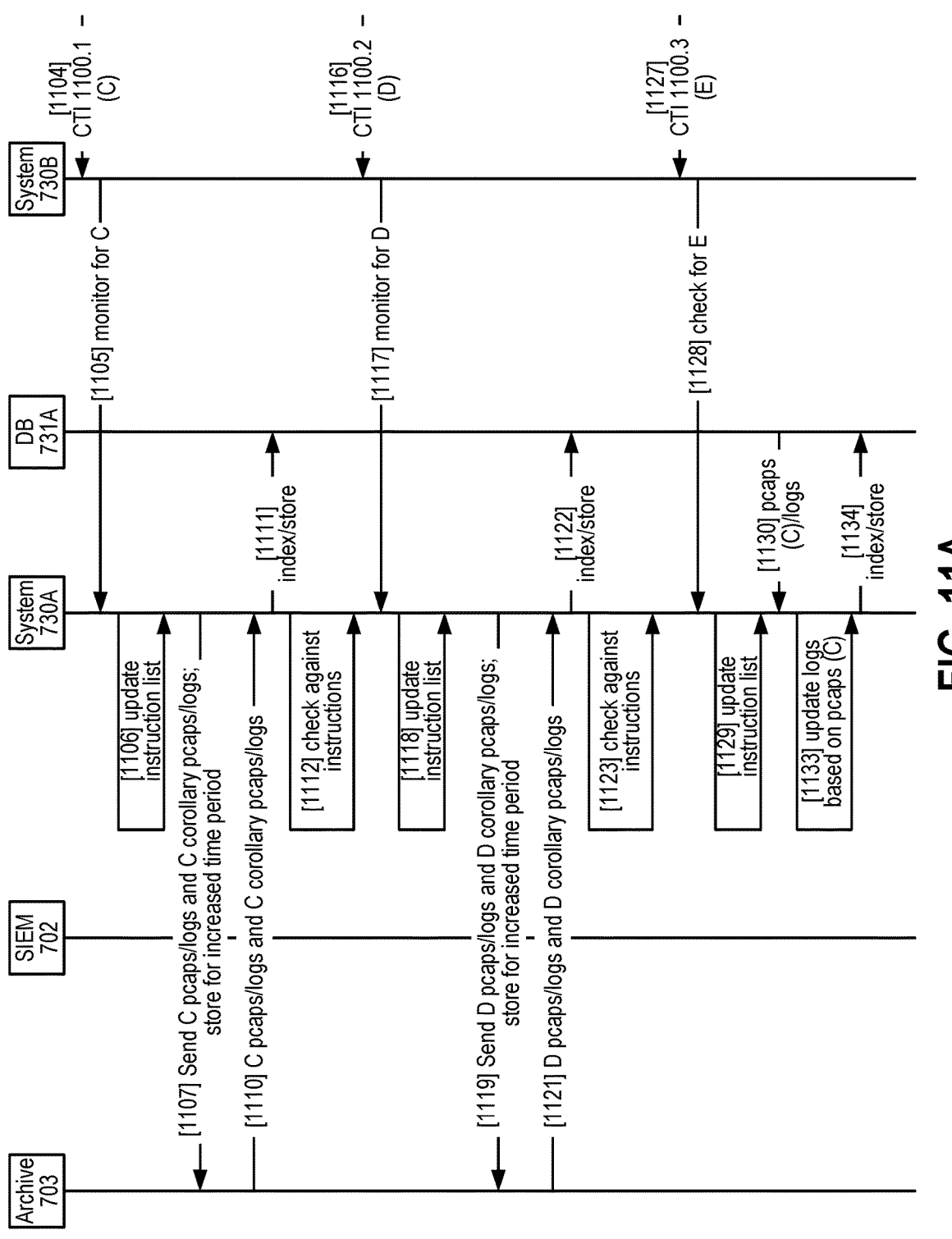
FIGS. 11A and 11B are a sequence diagram showing a further example of events associated with filtering, aggregation, and/or retention control based on updated cyber threat intelligence.
Figure 11B:
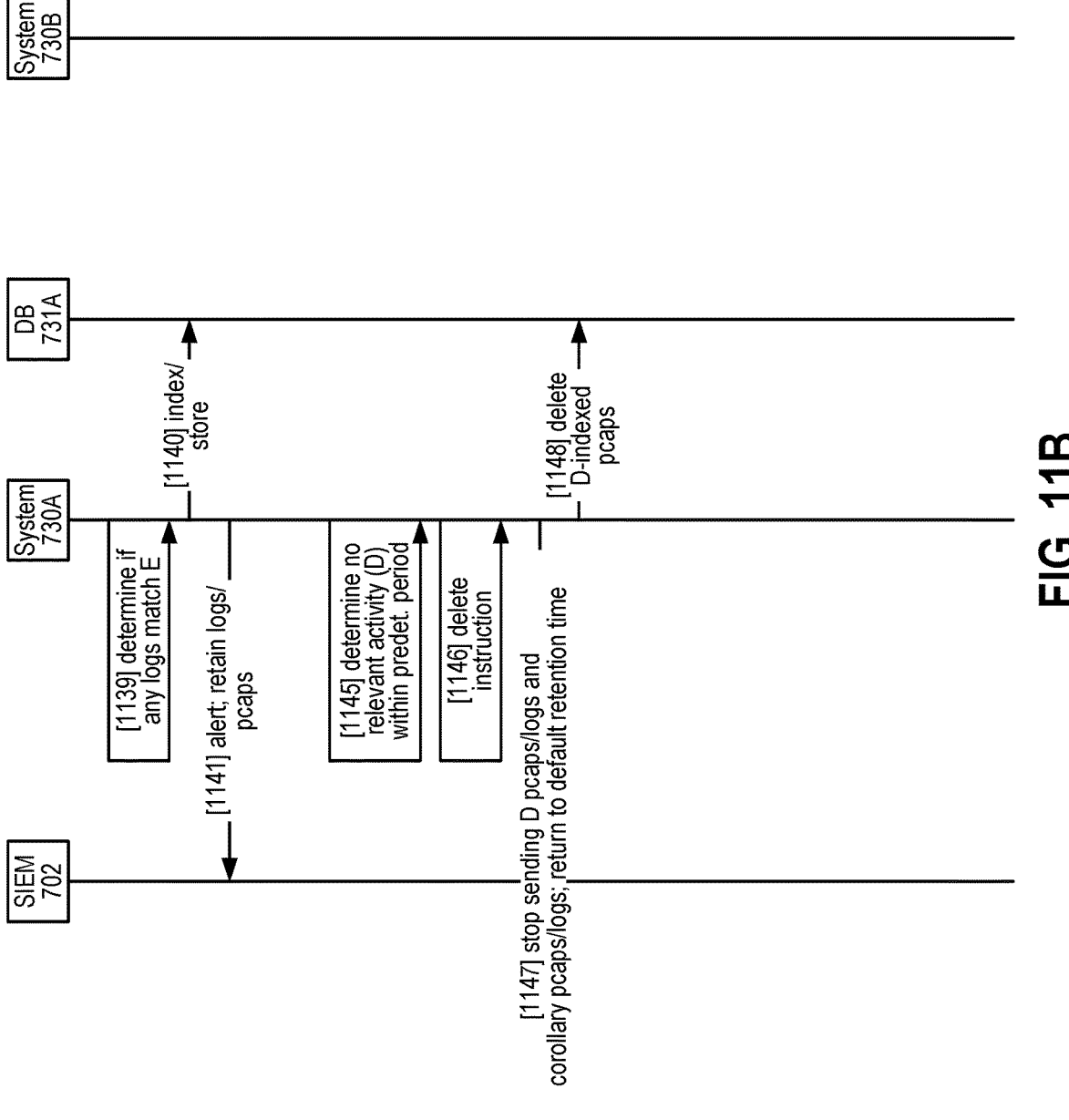

FIGS. 11A and 11B are a sequence diagram showing a further example of events associated with filtering, aggregation, and/or retention control based on updated cyber threat intelligence. FIG. 11B is a continuation of FIG. 11A. In the example of FIGS. 11A and 11B, the firewall 153 may be configured (e.g., separate from any instructions received from the system 730A or the system 730B) to capture some or all packets that pass through the firewall 153 (e.g., all packets being sent to a host 152 from a host outside the network 151, as well as some or all packets being sent from a host 152 to a host outside the network 151), to generate at least some basic level of logs for all of those packets (e.g., 5-tuple or portion thereof (e.g., IP address of host 152 sending or receiving the packet), a media access control (MAC) address of a device sending or receiving the packet), and to forward those captured packets and logs to the archive 703. Because of the volume of data associated with capturing all packets, however, the archive 703 may be configured to store copies of captured packets and corresponding logs for a default retention time that is relatively brief (e.g., 5 days). If certain packets are related to a cyber threat, those packets may be lost (and thus unavailable for analysis or other activities associated with detecting and/or remediating the cyber threat) if the relationship is not discovered within the default retention time. In some cases, there may be early information (e.g., the data C or the data D) that might be related to a cyber threat, but that is not yet known to be significant. If later information (e.g., the data E) showing the significance of the early information is not received and acted on within the default retention time, important data (e.g., early packets related to the threat) may be lost.

To increase retention time for packets potentially related to a cyber threat, and as described in more detail below, the system 730A may request copies of captured packets based on early information, may store local copies of those packets, and/or may advise the archive 703 that those packets should be retained for a time longer than the default retention time. The system 730A may, based on criteria from later information, determine that some or all of the local copies of the packets are more likely to be significant and alert the SIEM system 703 about those packets, and/or may cause those packets to be retained. Additional features are described below. The number, order, and/or timing of the example events shown in FIGS. 11A and 11B may be varied, additional events may occur, and/or one or more of the events shown in FIGS. 11A and 11B may be omitted, repeated, or modified. Events such as those shown in FIGS. 11A and 11B (or a portion thereof) may be performed alone or may be performed in combination with events such as one or more events shown in one or more other drawing figures and/or described herein.

In event 1104, which may be similar to event 811 of FIG. 8A, the system 730B may receive CTI data 1100.1 that comprises the data C. As in the example of FIGS. 8A and 8B, the system 730B may determine that analysis of logs for packets matching C-based criteria is unlikely to be useful, and/or that long-term storage of such logs or of packets matching the C-based criteria is not yet warranted. However, there may be a later determination that data C is significant, and temporary storage of packets matching the C-based criteria may thus be beneficial. In event 1105, which may be similar to event 812, the system 730B may instruct the system 730A that packets and/or logs stored by the archive 703 should be monitored for packets and/or logs matching the C-based criteria, and that copies of such packets and/or logs should be stored for at least a predetermined amount of time. The instruction of event 1105 may further instruct that corollary packets (and/or logs for corollary packets) should also be stored. Corollary packets for a packet matching a particular set of one or more criteria may comprise packets that are sent to (or received from) the host 152 that sent or received the packet matching that set of criteria, and that are sent (or received) within a corollary packet time range (e.g., 15 minutes before and 15 minutes after sending or receiving a packet matching that set of criteria). For example, if the host 152-1 sends a packet matching the C-based criteria at 12:00 p.m. on a particular day, corollary packets for that packet sent at 12:00 p.m. may comprise all packets addressed to or from the host 152-1 that pass through the firewall 153 between 11:45 a.m. and 12:15 p.m. on that same day. For convenience, corollary packets for packets matching particular criteria are referred to below as "_-based criteria corollary packets." For example, corollary packets for packets matching the C-based criteria may be referred to as "C-based criteria corollary packets." Corollary packet time ranges may be different for different criteria used to identify packets. For example, a corollary packet time range for C-based criteria corollary packets may be 15 minutes before and 15 minutes after a time associated with a packet matching the C-based criteria, but a corollary packet time range for D-based criteria corollary packets may be 30 minutes before and 30 minutes after a time associated with a packet matching the D-based criteria.

In event 1106, which may be similar to event 813, the system 730A may update a list of instructions to store the instruction received in event 1105. In event 1107, the system 730A may forward an instruction that instructs the archive 703 to: (i) send copies of captured packets (and corresponding logs) that match the C-based criteria and that are currently-stored by the archive 703, (ii) send copies of C-based criteria corollary packets (and corresponding logs) that are currently-stored by the archive 703, (iii) send copies of packets, subsequently received by the archive 703, that match the C-based criteria, (iv) send copies of C-based criteria corollary packets subsequently received by the archive 703, (v) send copies of logs of subsequently-received packets matching the C-based criteria and of subsequently-received C-based criteria corollary packets, and (vi) begin storing, for an increased time period (e.g., 30 days, 60 days, 90 days, etc.) longer than the default retention period, packets that match the C-based criteria, logs of packets that match the C-based criteria, C-based criteria corollary packets, and logs of C-based criteria corollary packets.

In event 1110, the archive 703 may send copies of captured packets (and corresponding logs) that match the C-based criteria and that are currently-stored by the archive 703, as well as copies of C-based criteria corollary packets (and corresponding logs) that are currently-stored by the archive 703. In event 1111, the system 730A may store the packets and the logs, received in event 1110, in the database 731A. As part of event 1111, the system 730A and may index those stored packets and stored logs to the C-based criteria, to the instruction stored in event 1106, and/or to the instruction of event 1107. The system 730A may index those stored packets and logs using methods such as those described in connection with FIGS. 8A, 8B, 9C, 9E, and 9F. The stored C-based criteria corollary packets and corresponding logs may be further indexed as such so that further processing of those packets and logs by the system 730A may be omitted, but so that those packets and logs may be identified and forwarded if appropriate (e.g., if packets or logs matching the C-based criteria are determined to match one or more additional criteria). In event 1112, which may be similar to event 835, the system 730A may, based on having stored packets in the database 731A, determine whether any stored instructions indicate that any of the just-stored packets should be further processed. In the example of event 1112, there are no such instructions, and no further processing of the stored packets is performed. Events 1110 through 1112 may be repeated multiple times (e.g., as the archive 703 forwards copies of additional packets matching the C-based criteria and additional C-based criteria corollary packets subsequently received by the archive 703, as well as corresponding logs).

In event 1116, which may be similar to event 819 of FIG. 8A, the system 730B may receive CTI data 1100.2 that comprises the data D. As in the example of FIGS. 8A and 8B, the system 730B may determine that analysis of logs for packets matching D-based criteria is unlikely to be useful, and/or that long-term storage of such logs or of packets matching the D-based criteria is not yet warranted. However, there may be a later determination that data D is significant, and temporary storage of packets matching the D-based criteria may thus be beneficial. In event 1117, which may be similar to event 820, the system 730B may instruct the system 730A that packets stored by the archive 703 should be monitored for packets matching the D-based criteria, and that copies of such packets should be stored for at least a predetermined amount of time. The instruction of event 1117 may further instruct that D-based criteria corollary packets should also be stored.

In event 1118, which may be similar to event 821, the system 730A may update the list of instructions to store the instruction received in event 1117. In event 1119, the system 730A may forward an instruction that instructs the archive 703 to: (i) send copies of captured packets (and corresponding logs) that match the D-based criteria and that are currently-stored by the archive 703, (ii) send copies of D-based criteria corollary packets (and corresponding logs) that are currently-stored by the archive 703, (iii) send copies of packets, subsequently received by the archive 703, that match the D-based criteria, (iv) send copies of D-based criteria corollary packets subsequently received by the archive 703, (v) send copies of logs of subsequently-received packets matching the D-based criteria and of subsequently-received D-based criteria corollary packets, and (vi) begin storing, for an increased time period longer than the default retention period, packets that match the D-based criteria, logs of packets that match the D-based criteria, D-based criteria corollary packets, and logs of D-based criteria corollary packets.

In event 1121, the archive 703 sends copies of captured packets (and corresponding logs) that match the D-based criteria and that are currently-stored by the archive 703, as well as copies of D-based criteria corollary packets (and corresponding logs) that are currently-stored by the archive 703. In event 1122, the system 730A may store the packets and the logs, received in event 1121, in the database 731A. As part of event 1122, the system 730A and may index those stored packets and stored logs to the D-based criteria, to the instruction stored in event 1118, and/or to the instruction of event 1119. The system 730A may index those stored packets and logs using methods such as those described in connection with FIGS. 8A, 8B, 9C, 9E, and 9F. The stored D-based criteria corollary packets and corresponding logs may be further indexed as such so that further processing of those packets and logs by the system 730A may be omitted, but so that those packets and logs may be identified and forwarded if appropriate (e.g., if packets or logs matching the D-based criteria are determined to match one or more additional criteria). In event 1123, which may be similar to event 835, the system 730A may, based on having stored packets in the database 731A, determine whether any stored instructions indicate that any of the just-stored packets should be further processed. In the example of event 1123, there are no such instructions, and no further processing of the stored packets is performed. Events 1121 through 1123 may be repeated multiple times (e.g., as the archive 703 forwards copies of additional packets matching the D-based criteria and additional D-based criteria corollary packets subsequently received by the archive 703, as well as corresponding logs).

In event 1127, which may be similar to event 838 of FIG. 8B, the system 730B may receive CTI data 1100.3 that comprises data E (e.g., one or more NTIs). The system 730B may determine (e.g., based on one or more determinations such as are described in connection with FIG. 6E or otherwise described herein) that data E and data C may relate (or potentially relate) to the same cyber threat, and that captured packets matching the C-based criteria may be significant if those packets also match E-based criteria. In event 1128, which may be similar to event 839, the system 730B may send an instruction to the system 730A to check captured packets matching the C-based criteria for matches to the E-based criteria. In event 1129, which may be similar to event 840, the system 730A may update the list of instructions to include the instruction received in event 1128 and may determine that there are stored packets matching the C-based criteria. In event 1130, which may be similar to event 843, the system 730A may cause those stored packets matching the C-based criteria, as well as corresponding logs, to be retrieved from the database 731A. In event 1133, which may be similar to event 844, the system 730A may update the retrieved logs for each of those retrieved packets. In event 1134, which may be similar to event 845, the system 730A may store the updated logs in the database 731B and may store data indexing those updated logs to the C-based criteria and/or to the instruction(s) associated with capturing packets based on the C-based criteria.

In event 1139 (FIG. 11B), which may be similar to event 846, the system 730A may determine that a portion of the stored updated logs for packets matching the C-based criteria also match the E-based criteria, and thus that the packets corresponding to that portion of the stored updated logs match the C-based criteria and the E-based criteria. In event 1140, which may be similar to event 847, the system 730A may store data that indexes that portion of the logs, as well as the corresponding stored packets, to the C-based criteria and to the E-based criteria (and/or to the instruction stored in event 1129).

In event 1141, the system 730A may perform further action, indicated by the instruction stored in event 1129, based on the determination that there are packets matching the C- and E-based criteria. The further action may comprise the system 730A sending the SIEM system 702 an alert indicating that captured packets matching the C-based criteria have also matched the E-based criteria, that packets (and/or corresponding logs) matching the C- and E-based criteria should continue to be retained (e.g., for an additional increased time period or for a longer period, and/or until further notice), and/or that C- and E-based criteria corollary packets (e.g., corollary packets for the packets matching the C- and E-based criteria) (and/or corresponding logs) should continue to be retained (e.g., for an additional increased time period or for a longer period, and/or until further notice). Also or alternatively, the alert may indicate that all packets (and/or corresponding logs) matching the C-based criteria should continue to be retained, and/or that all C-based criteria corollary packets (and/or corresponding logs) should continue to be retained. The further action (and event 1141) may further comprise the system 730A collecting and/or sending: copies of packets that matched the C-based criteria and the E-based criteria, copies of logs corresponding to those packets, copies of C- and E-based criteria corollary packets, copies of logs corresponding to those packets, copies of all packets matching the C-based criteria, copies of logs corresponding to those packets, copies of C-based criteria corollary packets for all packets matching the C-based criteria, and/or copies of logs corresponding to those packets. The system 730A may, in addition to (or as an alternative to) sending an alert, captured packets, and/or logs to the SIEM system 702, send the alert, captured packets, and/or logs to one or more other computing devices (e.g., the system 730B, a SOAR platform, the archive 703, etc.).

The system 730A may continue to receive (from the archive 703) and store packets (and corresponding logs) that match the C-based criteria, may continue to receive and store C-based criteria corollary packets (and corresponding logs), and may continue to perform operations with regard to such packets and logs that are similar to those described above in connection with events 1111, 1112, and 1133 through 1141. The system 730A may continue to do so until instructed otherwise by the system 730B or other computing device. Also or alternatively, the system 730A may continue to store and process captured packets matching the C-based criteria and corresponding logs (and/or continue to store C-based criteria corollary packets and corresponding logs) until there is no relevant activity (e.g., no further matches of packets matching the C-based criteria to the E-based criteria or to other criteria, no new instructions relating to comparing those packets to other criteria) for a predetermined time period.

Events 1145 and 1146 may be similar to events 851 and 852, respectively. Event 1147 may be similar to event 853 or event 854, with the exception that event 1147 involves sending a revocation instruction to the archive 703. Assuming there is no other instruction requesting such items or requesting increased retention time for such items, the revocation instruction of event 1147 may cause the archive 703 to stop sending captured packets matching the D-based criteria (or corresponding logs), stop sending captured D-based criteria corollary packets (and corresponding logs), and to return to the default retention time for such packets and logs. Event 1148 may be similar to event 855, and may comprise causing deletion from the database 731A of stored packets that matched the D-based criteria and that were indexed to the rule stored in event 1118, stored D-based criteria corollary packets that were indexed to the rule stored in event 1118, and corresponding logs that were indexed to the rule stored in event 1118.

The example of FIGS. 11A and 11B was simplified for purposes of explanation, and numerous variations are within the scope of this disclosure. Many of the events shown in FIGS. 11A and 11B may occur multiple times, and events similar to those shown in FIGS. 11A and 11B, but relating to other CTI data and related instructions, rules, etc., may also occur multiple times and/or at times interlaced with times of the events shown in FIGS. 11A and 11B. An instruction that causes the system 730A to compare previously stored captured packets against additional criteria may be different from the instruction stored in event 1129. Nonlimiting examples of such different types of instructions are provided above in connection with the example of FIGS. 8A and 8B. As another variation, the system 730A may not initially instruct the archive 703 to store packets matching the C-based criteria, C-based criteria corollary packets, and corresponding logs for an increased time period (event 1107) and/or may not initially instruct the archive 703 to store packets matching the D-based criteria, D-based criteria corollary packets, and corresponding logs for an increased time period (event 1119). To the extent such packets and logs are later determined to be significant (e.g., based on match to E-based criteria), copies may be provided to the archive 703 from the copies stored in the database 731A. As a further variation, and similar to logs for packets matching an earlier criteria, logs for corollary packets may be updated and compared to later criteria (e.g., the logs for the C-based criteria corollary packets may be updated and compared to the E-based criteria).

Other variations on the example of FIGS. 11A-11B may include variations similar to those discussed above in connection with the example of FIGS. 8A-8B. For example, the firewall 153 may be configured to generate logs with more or less information for packets matching criteria such as the C- and D-based criteria and/or for corollary packets. Alternatively, the firewall 153 may not be configured to generate logs for packets matching criteria such as the C- and D-based criteria, and/or for corollary packets. If the firewall 153 does not generate such logs, event 1133 may be modified to comprise generating logs from stored packets matching criteria such as the C- and D-based criteria and/or from stored corollary packets.

Figure 12A:
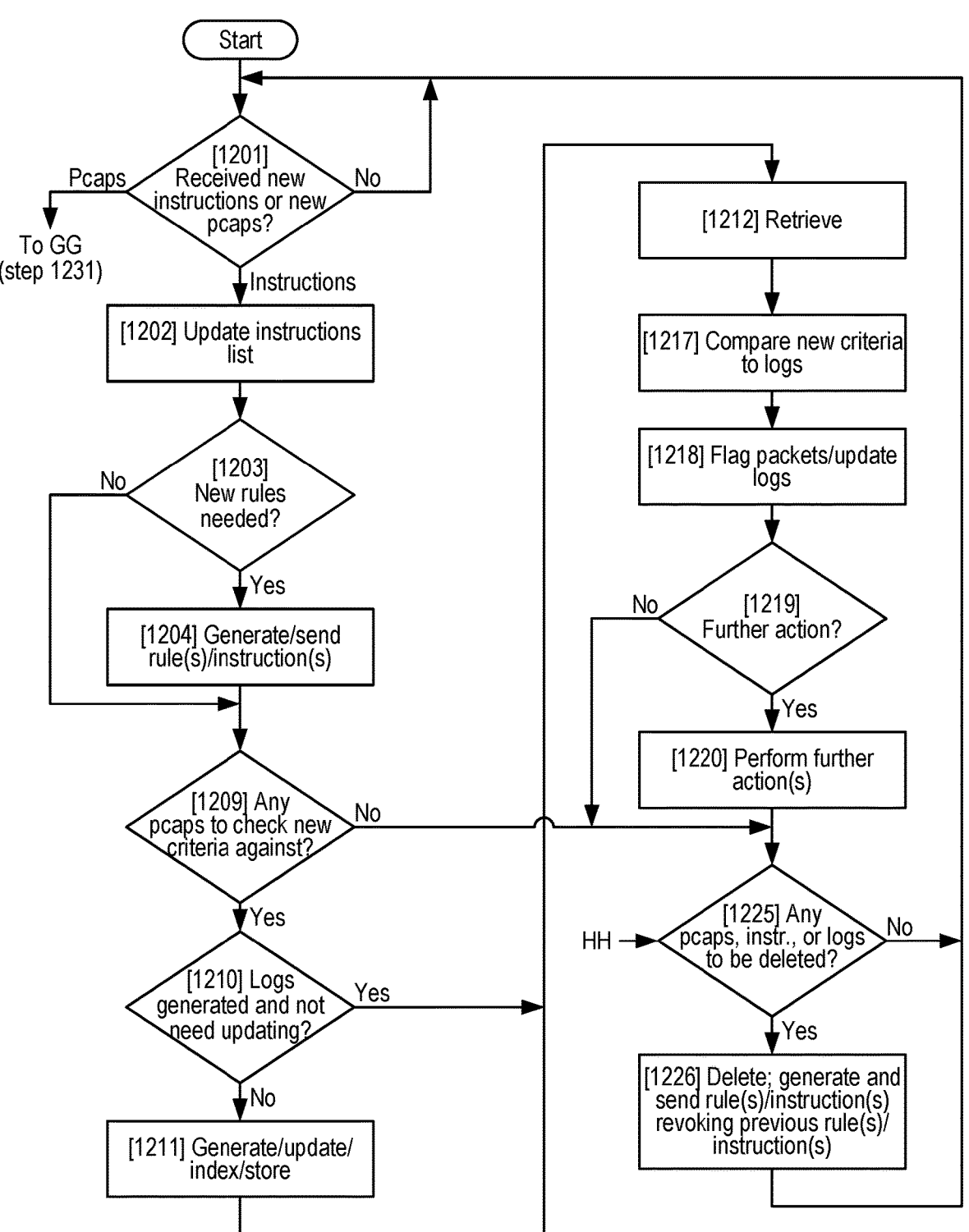
FIGS. 12A and 12B are a flow chart for an example method for filtering, aggregation, and/or retention control based on updated cyber threat intelligence.
Figure 12B:
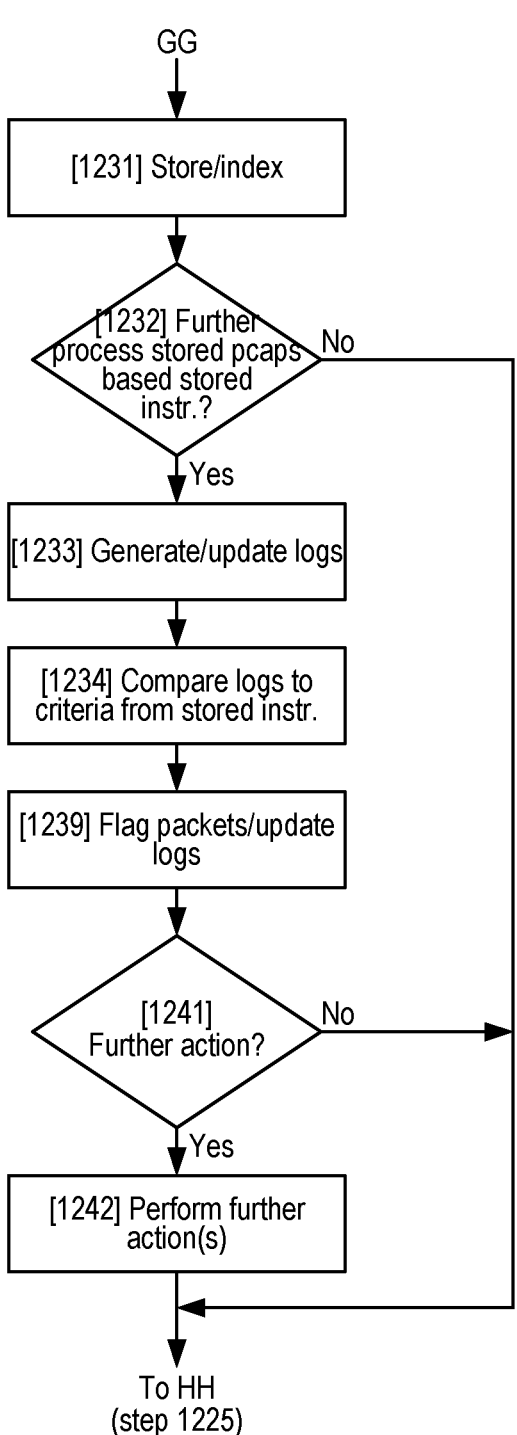

FIGS. 12A and 12B are a flow chart showing an example method for filtering, aggregation, and/or retention control based on updated cyber threat intelligence. One, some, or all steps of the example method of FIGS. 12A and 12B may be performed by the system 730A, and/or by a combination of one or more computing devices configured to perform some or all operations and/or functions of the system 730A. For convenience, FIGS. 12A and 12B are described below in connection with the system 730A. Also or alternatively, one, some, or all steps of the example method of FIGS. 12A and 12B may be performed by one or more other computing devices (e.g., the system 730B or the system 130). One or more steps of the example method of FIGS. 12A and 12B may be rearranged (e.g., performed in a different order), combined, omitted, and/or otherwise modified, and/or other steps added.

In step 1201, the system 730A may determine whether it has received new captured packets (e.g., from one or more PSGs 110, as in events 832 and 833, from the firewall 153, as in event 1015, from the archive 703, as in events 1110 and 1121, or from one or more other computing devices) or whether it has received one or more instructions (e.g., from the system 730B, as in events 812, 820, 839, 1002, 1009, 1022, 1105, 1117, and 1128, or from one or more other computing devices). If nothing has been received, step 1201 may be repeated. If new captured packets have been received, step 1231 (indicated by connector GG and described below in connection with FIG. 12B) may be performed. If an instruction has been received, step 1202 may be performed.

In step 1202, the system 730A may review the received instruction(s) and may update an instruction list based on the received instruction(s). A received instruction may indicate that a previously stored instruction should be deleted. A received instruction may indicate that one or more new instructions should be stored, as in the examples of events 813, 821, 840, 1003, 1010, 1023, 1106, 1118, and 1129. The new instruction(s) may include an instruction to store captured packets matching one or more criteria, to compare stored packets that match one or more criteria against one or more additional criteria to determine further match(es), and/or to take further action (e.g., send an alert based on one or more matches to one or more criteria, send copies of logs and/or captured packets based on one or more matches to one or more criteria, and/or perform other actions). A received instruction may comprise a de-obfuscation algorithm and/or other information that may be used to process stored packets. A received instruction may indicate that a previously stored instruction should modified.

In step 1203, the system 730A may determine whether instruction(s) updated or added in step 1202 indicate that one or more rules (and/or other type(s) of instruction(s)) should be generated and sent to one or more devices/sources of captured packets (e.g., to the PSGs 110 in the example of FIGS. 8A and 8B, to the firewall 153 in the example of FIGS. 10A and 10B, to the archive 703 in the example of FIGS. 11A and 11B, and/or to one or more other devices/sources). A rule (or instruction) may indicate that packets matching one or more criteria (and/or corollary packets) should be captured and copies forwarded, that copies of already-captured packets should be forwarded, that logs for packets should (or should not) be generated and/or forwarded, and/or that other actions should be taken (or not taken). Examples of rules/instructions that may be generated and sent in step 1204 comprise the rules/instructions of events 815, 816, 823, 824, 1004, 1011, 1107, and 1119. Rule(s)/instruction(s) generated and sent in step 1204 may revoke one or more previous rules/instructions. If a rule/instruction should not be sent, step 1209 may be performed. If a rule/instruction should be sent, the system 730A may generate and send the corresponding rule(s)/instruction(s) in step 1204.

In step 1209 (which may, e.g., be performed as part of events 840, 1023, and 1129), the system 730A may determine if the instruction(s) updated and/or added in step 1202 indicate that one or more previously-stored packets should be checked for matches to one or more criteria. If no, step 1225 may be performed. Step 1225 is described below. If yes, step 1210 may be performed. In step 1210, the system 730A may determine if logs, for the one or more previously-stored packets to be checked for matches to one or more criteria, have already been generated, and if such logs have been generated, whether updating of those logs (e.g., based on the instruction(s) updated and/or added in step 1202) is needed. If no, the system 730A may in step 1211 generate those logs (or update existing logs), store those logs (e.g., in the database 731A), and/or index those logs (e.g., relative to the instruction(s) updated or added in step 1202 and/or to criteria associated with those instruction(s)). Examples of step 1210 comprise events 844 and 845, events 1025 and 1026, and events 1133 and 1134. Previously-generated logs may be updated if, for example, instruction(s) updated and/or added in step 1202 include additional information that allows extraction of additional data from captured packets. As another example, previously-generated logs may be updated if those logs are logs, received with the captured packets, that only include basic or minimal information.

After step 1211, or after a yes determination in step 1210, the system 730A may in step 1212 retrieve the logs generated (and/or updated), indexed and stored in step 1211, or the logs determined in step 1210 to have been previously generated, indexed, and stored and to not need updating. In step 1217, the system 730A may compare one or more criteria from the instruction(s) updated and/or added in step 1202 to the retrieved logs and determine if there are any matches. Examples of step 1217 comprise events 846, 1027, and 1139. In step 1218, the system 730A may store data that indexes the retrieved logs (or a portion thereof) and/or the corresponding stored packets based on any matches determined in step 1217. Examples of step 1218 comprise events 847, 1028, and 1140. In step 1219, the system 730A may determine if the instruction(s) updated and/or added in step 1202 indicate that any further action(s) should be performed based on any matches determined in step 1217. A further action may comprise sending an alert (e.g., indicating a match of one or more packets to one or more criteria, indicating a relationship or potential relationship of one or more packets to one or more cyber threats, indicating that packets and/or logs should be retained, and/or indicating one or more other actions, determinations, or events), causing and/or instructing that packets (e.g., packets matching one or more criteria, corollary packets) should be retained, instructing that logs should be retained, collecting and/or sending packets (e.g., packets matching one or more criteria, corollary packets), collecting and/or sending logs, and/or other actions. If no further actions are indicated, the system 730A may perform step 1225. If one or more further actions are indicated, the indicated further action(s) may be performed in step 1220. Examples of step 1220 comprise events 848, 1029, and 1141.

In step 1225, the system 730A may determine if any stored instructions, packets, and/or logs should be deleted. For example, the system 730A may be configured to cause deletion of stored packets, logs, and/or instructions is there is an absence of relevant activity (e.g., no instructions further relating to those stored packets are received, no matches of stored packets to other criteria, no accessing of stored packets or logs) for a predetermined time period. Examples of step 1225 comprise events 851, 1033, and 1145.

If the system 730A determines in step 1225 that there are stored instructions, packets, and/or logs to be deleted, those stored instructions, packets, and/or logs may be deleted in step 1226. As part of step 1226, the system 730A may generate and send one or more rules/instructions that revoke one or more previous rules/instructions that caused packets (and/or logs) to be forwarded. Examples of step 1226 comprise, for example, events 852-854, events 1034-1036, and events 1146-1148. After step 1226, or after a no determination in step 1225, the system 730A may repeat step 1201.

If the system 730A determines in step 1201 that new packets have been received, the system 730A may perform step 1231 (FIG. 12B). In step 1231, the system 730A may store the received packets (and corresponding logs, if also received) and may store data indexing the received packets (and logs, if received) to the criteria, instructions, and/or rules that were the bases for receiving those packets. Examples of step 1231 comprise events 834, 1016, 1111, and 1122. In step 1232, examples of which comprise events 835, 1017, 1112, and 1123, the system 730A may determine if any of the instructions stored by the system 730A indicate that any of the packets stored in step 1231 should be further processed (e.g., to compare against additional criteria). If no, the system 730A may perform step 1225. If yes, the system 730A may perform step 1233. In step 1233, the system 730A may generate logs for the packets stored in step 1231. Step 1233 may have been performed in the example FIGS. 8A and 8B if, for example, events 839 and 840 occurred before event 832. If logs were received with the packets, step 1233 may comprise updating those logs to populate additional fields (e.g., based on reading fields of the packets). In step 1234, the system 730A may compare the generated/updated logs of step 1233 to criteria indicated by one or more stored instructions (e.g., instructions that indicate packets captured based on matching one or more criteria should be compared to one or more additional criteria). In step 1239, the system 730A may store data that indexes one or more of the logs (generated/updated in step 1233) and one or more of the packets (stored in step 1231) based on any matches determined based on the comparison of step 1234.

In step 1241, the system 730A may determine if any further action is indicated (e.g., by a stored instruction associated with the comparison of step 1234) based on any matches determined by the comparison of step 1234. If yes, the system 730A may perform the indicated further action(s) in step 1242, which may be similar to step 1220. If no, or after step 1242, the system 730A may perform step 1225 (as indicated by connector HH).

Figure 13A:
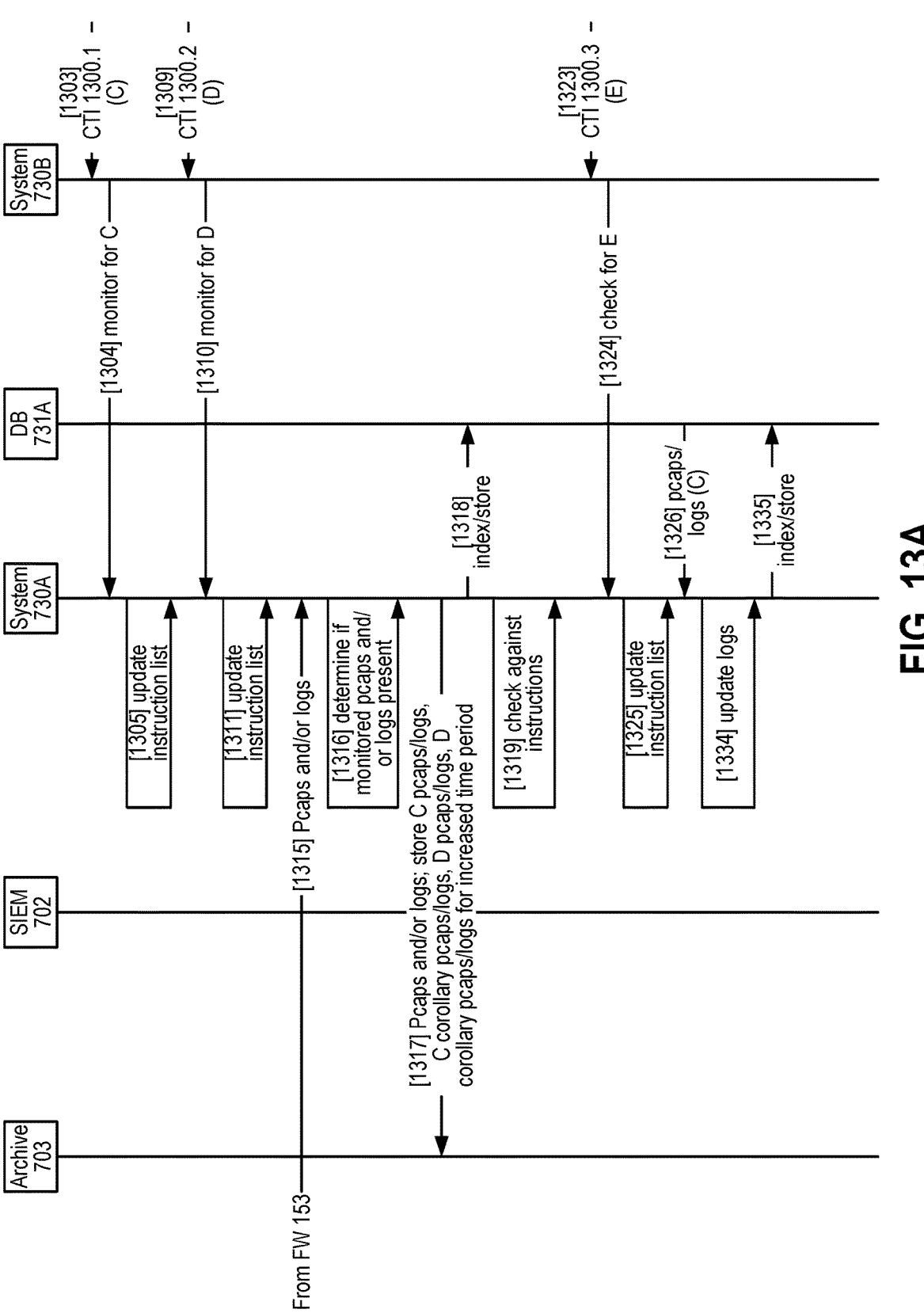
FIGS. 13A and 13B are a sequence diagram showing an additional example of events associated with filtering, aggregation, and/or retention control based on updated cyber threat intelligence.
Figure 13B:
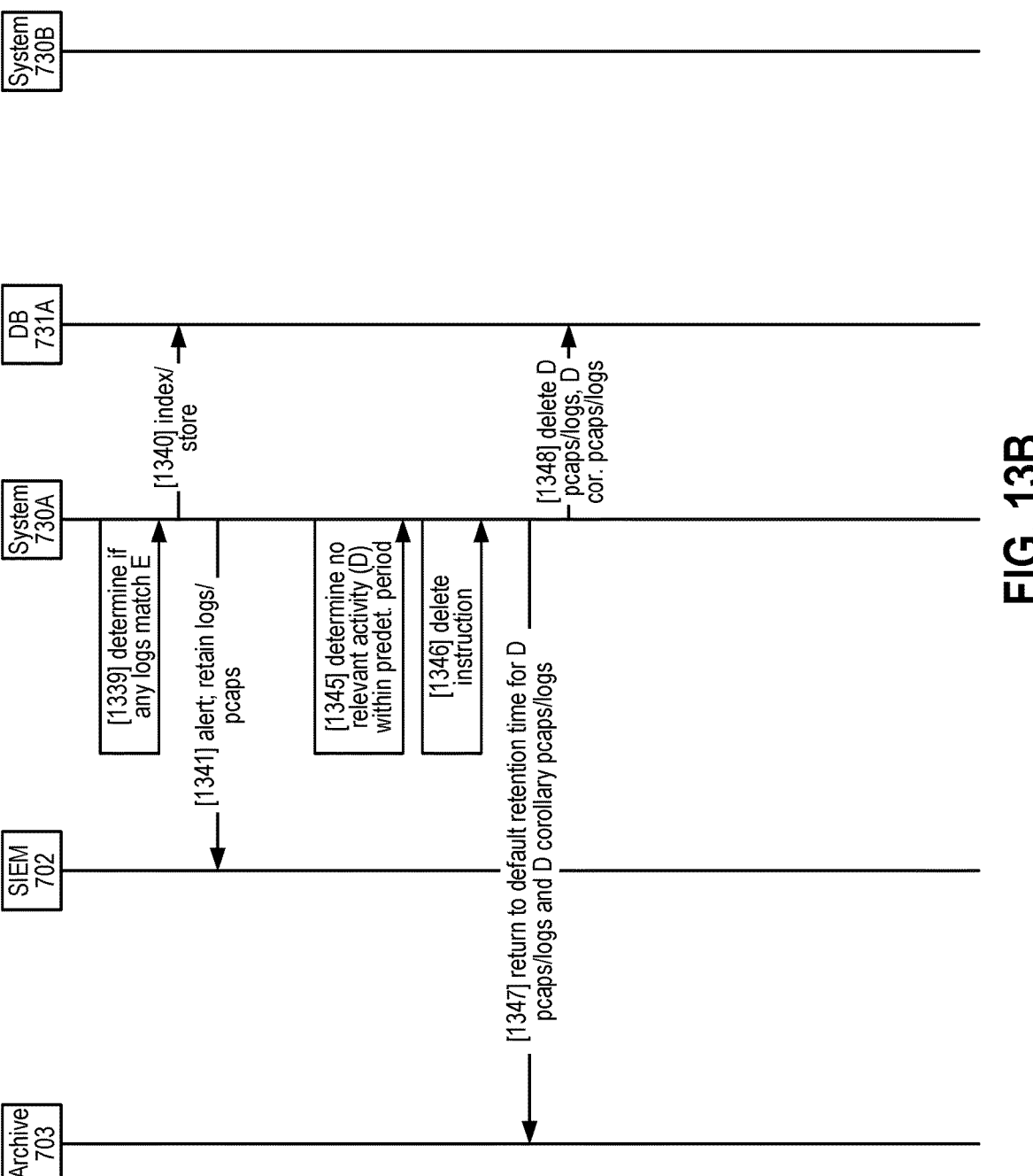

FIGS. 13A and 13B are a sequence diagram showing an additional example of events associated with filtering, aggregation, and/or retention control based on updated cyber threat intelligence. FIG. 13B is a continuation of FIG. 13A. In the example of FIGS. 13A and 13B, and similar to the example of FIGS. 11A and 111B, the firewall 153 may be configured (e.g., separate from any instructions received from the system 730A or the system 730B) to capture some or all packets that pass through the firewall 153 (e.g., all packets being sent to a host 152 from a host outside the network 151, as well as some or all packets being sent from a host 152 to a host outside the network 151), to generate at least some basic level of logs for all of those packets, and to forward those captured packets and the generated logs for storage in the archive 703. In the example of FIGS. 13A and 13B, however, those packets and logs are forwarded to the system 730A, which forwards those packets and logs to the archive 703. The archive 703 may, based on instructions received from the system 730A, store those forwarded packets and logs for a default retention period or for a longer retention period. The system 730A may determine packets and/or logs to be stored for a longer retention time based on comparison to criteria based on CTI data. As with the example of FIGS. 11A and 111B, the example of FIGS. 13A and 13B allows increasing retention time for packets determined, based on criteria and and/or updated criteria potentially related to one or more cyber threats, to be of potential significance. The number, order, and/or timing of the example events shown in FIGS. 13A and 13B may be varied, additional events may occur, and/or one or more of the events shown in FIGS. 13A and 13B may be omitted, repeated, or modified. Events such as those shown in FIGS. 13A and 13B (or a portion thereof) may be performed alone or may be performed in combination with events such as one or more events shown in one or more other drawing figures and/or described herein.

In event 1303, which may be similar to event 811 of FIG. 8A, the system 730B may receive CTI data 1300.1 that comprises the data C. As in the example of FIGS. 8A and 8B, the system 730B may determine that analysis of logs for packets matching C-based criteria is unlikely to be useful, and/or that long-term storage of such logs or of packets matching the C-based criteria is not yet warranted. However, there may be a later determination that data C is significant, and temporary storage of packets matching the C-based criteria may thus be beneficial. In event 1304, which may be similar to event 812, the system 730B may instruct the system 730A that packets and/or logs to be stored by the archive 703 should be monitored for matches to the C-based criteria, and that copies of such packets matching the C-based criteria (and/or corresponding logs) should be stored for at least a predetermined amount of time longer than the default retention period. The instruction of event 1304 may further instruct that C-based criteria corollary packets (and/or logs for such corollary packets) should also be stored for at least a predetermined amount of time. In event 1205, which may be similar to event 813, the system 730A may update a list of instructions to store the instruction received in event 1204.

In event 1309, which may be similar to event 819 of FIG. 8A, the system 730B may receive CTI data 1300.2 that comprises the data D. As in the example of FIGS. 8A and 8B, the system 730B may determine that analysis of logs for packets matching D-based criteria is unlikely to be useful, and/or that long-term storage of such logs or of packets matching the D-based criteria is not yet warranted. However, there may be a later determination that data D is significant, and temporary storage of packets matching the D-based criteria may thus be beneficial. In event 1310, which may be similar to event 820, the system 730B may instruct the system 730A that packets to be stored by the archive 703 should be monitored for matches to the D-based criteria, and that copies of such packets matching the D-based criteria should be stored for at least a predetermined amount of time longer than the default retention period. The instruction of event 1310 may further instruct that D-based criteria corollary packets should also be stored for at least a predetermined amount of time. In event 1311, which may be similar to event 821, the system 730A may update the list of instructions to store the instruction received in event 1310.

In event 1315, the firewall 153 may forward captured packets, and logs associated with those captured packets, to the system 730A. In event 1316, the system 730A may determine which of the packets and logs received in event 1215 are monitored packets or logs or that are corollary packets (or corresponding logs) of monitored packets. In particular, the system 730A may determine which of those received packets and logs match criteria of stored instructions indicating packets to be monitored and indicating corollary packets to be stored. In the example of FIGS. 13A and 13B, those stored instructions include the instructions stored in events 1305 (indicating that packets and logs matching the C-based criteria should be monitored) and 1311 (indicating that packets and logs matching the D-based criteria should be monitored). In event 1316, the system 730A identifies packets (and corresponding logs) matching the C-based criteria, packets (and corresponding logs) matching the D-based criteria, C-based criteria corollary packets (and corresponding logs), and D-based criteria corollary packets (and corresponding logs). In event 1317, the system 730A may forward the packets, received in event 1315 and identified in event 1316, to the archive 703. As part of event 1317, the system 730A may also instruct the archive 703 that the packets and logs identified in event 1316 should be stored for an increased time period. In event 1318, the system 730A may store the packets and the logs, identified in event 1316, in the database 731A. As part of event 1318, the system 730A may index any of those stored packets (and corresponding logs) matching the C-based criteria, as well as the C-based criteria corollary packets (and corresponding logs), to the C-based criteria and/or to the instructions stored in event 1305. The system 730A may index those stored packets and logs using methods such as those described in connection with FIGS. 8A, 8B, 9C, 9E, and 9F. The C-based criteria corollary packets and corresponding logs may be further indexed as such so that further processing of those packets and logs by the system 730A may be omitted, but so that those packets and logs may be identified and forwarded if appropriate (e.g., if packets or logs matching the C-based criteria are determined to match one or more additional criteria). Similarly, and also as part of event 318, the system 730A may index any of those stored packets (and corresponding logs) matching the D-based criteria, as well as the D-based criteria corollary packets (and corresponding logs) to the D-based criteria and/or to the instructions stored in event 1311. The D-based criteria corollary packets and corresponding logs may be further indexed as such so that further processing of those packets and logs by the system 730A may be omitted, but so that those packets and logs may be identified and forwarded if appropriate (e.g., if packets or logs matching the D-based criteria are determined to match one or more additional criteria). In event 1319, which may be similar to event 835, the system 730A may, based on having just stored packets in the database 731A, determine whether any stored instructions indicate that any of the just-stored packets should be further processed. In the example of event 1319, there are no such instructions, and no further processing of the stored packets is performed.

Events 1315 through 1319 may be repeated multiple times. In some repetitions of event 1315, there may be no packets matching the C-based criteria. In such a case, events 1316 through 1319 may change to omit actions relating to packets matching the C-based criteria or C-based criteria corollary packets. In some repetitions of event 1315, there may be no packets matching the D-based criteria. In such a case, events 1316 through 1319 may change to omit actions relating to packets matching the D-based criteria or D-based criteria corollary packets. In some repetitions of event 1315, there may be no packets matching the C- or D-based criteria. In such a case, event 1317 may change to omit actions relating to packets matching the C-based criteria, C-based criteria corollary packets, packets matching the D-based criteria, or D-based criteria corollary packets, and events 1318 and 1319 may not occur.

In event 1323, which may be similar to event 838 of FIG. 8B, the system 730B may receive CTI data 1100.3 that comprises data E (e.g., one or more NTIs). The system 730B may determine (e.g., based on one or more determinations such as are described in connection with FIG. 6E or otherwise described herein) that data E and data C may relate (or potentially relate) to the same cyber threat, and that captured packets matching the C-based criteria may be significant if those packets also match E-based criteria. In event 1324, which may be similar to event 839, the system 730B may send an instruction to the system 730A to check captured packets matching the C-based criteria for matches to the E-based criteria. In event 1325, which may be similar to event 840, the system 730A may update the list of instructions to include the instruction received in event 1324 and may determine that there are stored packets matching the C-based criteria. In event 1326, which may be similar to event 843, the system 730A may cause those stored packets matching the C-based criteria, as well as corresponding logs, to be retrieved from the database 731A. In event 1334, which may be similar to event 844, the system 730A may update the retrieved logs for each of those retrieved packets. In event 1335, which may be similar to event 845, the system 730A may store the updated logs in the database 731B and may store data indexing those updated logs to the C-based criteria and/or to the instruction stored in event 1305.

In event 1339 (FIG. 13B), which may be similar to event 846, the system 730A may determine that a portion of the stored updated logs for packets matching the C-based criteria also match the E-based criteria, and thus that the packets corresponding to that portion of the stored updated logs match the C-based criteria and the E-based criteria. In event 1340, which may be similar to event 847, the system 730A may store data that indexes that portion of the logs, as well as the corresponding stored packets, to the C-based criteria and to the E-based criteria (and/or to the instruction stored in event 1325).

In event 1341, the system 730A may perform further action, indicated by the instruction stored in event 1325, based on the determination that there are packets matching the C- and E-based criteria. The further action may comprise the system 730A sending the SIEM system 702 an alert indicating that captured packets matching the C-based criteria have also matched the E-based criteria, that packets (and/or corresponding logs) matching the C- and E-based criteria should continue to be retained (e.g., for an additional increased time period or for a longer period, and/or until further notice), and/or that C- and E-based criteria corollary packets (and/or corresponding logs) should continue to be retained (e.g., for an additional increased time period or for a longer period, and/or until further notice). Also or alternatively, the alert may indicate that all packets (and/or corresponding logs) matching the C-based criteria should continue to be retained, and/or that all C-based criteria corollary packets (and/or corresponding logs) should continue to be retained. The further action (and event 1341) may further comprise the system 730A collecting and/or sending: copies of packets that matched the C-based criteria and the E-based criteria, copies of logs corresponding to those packets, copies of C- and E-based criteria corollary packets, copies of logs corresponding to those packets, copies of all packets matching the C-based criteria, copies of logs corresponding to those packets, copies of C-based criteria corollary packets for all packets matching the C-based criteria, and/or copies of logs corresponding to those packets. The system 730A may, in addition to (or as an alternative to) sending an alert, packets, and/or logs to the SIEM system 702, send the alert, packets, and/or logs to one or more other computing devices (e.g., the system 730B, a SOAR platform, the archive 703, etc.).

The system 730A may continue to receive (from the firewall 153) and store packets (and corresponding logs) that match the C-based criteria, may continue to receive and store C-based criteria corollary packets (and corresponding logs), and may perform operations with regard to such packets and logs that are similar to those described above in connection with events 1318, 1319, and 1334 through 1341. The system 730A may continue to do so until instructed otherwise by the system 730B or other computing device. Also or alternatively, the system 730A may continue to store and process captured packets matching C-based criteria and corresponding logs (and/or continue to store C-based criteria corollary packets and corresponding logs) until there is no relevant activity (e.g., no further matches of packets matching the C-based criteria to the E-based criteria or to other criteria, no new instructions relating to comparing those packets to other criteria) for a predetermined time period.

Events 1345 and 1346 may be similar to events 851 and 852, respectively. Event 1347 may be similar to event 853 or event 854, with the exception that event 1347 involves sending a revocation instruction to the archive 703. Assuming there is no other instruction requesting increased retention time for such items, the revocation instruction of event

1347 may cause the archive 703 to return to the default retention time for packets matching the D-based criteria (and corresponding logs) and for D-based criteria corollary packets (and corresponding logs). Event 1348 may be similar to event 855, and may comprise causing deletion from the database 731A of stored packets that matched the D-based criteria and that were indexed to the rule stored in event 1311, stored D-based criteria corollary packets that were indexed to the rule stored in event 1311, and corresponding logs that were indexed to the rule stored in event 1311.

The example of FIGS. 13A and 13B was simplified for purposes of explanation, and numerous variations are within the scope of this disclosure. Many of the events shown in FIGS. 13A and 13B may occur multiple times, and events similar to those shown in FIGS. 13A and 13B, but relating to other CTI data and related instructions, rules, etc., may also occur multiple times and/or at times interlaced with times of the events shown in FIGS. 13A and 13B. An instruction that causes the system 730A to compare previously stored captured packets against additional criteria may be different from the instruction stored in event 1325. Nonlimiting examples of such different types of instructions are provided above in connection with the example of FIGS. 8A and 8B. As another variation, the system 730A may not initially instruct the archive 703 to store packets matching the C-based criteria, C-based criteria corollary packets, and corresponding logs for an increased time period (event 1107) and/or may not initially instruct the archive 703 to store packets matching the D-based criteria, D-based criteria corollary packets, and corresponding logs for an increased time period (event 1317). To the extent such packets and logs are later determined to be significant (e.g., based on match to E-based criteria), copies may be provided to the archive 703 from the copies stored in the database 731A. As a further variation, and similar to logs for packets matching an earlier criteria, logs for corollary packets may be updated and compared to later criteria (e.g., the logs for the C-based criteria corollary packets may be updated and compared to the E-based criteria).

Other variations on the example of FIGS. 13A-13B may include variations similar to those discussed above in connection with the example of FIGS. 8A-8B. For example, the firewall 153 may be configured to generate logs with more or less information for packets matching criteria such as the C- and D-based criteria and/or for corollary packets. Alternatively, the firewall 153 may not be configured to generate logs for packets matching criteria such as the C- and D-based criteria, and/or for corollary packets. If the firewall 153 does not generate such logs, event 1334 may be modified to comprise generating logs from stored packets matching criteria such as the C- and D-based criteria and/or from stored corollary packets.

Figure 14A:
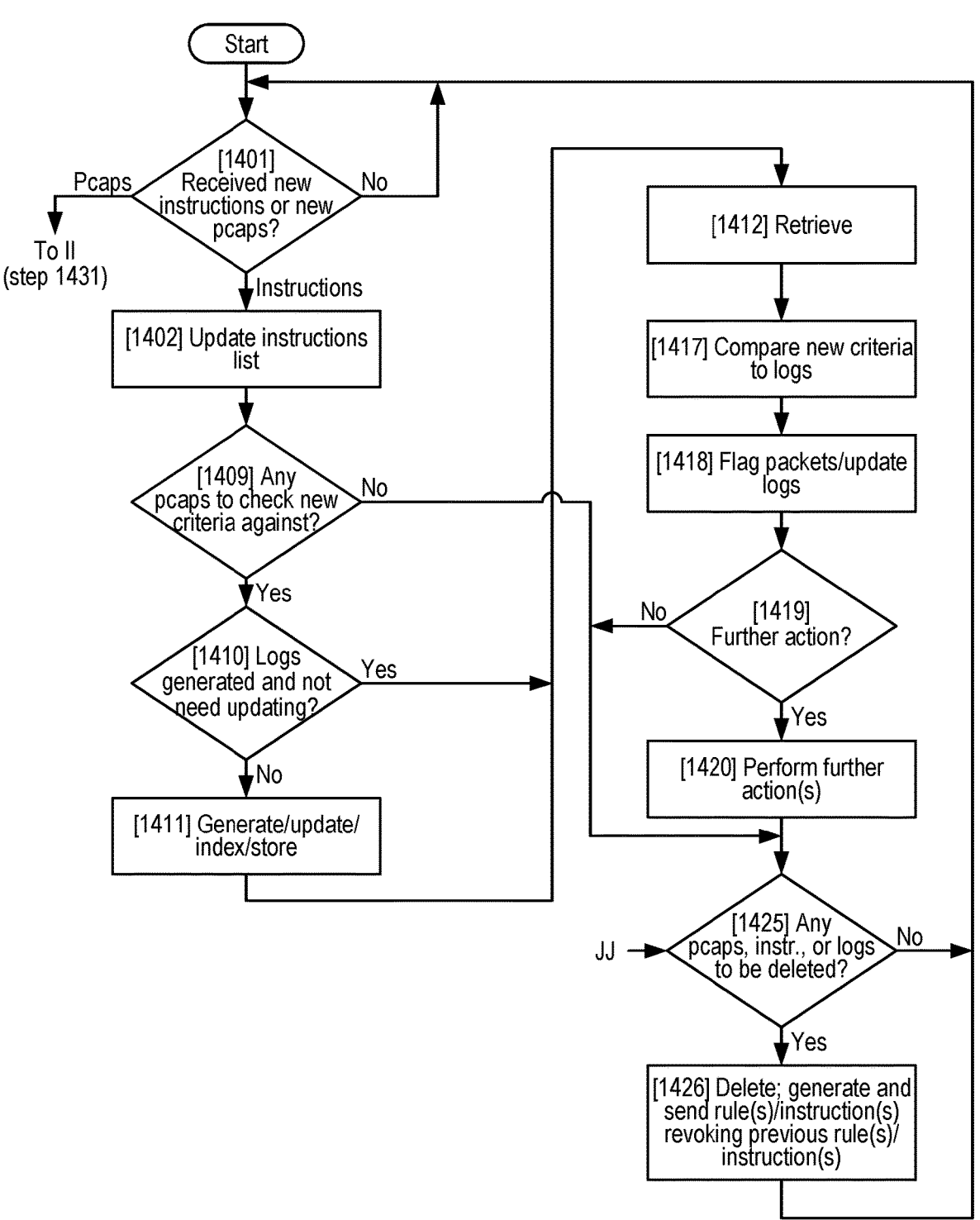
FIGS. 14A and 14B are a flow chart for another example method for filtering, aggregation, and/or retention control based on updated cyber threat intelligence.
Figure 14B:
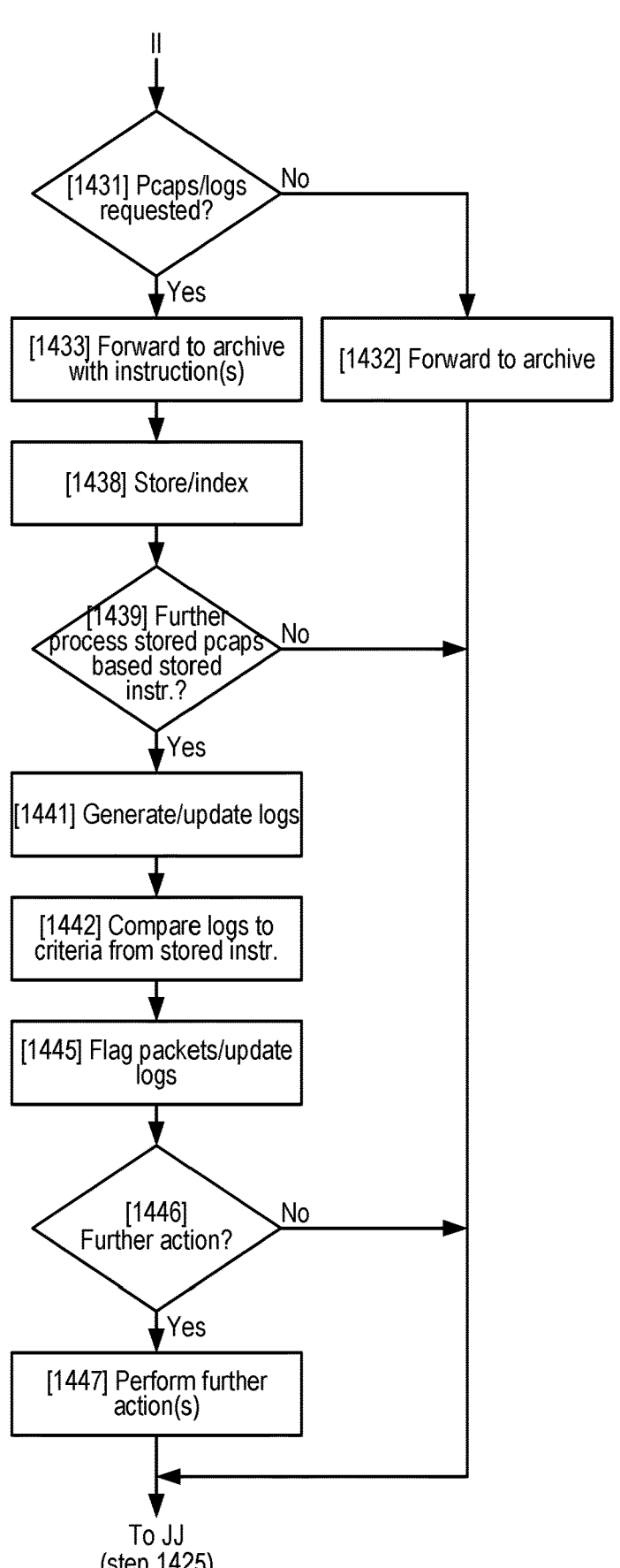

FIGS. 14A and 14B are a flow chart showing an example method for filtering, aggregation, and/or retention control based on updated cyber threat intelligence. One, some, or all steps of the example method of FIGS. 14A and 14B may be performed by the system 730A, and/or by a combination of one or more computing devices configured to perform some or all operations and/or functions of the system 730A. For convenience, FIGS. 14A and 14B are described below in connection with the system 730A. Also or alternatively, one, some, or all steps of the example method of FIGS. 14A and 14B may be performed by one or more other computing devices (e.g., the system 730B or the system 130). One or more steps of the example method of FIGS. 14A and 14B may be rearranged (e.g., performed in a different order), combined, omitted, and/or otherwise modified, and/or other steps added.

In step 1401, the system 730A may determine whether it has received new captured packets (e.g., from the firewall 153, as in event 1315, or from one or more other computing devices) or whether it has received one or more instructions (e.g., from the system 730B, as in events 1304, 1310, and 1324, or from one or more other computing devices). If nothing has been received, step 1401 may be repeated. If new captured packets have been received, step 1431 (indicated by connector II and described below in connection with FIG. 14B) may be performed. If an instruction has been received, step 1402 may be performed.

In step 1402, the system 730A may review the received instruction(s) and may update an instruction list based on the received instruction(s). A received instruction may indicate that a previously stored instruction should be deleted. A received instruction may indicate that one or more new instructions should be stored, as in the examples of events 1305, 1311, and 1325. The new instruction(s) may include an instruction to stored captured packets matching one or more criteria, to compare stored packets that match one or more criteria against one or more additional criteria to determine further match(es), to take further action (e.g., send an alert based on one or more matches to one or more criteria, send copies of logs and/or captured packets based on one or more matches to one or more criteria, and/or perform other actions). A received instruction may comprise a de-obfuscation algorithm and/or other information that may be used to process stored packets. A received instruction may indicate that a previously stored instruction should modified.

In step 1409 (which may, e.g., be performed as part of event 1325), the system 730A may determine if the instruction(s) updated and/or added in step 1402 indicate that one or more previously-stored packets should be checked for matches to one or more criteria. If no, step 1425 may be performed. Step 1425 is described below. If yes, step 1410 may be performed. In step 1410, the system 730A may determine if logs, for the one or more previously-stored packets to be checked for matches to one or more criteria, have already been generated, and if such logs have been generated, whether updating of those logs (e.g., based on the instruction(s) updated and/or added in step 1402) is needed. If no, the system 730A may in step 1411 generate those logs (or update existing logs), store those logs (e.g., in the database 731A), and/or index those logs (e.g., relative to the instruction(s) updated or added in step 1402 and/or to criteria associated with those instruction(s)). An example of step 1411 comprises events 1334 and 1335. Previously-generated logs may be updated if, for example, instruction(s) updated and/or added in step 1402 include additional information that allows extraction of additional data from captured packets. As another example, previously-generated logs may be updated if those logs are logs, received with the captured packets, that only include basic or minimal information.

After step 1411, or after a yes determination in step 1410, the system 730A may in step 1412 retrieve the logs generated (and/or updated), indexed and stored in step 1411, or the logs determined in step 1410 to have been previously generated, indexed, and stored and to not need updating. In step 1417, the system 730A may compare one or more criteria from the instruction(s) updated and/or added in step 1402 to the retrieved logs and determine if there are any matches. An example of step 1417 comprises event 1339. In step 1418, the system 730A may store data that indexes the retrieved logs (or a portion thereof) and/or the corresponding stored captured packets based on any matches determined in step 1417. An example of step 1418 comprises event 1340. In step 1419, the system 730A may determine if the instruction(s) updated and/or added in step 1402 indicate that any further action(s) should be performed based on any matches determined in step 1417. A further action may comprise sending an alert (e.g., indicating a match of one or more packets to one or more criteria, indicating a relationship or potential relationship of one or more packets to one or more cyber threats, indicating that packets and/or logs should be retained, and/or indicating one or more other actions, determinations, or events), causing and/or instructing that packets (e.g., packets matching one or more criteria, corollary packets) should be retained, instructing that logs should be retained, collecting and/or sending packets (e.g., packets matching one or more criteria, corollary packets), collecting and/or sending logs, and/or other actions. If no further actions are indicated, the system 730A may perform step 1225. If one or more further actions are indicated, the indicated further action(s) may be performed in step 1420. An example of step 1420 comprises event 1341.

In step 1425, the system 730A may determine if any stored instructions, packets, and/or logs should be deleted. For example, the system 730A may be configured to cause deletion of stored packets, logs, and/or instructions is there is an absence of relevant activity (e.g., no instructions further relating to those stored packets are received, no matches of stored packets to other criteria, no accessing of stored packets or logs) for a predetermined time period. An example of step 1425 comprises event 1345.

If the system 730A determines in step 1425 that there are stored instructions, captured packets, and/or logs to be deleted, those stored instructions, captured packets, and/or logs may be deleted in step 1426. As part of step 1426, the system 730A may generate and send one or more instructions that revoke one or more previous instructions that caused packets (and/or logs) to be forwarded. An example of step 1426 comprises events 1346-1348. After step 1426, or after a no determination in step 1425, the system 730A may repeat step 1401.

If the system 730A determines in step 1401 that new packets have been received, the system 730A may perform step 1431 (FIG. 14B). In step 1431, the system 730A may determine if the received packets are packets that the system 730A is monitoring (e.g., if the received packets correspond to stored instructions indicating packets that should be monitored). An example of step 1431 is event 1316. If no, the system 730A may in step 1432 forward the received packets (and corresponding logs, if received) to the archive 703 (e.g., without any instruction to increase retention time for any of those packets). After step 1432, the system 730A may perform step 1425 (indicated by connector JJ). If the system determines in step 1431 the received packets include packets that the system 730A is monitoring, the system 730A may perform step 1433. In step 1433, the system 730A may forward the received packets (and corresponding logs, if received) to the archive 703, but may include one or more instructions indicating packets and/or logs (e.g., monitored packets determined in step 1431, corollary packets of the monitored packets, corresponding logs) for which a retention time period should be increased. An example of step 1433 comprises event 1317. In step 1438, the system 730A may store the monitored packets determined in step 1431, as well as corollary packets and corresponding logs. As part of step 1438, the system 730A may store data indexing the received packets to the criteria and/or instructions that were the bases for receiving those packets. An example of step 1438 comprises event 1318.

In step 1439, an example of which comprises event 1319, the system 730A may determine if any of the instructions stored by the system 730A indicate that any of the packets stored in step 1338 should be further processed (e.g., to compare against additional criteria). If no, the system 730A may perform step 1425. If yes, the system 730A may perform step 1441. In step 1441, the system 730A may generate (and/or update) logs for the packets stored in step 1438. If logs were received with the packets, step 1441 may comprise updating those logs to populate additional fields (e.g., based on reading fields of the packets).

In step 1442, the system 730A may compare the generated/updated logs of step 1441 to criteria indicated by one or more stored instructions (e.g., instructions that indicate packets captured based on matching one or more criteria should be compared to one or more additional criteria). In step 1445, the system 730A may store data that indexes one or more of the logs (generated/updated in step 1441) and one or more of the packets (stored in step 1438) based on any matches determined based on the comparison of step 1442. In step 1446, the system 730A may determine if any further action is indicated (e.g., by a stored instruction associated with the comparison of step 1442) based on any matches determined by the comparison of step 1442. If yes, the system 730A may perform the indicated further action(s) in step 1447, which may be similar to step 1420. If no, the system 730A perform step 1425 (as indicated by connector JJ).

As previously described herein, earlier CTI may indicate that a threat level associated with a threat is low, and new CTI for that threat may indicate a higher threat level. The converse may also occur. For example, earlier CTI may indicate that a threat level associated with a threat is high, and new CTI may indicate that the threat level associated with that threat is lower. Determining (e.g., by comparing criteria based on updated CTI to logs and/or captured packets associated with earlier CTI) that an initially high threat level should be lower may be as valuable as determining that an initially low threat level should be higher. A threat may have a lifecycle. An NTI associated with a threat may, for example, begin as a low risk, may elevate to a high risk, may then decrease to a low risk, may go back to a high risk, etc. As a further example, a legitimate web site may be hacked and serve malware. The hacked website may be quickly remediated and stop serving that malware. The system 130 may use a lifecycle of an NTI to block access to a hacked website until a threat associated with that hacked website diminishes, and/or to take other steps until that threat diminishes. Such other steps may, for example, comprise setting a high risk profile for filtering rules (e.g., requiring additional logging and/or requiring packet captures), forcing use of the most current transport layer security (TLS) protocols, restricting encrypted sessions, and/or using a man-in-the-middle (MITM) decryption proxy to maintain awareness of malicious packet contents.

As explained above, CTI may be received from providers 135 that may be external to the system 130. Also or alternatively, the system 130 may generate its own CTI based on analyses such as those described herein. For example, when analyzing existing logs and/or captured packets, the system 130 may discover additional NTIs that may be used to further analyze existing logs and/or captured packets, to refine filtering rules, and/or in any way that CTI from external providers may be used. The system 130 may iteratively perform multiple cycles of generating CTI, applying criteria based on that generated CTI to logs and/or packet captures, generating additional CTI, etc.

As indicated above, new CTI may be used to analyze logs associated with earlier CTI. Such analysis may be performed based on information obtained from analysis of captured packets associated with that earlier CTI. Such analysis, however, may be performed without also analyzing captured packets. For example, valuable information (e.g., affected host, threat disposition) may be obtained by applying information from new CTI to packet logs for which there may be no corresponding captured packets, or for which analysis of corresponding captured packets is unnecessary.

One or more features described herein may be embodied in computer-usable or readable data and/or computer-executable instructions, such as in one or more program modules, executed by one or more computers or other devices as described herein. Program modules may comprise routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a non-transitory computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

For the avoidance of doubt, and without limiting the breadth of disclosure above or in the drawings, the present application further includes the subject matter described in the following numbered clauses:

1. A method comprising: storing one or more first packets matching one or more first criteria; and causing, based on at least a portion of the one or more first packets matching one or more third criteria, further action associated with the at least the portion of the one or more first packets potentially being related to a cyber threat.

2. The method of clause 1, further comprising: storing one or more second packets matching one or more second criteria; and causing, based on an absence of activity associated with the stored one or more second packets, deletion of the stored one or more second packets.

3. The method of any of clauses 1 or 2, wherein the causing deletion of the stored one or more second packets comprises causing that deletion without causing further action associated with the one or more second packets.

4. The method of any of clauses 1-3, wherein the causing deletion of the stored one or more second packets comprises causing that deletion based on the absence of activity lasting at least a predetermined period of time.

5. The method of any of clauses 1-4, wherein the absence of activity comprises a failure to determine a match of the one or more second packets to any criteria other than the one or more second criteria.

6. The method of any of clauses 1-5, wherein the absence of activity comprises an absence of an instruction to check the one or more second packets for a match to any criteria other than the one or more second criteria.

7. The method of any of clauses 1-6, wherein the absence of activity comprises an absence of an attempt to access the stored one or more second packets.

8. The method of any of clauses 1-7, wherein the one or more second criteria are not known to correspond to a cyber threat.

9. The method of any of clauses 1-8, wherein the one or more first criteria are not known, prior to receipt of the one or more third criteria, to correspond to a cyber threat.

10. The method of any of clauses 1-9, wherein each of the one or more first criteria, the one or more second criteria, and the one or more third criteria comprise data configured to match one or more network threat indicators.

11. The method of any of clauses 1-10, further comprising one or more of: receiving the one or more first packets without logs of the one or more first packets; or receiving the one or more second packets without logs of the one or more second packets.

12. The method of any one of clauses 1-11, further comprising: determining that the at least the portion of the one or more first packets match the one or more third criteria.

13. The method of clause 12, wherein determining that the at least the portion of the one or more first packets match the one or more third criteria comprises: generating and/or updating one or more logs for the one or more first packets; comparing the one or more third criteria to the one or more logs; and determining the at least the portion based on matches of the one or more third criteria to at least a portion of the one or more logs corresponding to the at least the portion of the one or more first packets.

14. The method of any of clauses 12 or 13, further comprising: prior to determining that the at least the portion of the one or more first packets match the one or more third criteria, determining that the at least the portion of the first packets match one or more additional criteria.

15. The method of clause 14, wherein causing further action associated with the at least the portion of the one or more first packets comprises causing that further action further based on the determination that the at least the portion of the one or more first packets match the one or more additional criteria.

16. The method of any of clauses 14 or 15, wherein determining that the at least the portion of the one or more first packets match the one or more additional criteria comprises making that determination without alerting other computing devices of the one or more first packets matching the one or more additional criteria.

17. The method of any of clauses 1-16, wherein the further action associated with the at least the portion of the one or more first packets comprises alerting one or more computing devices of one or more of: the match of the at least the portion of the one or more first packets to the one or more third criteria, a relationship of the at least the portion of the one or more first packets to a cyber threat, or a potential relationship of the at least the portion of the one or more first packets to a cyber threat.

18. The method of any of clauses 1-17, wherein the further action associated with the at least the portion of the one or more first packets comprises causing storage of the at least the portion of the one or more first packets.

19. The method of any of clauses 1-18, wherein the further action associated with the at least the portion of the one or more first packets comprises causing storage, for at least an additional period of time, of the at least the portion of the one or more first packets.

20. The method of any of clauses 1-19, wherein the further action associated with the at least the portion of the one or more first packets comprises causing storage of one or more logs associated with the at least the portion of the one or more first packets.

21. The method of any of clauses 1-20, wherein the further action associated with the at least the portion of the one or more first packets comprises causing storage of one or more of: the one or more first packets, or one or more logs associated with the one or more first packets.

22. The method of any of clauses 1-21, wherein the further action associated with the at least the portion of the one or more first packets comprises one or more of: collecting logs corresponding to the at least the portion of the one or more first packets, or collecting logs corresponding to the one or more first packets.

23. The method of any of clauses 1-22, wherein the further action associated with the at least the portion of the one or more first packets comprises one or more of: sending, to one or more computing devices, logs corresponding to the at least the portion of the one or more first packets; or sending, to one or more computing devices, logs corresponding to the one or more first packets.

24. The method of any of clauses 1-23, further comprising: receiving the one or more first packets and/or the one or more second packets from one or more packet security gateways configured to filter packet traffic based on one or more criteria, to log packets, to allow passage of packets matching one or more criteria, to block passage of packets matching one or more criteria, and to capture packets matching one or more criteria.

25. The method of clause 24, further comprising: instructing the one or more packet security gateways to forward copies of the one or more first packets and/or the one or more second packets to a computing device performing the method.

26. The method of clause 25, wherein instructing the one or more packet security gateways to forward copies of the one or more first packets and/or the one or more second packets to the computing device performing the method comprises instructing the one or more packet security gateways to forward copies of the one or more first packets and/or the one or more second packets to the computing device and without forwarding copies of the one or more first packets and/or the one or more second packets to one or more other computing devices to which packet logs and/or copies of packets are forwarded.

27. The method of any of clauses 25 or 26, wherein instructing the one or more packet security gateways to forward copies of the one or more first packets and/or the one or more second packets comprises instructing the one or more packet security gateways to not log the one or more first packets and/or instructing the one or more packet security gateways to not log the one or more second packets.

28. The method of any of clauses 1-27, further comprising: receiving the one or more first packets and/or the one or more second packets from one or more computing devices comprising one or more of a firewall, a computing device associated with an internet service provider, an archive computing device, or a computing device at a network boundary.

29. The method of clause 28, further comprising: instructing the one or more computing devices to forward copies of the one or more first packets and/or the one or more second packets.

30. The method of any of clauses 1-29, further comprising: receiving the one or more first packets and/or the one or more second packets from an archive configured to store packets for a default retention period, and wherein the further action associated with the at least the portion of the one or more first packets comprises instructing the archive to store the one or more first packets for an increased time period that is longer than the default retention period.

31. The method of any of clauses 1-30, further comprising one or more of: receiving corollary packets associated with the one or more first packets; or receiving corollary packets associated with the one or more second packets.

32. The method of any of clauses 1-31, further comprising one or more of: requesting corollary packets associated with the one or more first packets; or requesting corollary packets associated with the one or more second packets.

33. The method of any of clauses 1-32, wherein the further action associated with the at least the portion of the one or more first packets comprises one or more of: forwarding corollary packets associated with the at least the portion of the one or more first packets; or forwarding corollary packets associated with the one or more first packets.

34. The method of any of clauses 1-33, further comprising: receiving copies of packets captured from packet traffic via a network device; determining that the copies of the packets captured from the packet traffic comprise the one or more first packets and/or the one or more second packets; forwarding the received copies of the packets captured from the packet traffic; and instructing that the forwarded copies of the one or more first packets and/or the one or more second packets should be retained.

35. The method of clause 34, wherein instructing that the forwarded copies of the one or more first packets and/or the one or more second packets should be retained comprises instructing that the forwarded copies of the one or more first packets and/or the one or more second packets should be retained for an increased retention period that is longer than a default retention period.

36. The method of any of clauses 34 or 35, further comprising: not instructing that other packets should be retained, wherein the other packets comprise packets, of the received copies of packets captured from packet traffic via a network device, other than the one or more first packets or the one or more second packets.

37. The method of clause 36, wherein not instructing that the other packets should be retained comprises not instructing that the other packets should be retained for an increased retention period that is longer than a default retention period.

38. The method of any of clauses 1-37, wherein the method comprises a method for filtering, aggregation, and/or retention control based on updated cyber threat intelligence.

39. A system comprising one or more computing devices, wherein the system is configured to perform the method of any of clauses 1-38.

40. One or more non-transitory computer-readable media comprising stored instructions that, when executed by one or more processors of one or more computing devices of a system, cause the system to perform the method of any of clauses 1-38.

41. A method comprising: receiving data comprising packet logs, corresponding to packets filtered by one or more computing devices, and captured packets comprising copies of at least a portion of the filtered packets; receiving second cyber threat intelligence data; determining that the second cyber threat intelligence data and first cyber threat intelligence data are potentially associated with a common cyber threat; identifying a subset of the packet logs and a subset of the captured packets associated with the first cyber threat intelligence data; and performing one or more actions, using criteria based on the second cyber threat intelligence data, with the subset of the packet logs and/or with the subset of the captured packets.

42. The method of clause 41, wherein the one or more actions comprise: updating, by application of the criteria to at least one of the subset of the packet logs or the subset of the captured packets, one or more packet logs of the subset of packet logs; and outputting, based on the updated one or more packet logs, one or more indications associated with the common cyber threat.

43. The method of any of clauses 41 or 42, wherein the one or more actions comprise: determining, by application of the criteria to the subset of the captured packets, that one or more packet logs, of the subset of the packet logs, are not associated with the common cyber threat; and outputting, based on determining that the one or more packet logs are not associated with the common cyber threat, one or more indications associated with the common cyber threat.

44. A system comprising one or more computing devices, wherein the system is configured to perform the method of any of clauses 41-43.

45. One or more non-transitory computer-readable media comprising stored instructions that, when executed by one or more processors of one or more computing devices of a system, cause the system to perform the method of any of clauses 41-43.

46. A method comprising: receiving data comprising packet logs corresponding to packets filtered by one or more computing devices; receiving second cyber threat intelligence data; determining that the second cyber threat intelligence data and first cyber threat intelligence data are potentially associated with a common cyber threat; identifying a subset of the packet logs associated with the first cyber threat intelligence data; and performing one or more actions, using criteria based on the second cyber threat intelligence data, with the subset of the packet logs.

47. The method of clause 46, wherein the one or more actions comprise: determining, by application of the criteria to the data received from the one or more computing devices, that one or more packet logs, of the subset of the packet logs, are not associated with the common cyber threat; and outputting, based on determining that the one or more packet logs are not associated with the common cyber threat, one or more indications associated with the common cyber threat.

48. The method of any of clauses 46 or 47, wherein the one or more actions comprise: confirming, by application of the criteria to the data received from the one or more computing devices, that one or more packet logs, of the subset of the packet logs, are associated with the common cyber threat; and outputting, based on confirming that the one or more packet logs are associated with the common cyber threat, one or more indications associated with the common cyber threat.

49. A system comprising one or more computing devices, wherein the system is configured to perform the method of any of clauses 46-48.

50. One or more non-transitory computer-readable media comprising stored instructions that, when executed by one or more processors of one or more computing devices of a system, cause the system to perform the method of any of clauses 46-48.

51. A method comprising: receiving data comprising captured packets comprising copies of packets filtered by one or more computing devices; receiving second cyber threat intelligence data; determining that the second cyber threat intelligence data and first cyber threat intelligence data are potentially associated with a common cyber threat; identifying a subset of the captured packets associated with the first cyber threat intelligence data; and performing one or more actions, using criteria based on the second cyber threat intelligence data, with the subset of the captured packets.

52. The method of clause 51, wherein the one or more actions comprise: confirming, by application of the criteria to the data received from the one or more computing devices, that one or more captured packets, of the subset of captured packets, are not associated with the common cyber threat; and outputting, based on determining that the one or more captured packets are not associated with the common cyber threat, one or more indications associated with the common cyber threat.

53. The method of any of clauses 51 or 52, wherein the one or more actions comprise: confirming, by application of the criteria to the data received from the one or more computing devices, that one or more captured packets, of the subset of captured packets, are associated with the common cyber threat; and outputting, based on confirming that the one or more captured packets are associated with the common cyber threat, one or more indications associated with the common cyber threat.

54. A system comprising one or more computing devices, wherein the system is configured to perform the method of any of clauses 51-53.

55. One or more non-transitory computer-readable media comprising stored instructions that, when executed by one or more processors of one or more computing devices of a system, cause the system to perform the method of any of clauses 51-53.

Although the present disclosure has been described in terms of various examples, many additional modifications and variations would be apparent to those skilled in the art in view of the present disclosure. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

The invention claimed is:

1. A method for use with data received from one or more packet security gateways configured to apply packet matching criteria of packet filtering rules to network traffic traversing the one or more packet security gateways while in-transit between a protected network and an unprotected network, comprising:

receiving, by a cyber threat analysis system comprising one or more servers, cyber threat intelligence data indicating a plurality of cyber threats, wherein the received cyber threat intelligence data comprises first cyber threat intelligence data that originated at a time prior to a beginning of a first time period and that indicates a first cyber threat of the plurality of cyber threats;

receiving, by the cyber threat analysis system and from the one or more packet security gateways, data comprising:

packet logs corresponding to packets filtered by the one or more packet security gateways based on the packet filtering rules, wherein the filtered packets comprise packets from network traffic traversing the one or more packet security gateways during the first time period, wherein the packet logs comprise network threat indicators matching criteria of the packet filtering rules, and wherein the criteria of the packet filtering rules are based on the cyber threat intelligence data, and captured packets comprising copies of at least a portion of the filtered packets;

receiving, by the cyber threat analysis system, second cyber threat intelligence data that originated at a time after the beginning of the first time period;

determining, by the cyber threat analysis system, based on the second cyber threat intelligence data potentially corresponding to the first cyber threat, updated criteria;

identifying, by the cyber threat analysis system, a subset of the packet logs associated with the first cyber threat and a subset of the captured packets associated with the first cyber threat;

generating, by the cyber threat analysis system and by applying the updated criteria to at least one of the subset of the packet logs or the subset of the captured packets, an updated set of packet logs associated with the first cyber threat; and outputting, by the cyber threat analysis system and based on the updated set of packet logs, one or more indications associated with the first cyber threat.

2. The method of claim 1, wherein the receiving the cyber threat intelligence data comprises receiving the first cyber threat intelligence data prior to the beginning of the first time period.

3. The method of claim 1, wherein the identifying the subset of the packet logs and the subset of the captured packets is performed based on a determination that the first cyber threat intelligence data and the second cyber threat intelligence data are both associated with the first cyber threat.

4. The method of claim 3, wherein the identifying the subset of the packet logs and the subset of the captured packets is performed based on a determination that the second cyber threat intelligence data comprises one or more of:

a change to a value of a network threat indicator identified by the first cyber threat intelligence data, or a value of a network threat indicator not identified by the first cyber threat intelligence data.

5. The method of claim 1, wherein the generating comprises generating the updated set of packet logs to comprise network threat indicators, from the identified subset of the captured packets, not identified by the first cyber threat intelligence data.

6. The method of claim 1, wherein the updated set of packet logs comprise network threat indicators, from the identified subset of the captured packets, that comprise one or more of: a source address, a destination address, a source port, a destination port, a protocol, an L3 header field value, an L4 header field value, an L2 header field value, a protocol version, a host name, a domain name, a portion of a domain name, a universal resource identifier (URI), a universal resource locator (URL), an authentication certificate, a certificate authority, a size of a packet, a size of a portion of a packet, a specific content of at least a portion of a data payload, an HTTP request method type, a time associated with a packet, or a relation of a packet to one or more other packets.

7. The method of claim 1, wherein the criteria comprise one or more first criteria based on one or more first network threat indicators from the first cyber threat intelligence data and associated with the first cyber threat, wherein the updated criteria are based on one or more second network threat indicators from the second cyber threat intelligence data and associated with the first cyber threat, wherein the one or more second network threat indicators are different from the one or more first network threat indicators, and wherein the generating the updated set of packet logs further comprises one or more of:

confirming, based on presence of the one or more second network threat indicators in one or more packet logs of the subset of packet logs, an association with the first cyber threat, or determining, based on absence of the one or more second network threat indicators in one or more packet logs of the subset of packet logs, an absence of an association with the first cyber threat.

8. The method of claim 1, further comprising:

determining one or more commonalities associated with network threat indicators of the updated set of packet logs.

9. The method of claim 1, further comprising:

determining, based on the updated set of packet logs, that one or more of the packet logs not identified as part of the subset of the packet logs is associated with the first cyber threat.

10. The method of claim 1, wherein the identifying is further based on determining that the second cyber threat intelligence data increases a threat level associated with the first cyber threat.

11. The method of claim 1, further comprising:

generating, by the cyber threat analysis system and based on third cyber threat intelligence data that is associated with the first cyber threat and that updates the second cyber threat intelligence data, a further updated set of packet logs associated with the first cyber threat; and outputting, by the cyber threat analysis system and based on the further updated set of packet logs, one or more indications associated with the first cyber threat.

12. The method of claim 1, wherein the outputting comprises one or more of:

outputting an indication on a display;

modifying a packet filtering rule to add one or more packet matching criteria;

modifying a packet filtering rule to block packets; or changing a storage time associated with one or more of the packet logs.

13. A cyber threat analysis system comprising one or more servers, wherein the one or more servers are configured to:

receive cyber threat intelligence data indicating a plurality of cyber threats, wherein the received cyber threat intelligence data comprises first cyber threat intelligence data that originated at a time prior to a beginning of a first time period and that indicates a first cyber threat of the plurality of cyber threats;

receive, from one or more packet security gateways configured to apply packet matching criteria of packet filtering rules to network traffic traversing the one or more packet security gateways while in-transit between a protected network and an unprotected network, data comprising:

packet logs corresponding to packets filtered by the one or more packet security gateways based on the packet filtering rules, wherein the filtered packets comprise packets from network traffic traversing the one or more packet security gateways during the first time period, wherein the packet logs comprise network threat indicators matching criteria of the packet filtering rules, and wherein the criteria of the packet filtering rules are based on the cyber threat intelligence data, and captured packets comprising copies of at least a portion of the filtered packets;

receive second cyber threat intelligence data that originated at a time after the beginning of the first time period;

determine, based on the second cyber threat intelligence data potentially corresponding to the first cyber threat, updated criteria;

identify a subset of the packet logs associated with the first cyber threat and a subset of the captured packets associated with the first cyber threat;

generate, by applying the updated criteria to at least one of the subset of the packet logs or the subset of the captured packets, an updated set of packet logs associated with the first cyber threat; and output, by the cyber threat analysis system and based on the updated set of packet logs, one or more indications associated with the first cyber threat.

14. The cyber threat analysis system of claim 13, wherein the one or more servers are configured to identify the subset of the packet logs and the subset of the captured packets based on a determination that the first cyber threat intelligence data and the second cyber threat intelligence data are both associated with the first cyber threat.

15. The cyber threat analysis system of claim 13, wherein the criteria comprise one or more first criteria based on one or more first network threat indicators from the first cyber threat intelligence data and associated with the first cyber threat, wherein the updated criteria are based on one or more second network threat indicators from the second cyber threat intelligence data and associated with the first cyber threat, wherein the one or more second network threat indicators are different from the one or more first network threat indicators, and wherein the one or more servers are configured to generate the updated set of packet logs by one or more of:

confirming, based on presence of the one or more second network threat indicators in one or more packet logs of the subset of packet logs, an association with the first cyber threat, or determining, based on absence of the one or more second network threat indicators in one or more packet logs of the subset of packet logs, an absence of an association with the first cyber threat.

16. One or more non-transitory computer-readable media comprising stored instructions that, when executed by one or more processors of a cyber threat analysis system, cause the cyber threat analysis system to:

receive cyber threat intelligence data indicating a plurality of cyber threats, wherein the received cyber threat intelligence data comprises first cyber threat intelligence data that originated at a time prior to a beginning of a first time period and that indicates a first cyber threat of the plurality of cyber threats;

receive, from one or more packet security gateways configured to apply packet matching criteria of packet filtering rules to network traffic traversing the one or more packet security gateways while in-transit between a protected network and an unprotected network, data comprising:

packet logs corresponding to packets filtered by the one or more packet security gateways based on the packet filtering rules, wherein the filtered packets comprise packets from network traffic traversing the one or more packet security gateways during the first time period, wherein the packet logs comprise network threat indicators matching criteria of the packet filtering rules, and wherein the criteria of the packet filtering rules are based on the cyber threat intelligence data, and captured packets comprising copies of at least a portion of the filtered packets;

receive second cyber threat intelligence data that originated at a time after the beginning of the first time period;

determine, based on the second cyber threat intelligence data potentially corresponding to the first cyber threat, updated criteria;

identify a subset of the packet logs associated with the first cyber threat and a subset of the captured packets associated with the first cyber threat;

generate, by applying the updated criteria to at least one of the subset of the packet logs or the subset of the captured packets, an updated set of packet logs associated with the first cyber threat; and output, by the cyber threat analysis system and based on the updated set of packet logs, one or more indications associated with the first cyber threat.

17. The one or more non-transitory computer-readable media of claim 16, wherein the instructions, when executed by the one or more processors of the cyber threat analysis system, cause the cyber threat analysis system to identify the subset of the packet logs and the subset of the captured packets based on a determination that the first cyber threat intelligence data and the second cyber threat intelligence data are both associated with the first cyber threat.

18. The one or more non-transitory computer-readable media of claim 16, wherein the criteria comprise one or more first criteria based on one or more first network threat indicators from the first cyber threat intelligence data and associated with the first cyber threat, wherein the updated criteria are based on one or more second network threat indicators from the second cyber threat intelligence data and associated with the first cyber threat, wherein the one or more second network threat indicators are different from the one or more first network threat indicators, and wherein the instructions, when executed by the one or more processors of the cyber threat analysis system, cause the cyber threat analysis system to generate the updated set of packet logs by one or more of:

confirming, based on presence of the one or more second network threat indicators in one or more packet logs of the subset of packet logs, an association with the first cyber threat, or determining, based on absence of the one or more second network threat indicators in one or more packet logs of the subset of packet logs, an absence of an association with the first cyber threat.

19. The one or more non-transitory computer-readable media of claim 16, wherein the instructions, when executed by the one or more processors of the cyber threat analysis system, cause the cyber threat analysis system to:

determine, based on the updated set of packet logs, that one or more of the packet logs not identified as part of the subset of the packet logs is associated with the first cyber threat.

20. The cyber threat analysis system of claim 13, wherein the one or more servers are configured to:

determine, based on the updated set of packet logs, that one or more of the packet logs not identified as part of the subset of the packet logs is associated with the first cyber threat.

* * * * *